US009774678B2

(12) United States Patent
Resch et al.

(10) Patent No.: US 9,774,678 B2
(45) Date of Patent: *Sep. 26, 2017

(54) TEMPORARILY STORING DATA IN A DISPERSED STORAGE NETWORK

(71) Applicant: International Business Machines Corporation, Armonk, NY (US)

(72) Inventors: Jason K. Resch, Chicago, IL (US); Wesley Leggette, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 136 days.

This patent is subject to a terminal disclaimer.

(21) Appl. No.: 14/153,319

(22) Filed: Jan. 13, 2014

(65) Prior Publication Data
US 2014/0244788 A1 Aug. 28, 2014
US 2017/0171309 A9 Jun. 15, 2017

Related U.S. Application Data

(63) Continuation-in-part of application No. 12/838,407, filed on Jul. 16, 2010, now Pat. No. 9,015,431.
(Continued)

(51) Int. Cl.
*G06F 15/16* (2006.01)
*H04L 29/08* (2006.01)

(52) U.S. Cl.
CPC .............................. *H04L 67/1097* (2013.01)

(58) Field of Classification Search
CPC ............. G06F 12/0246; G06F 12/0804; G06F 12/0866; G06F 12/0638; G06F 13/1694
See application file for complete search history.

(56) References Cited

U.S. PATENT DOCUMENTS 4,092,732 A 5/1978 Ouchi
5,454,101 A 9/1995 Mackay et al.
(Continued)

OTHER PUBLICATIONS

Shamir; How to Share a Secret; Communications of the ACM; vol. 22, No. 11; Nov. 1979; pp. 612-613.
Rabin; Efficient Dispersal of Information for Security, Load Balancing, and Fault Tolerance; Journal of the Association for Computer Machinery; vol. 36, No. 2; Apr. 1989; pp. 335-348.
Chung; An Automatic Data Segmentation Method for 3D Measured Data Points; National Taiwan University; pp. 1-8; 1998.
(Continued)

Primary Examiner — Dhairya A Patel
(74) Attorney, Agent, or Firm — Garlick & Markison; Timothy W. Markison; Bruce E. Stuckman

(57) ABSTRACT

A method begins by a dispersed storage (DS) processing module obtaining a transaction number and generating a set of temporary write commands regarding storage of a data segment in a dispersed storage network (DSN) memory, where a temporary write command includes the transaction number, an encoded portion of the data segment, and an implicit instruction that the encoded portion is not to be stored or made accessible in accordance with a conventional manner. The method continues with the DS processing module transmitting the set of temporary write commands to the DSN memory. When the temporarily stored data segment is to be read from the DSN memory, the method continues with the DS processing module generating a set of temporary read commands, where a temporary read command includes the transaction number, identity of the encoded portion, and an explicit instruction to read the encoded portion in violation of the conventional manner.

16 Claims, 60 Drawing Sheets

Related U.S. Application Data

(60) Provisional application No. 61/769,588, filed on Feb. 26, 2013, provisional application No. 61/256,226, filed on Oct. 29, 2009.

(56) References Cited

U.S. PATENT DOCUMENTS

| | | |
|---|---|---|
| 5,485,474 A | 1/1996 | Rabin |
| 5,774,643 A | 6/1998 | Lubbers et al. |
| 5,802,364 A | 9/1998 | Senator et al. |
| 5,809,285 A | 9/1998 | Hilland |
| 5,890,156 A | 3/1999 | Rekieta et al. |
| 5,987,622 A | 11/1999 | Lo Verso et al. |
| 5,991,414 A | 11/1999 | Garay et al. |
| 6,012,159 A | 1/2000 | Fischer et al. |
| 6,058,454 A | 5/2000 | Gerlach et al. |
| 6,128,277 A | 10/2000 | Bruck et al. |
| 6,175,571 B1 | 1/2001 | Haddock et al. |
| 6,192,472 B1 | 2/2001 | Garay et al. |
| 6,256,688 B1 | 7/2001 | Suetaka et al. |
| 6,272,658 B1 | 8/2001 | Steele et al. |
| 6,301,604 B1 | 10/2001 | Nojima |
| 6,356,949 B1 | 3/2002 | Katsandres et al. |
| 6,366,995 B1 | 4/2002 | Vilkov et al. |
| 6,374,336 B1 | 4/2002 | Peters et al. |
| 6,415,373 B1 | 7/2002 | Peters et al. |
| 6,418,539 B1 | 7/2002 | Walker |
| 6,449,688 B1 | 9/2002 | Peters et al. |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,718,361 B1 | 4/2004 | Basani et al. |
| 6,760,808 B2 | 7/2004 | Peters et al. |
| 6,785,768 B2 | 8/2004 | Peters et al. |
| 6,785,783 B2 | 8/2004 | Buckland |
| 6,826,711 B2 | 11/2004 | Moulton et al. |
| 6,879,596 B1 | 4/2005 | Dooply |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,080,101 B1 | 7/2006 | Watson et al. |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,222,133 B1 | 5/2007 | Raipurkar et al. |
| 7,240,236 B2 | 7/2007 | Cutts et al. |
| 7,272,613 B2 | 9/2007 | Sim et al. |
| 7,636,724 B2 | 12/2009 | de la Torre et al. |
| 8,327,141 B2 * | 12/2012 | Vysogorets ............ G06F 21/34 713/168 |
| 2002/0062422 A1 | 5/2002 | Butterworth et al. |
| 2002/0166079 A1 | 11/2002 | Ulrich et al. |
| 2003/0018927 A1 | 1/2003 | Gadir et al. |
| 2003/0037261 A1 | 2/2003 | Meffert et al. |
| 2003/0065617 A1 | 4/2003 | Watkins et al. |
| 2003/0084020 A1 | 5/2003 | Shu |
| 2004/0024963 A1 | 2/2004 | Talagala et al. |
| 2004/0122917 A1 | 6/2004 | Menon et al. |
| 2004/0215998 A1 | 10/2004 | Buxton et al. |
| 2004/0228493 A1 | 11/2004 | Ma et al. |
| 2005/0100022 A1 | 5/2005 | Ramprashad |
| 2005/0114594 A1 | 5/2005 | Corbett et al. |
| 2005/0125593 A1 | 6/2005 | Karpoff et al. |
| 2005/0131993 A1 | 6/2005 | Fatula, Jr. |
| 2005/0132070 A1 | 6/2005 | Redlich et al. |
| 2005/0144382 A1 | 6/2005 | Schmisseur |
| 2005/0229069 A1 | 10/2005 | Hassner |
| 2006/0047907 A1 | 3/2006 | Shiga et al. |
| 2006/0136448 A1 | 6/2006 | Cialini et al. |
| 2006/0156059 A1 | 7/2006 | Kitamura |
| 2006/0224603 A1 | 10/2006 | Correll, Jr. |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0088970 A1 | 4/2007 | Buxton et al. |
| 2007/0174192 A1 | 7/2007 | Gladwin et al. |
| 2007/0214285 A1 | 9/2007 | Au et al. |
| 2007/0234110 A1 | 10/2007 | Soran et al. |
| 2007/0283167 A1 | 12/2007 | Venters, III et al. |
| 2009/0094251 A1 | 4/2009 | Gladwin et al. |
| 2009/0094318 A1 * | 4/2009 | Gladwin ............ H04L 67/1097 709/203 |
| 2010/0023524 A1 | 1/2010 | Gladwin et al. |
| 2010/0228906 A1 * | 9/2010 | Ramiya Mothilal ............ G06F 12/0246 711/103 |
| 2010/0268966 A1 * | 10/2010 | Leggette ............ G06F 21/6227 713/193 |
| 2011/0107036 A1 * | 5/2011 | Resch ..................... H04L 12/00 711/154 |
| 2012/0254562 A1 * | 10/2012 | Morrison ............ G06F 13/4239 711/155 |

OTHER PUBLICATIONS

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner

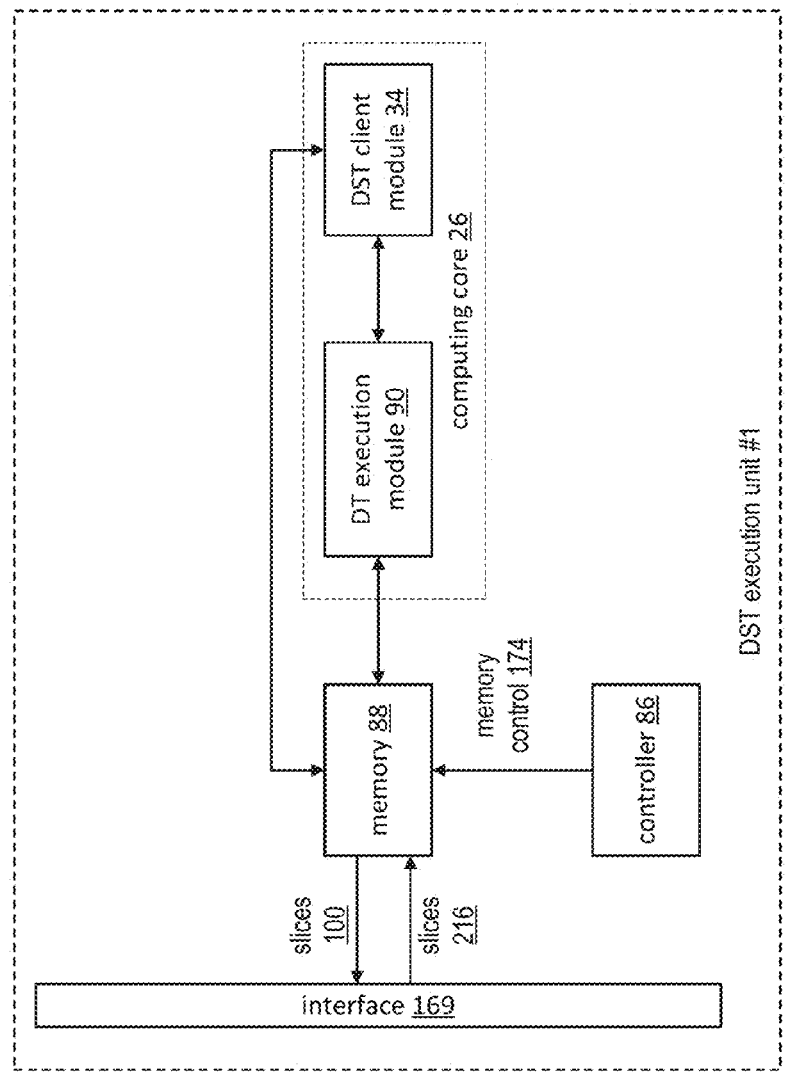
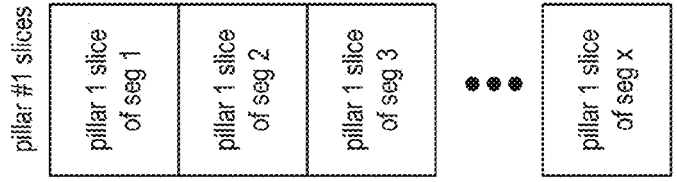
FIG. 24

| DST allocation info 242 | data partition info 320: data ID; No. of partitions; Addr. info for each partition; format conversion indication | | | | | | | |
|---|---|---|---|---|---|---|---|---|
| | task execution info 322 | | | | | intermediate result info 324 | | |
| task 326 | task ordering 328 | data partition 330 | set of DT EX mods 332 | Name 334 | interm. result processing 336 | scratch pad storage 338 | intermediate result storage 340 | |
| 1_1 | none | 2_1 - 2_z | 1_1, 2_1, 3_1, 4_1, & 5_1 | R1-1 | DST unit 1 | DST unit 1 | DST units 1-5 | |
| 1_2 | none | 2_1 - 2_4 | 1_1, 2_1, 3_1, 4_1, & 5_1 | R1-2 | DST unit 1 | DST unit 1 | DST units 1-5 | |
| 1_3 | none | 2_1 - 2_4  2_5 - 2_z | 1_1, 2_1, 3_1, 4_1, & 5_1  1_2, 2_2, 3_2, 4_2, & 5_2 | R1-3 | DST unit 2 | DST unit 2 | DST units 2-6 | |
| 1_4 | after 1_3 | R1-3_1 - R1-3_4  R1-3_5 - R1-3_z | 1_1, 2_1, 3_1, 4_1, & 5_1  1_2, 2_2, 6_1, 7_1, & 7_2 | R1_4 | DST unit 3 | DST unit 3 | DST units 3-7 | |
| 1_5 | after 1_4 | R1-4_1 - R1-4_z &  2_1 - 2_z | 1_1, 2_1, 3_1, 4_1, & 5_1 | R1-5 | DST unit 1 | DST unit 1 | DST units 1-5 | |
| 1_6 | after 1_1 &  1_5 | R1-1_1 - R1-1_z &  R1-5_1 - R1-5_z | 1_1, 2_1, 3_1, 4_1, & 5_1 | R1-6 | DST unit 2 | DST unit 2 | DST units 2-6 | |
| 1_7 | after 1_2 &  1_5 | R1-2_1 - R1-2_z &  R1-5_1 - R1-5_z | 1_2, 2_2, 3_2, 4_2, & 5_2 | R1-7 | DST unit 3 | DST unit 3 | DST units 3-7 | |
| 2 | none | 2_1 - 2_z | 3_1, 4_1, 5_1, 6_1, & 7_1 | R2 | DST unit 7 | DST unit 7 | DST units 7, 1-4 | |
| 3_1 | none (same as 1_3) | use R1_3 | | R1-1 | | | | |
| 3_2 | after 3_1 | R1-3_1 - R1-3_z | 1_2, 2_2, 3_2, 4_2, & 5_2 | R3-2 | DST unit 5 | DST unit 5 | DST units 5,6, 1-3 | |

FIG. 32

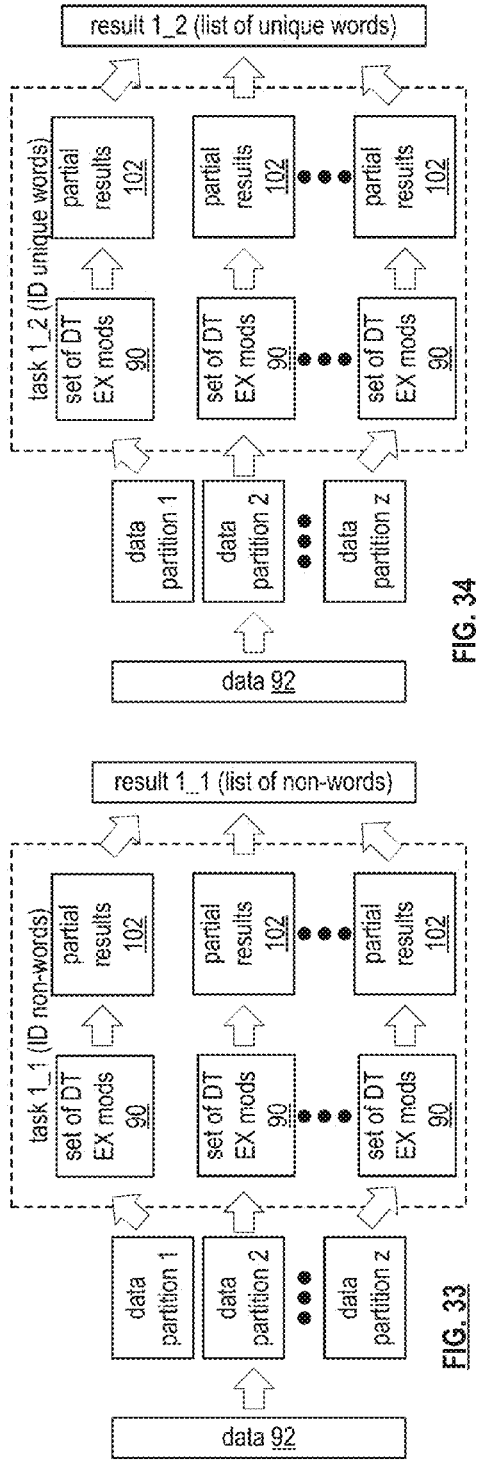
FIG. 34
FIG. 33
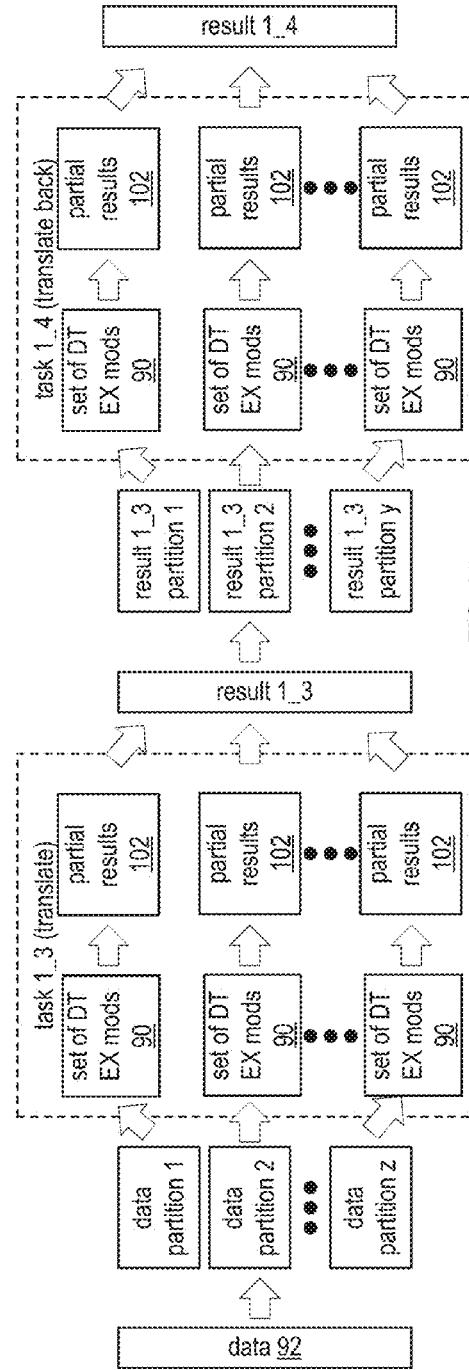
FIG. 35

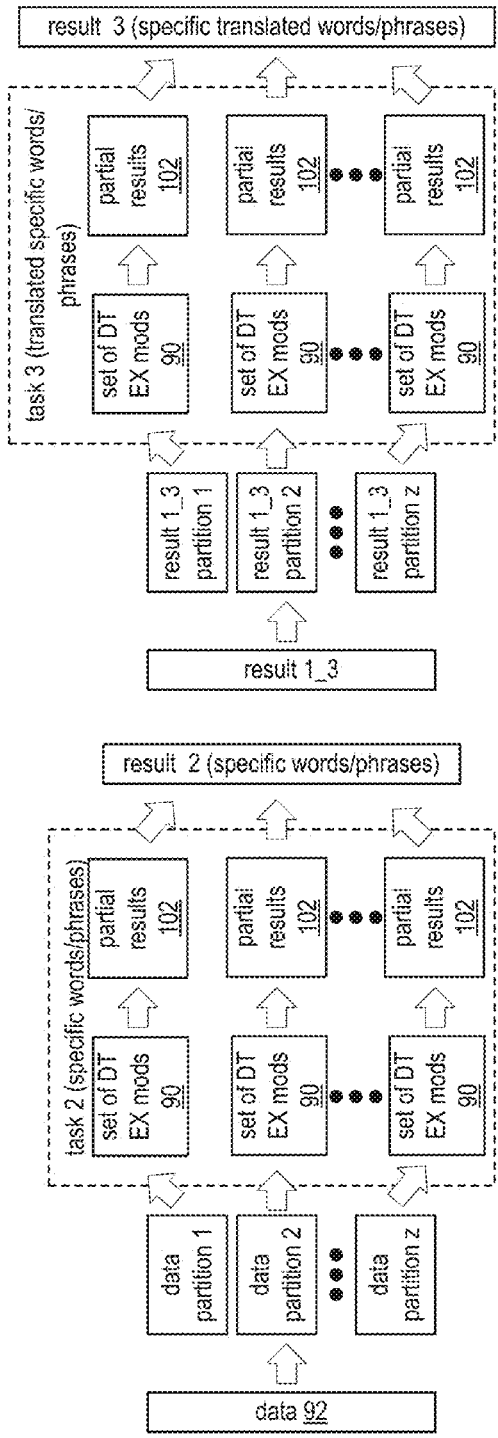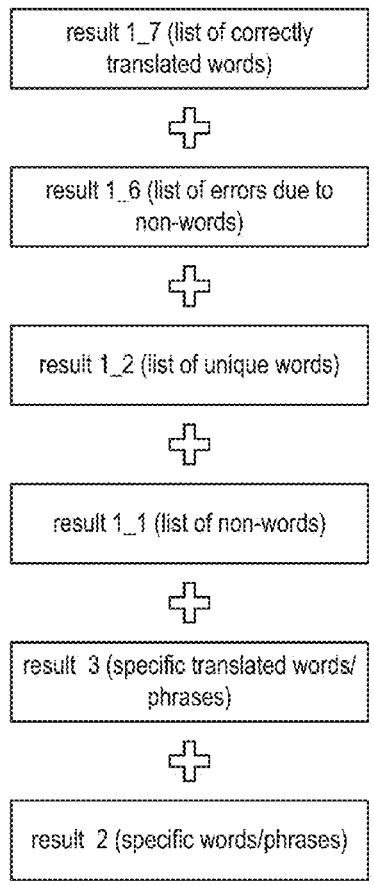

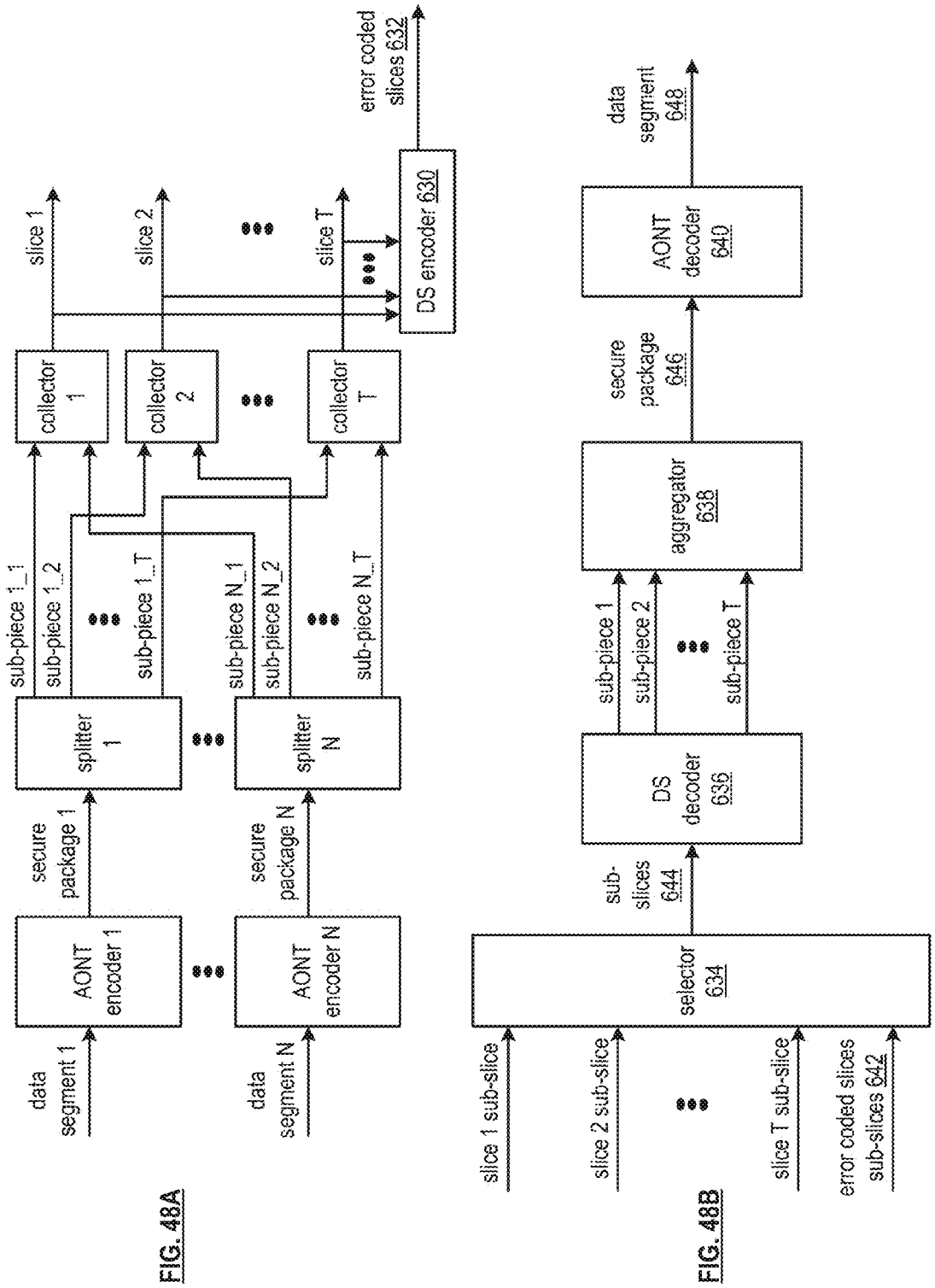

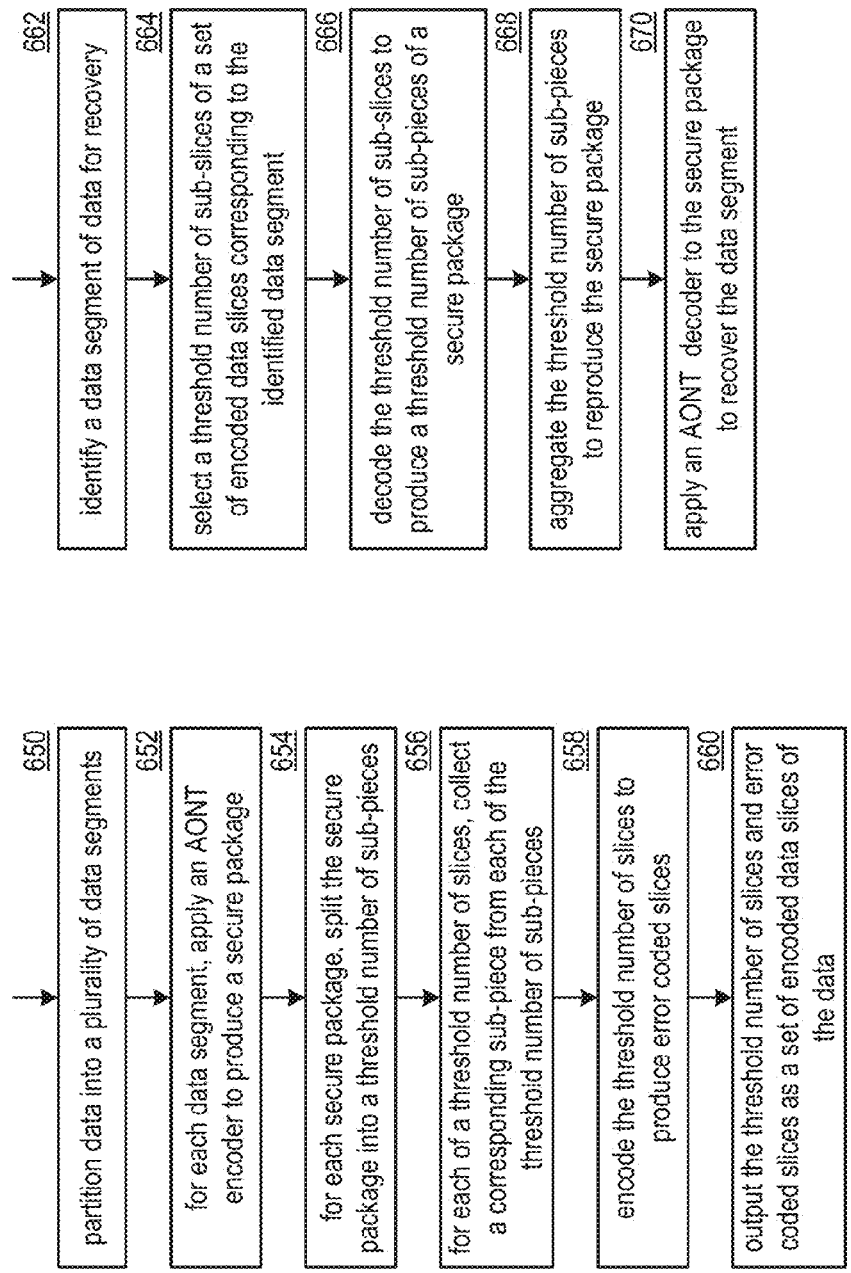

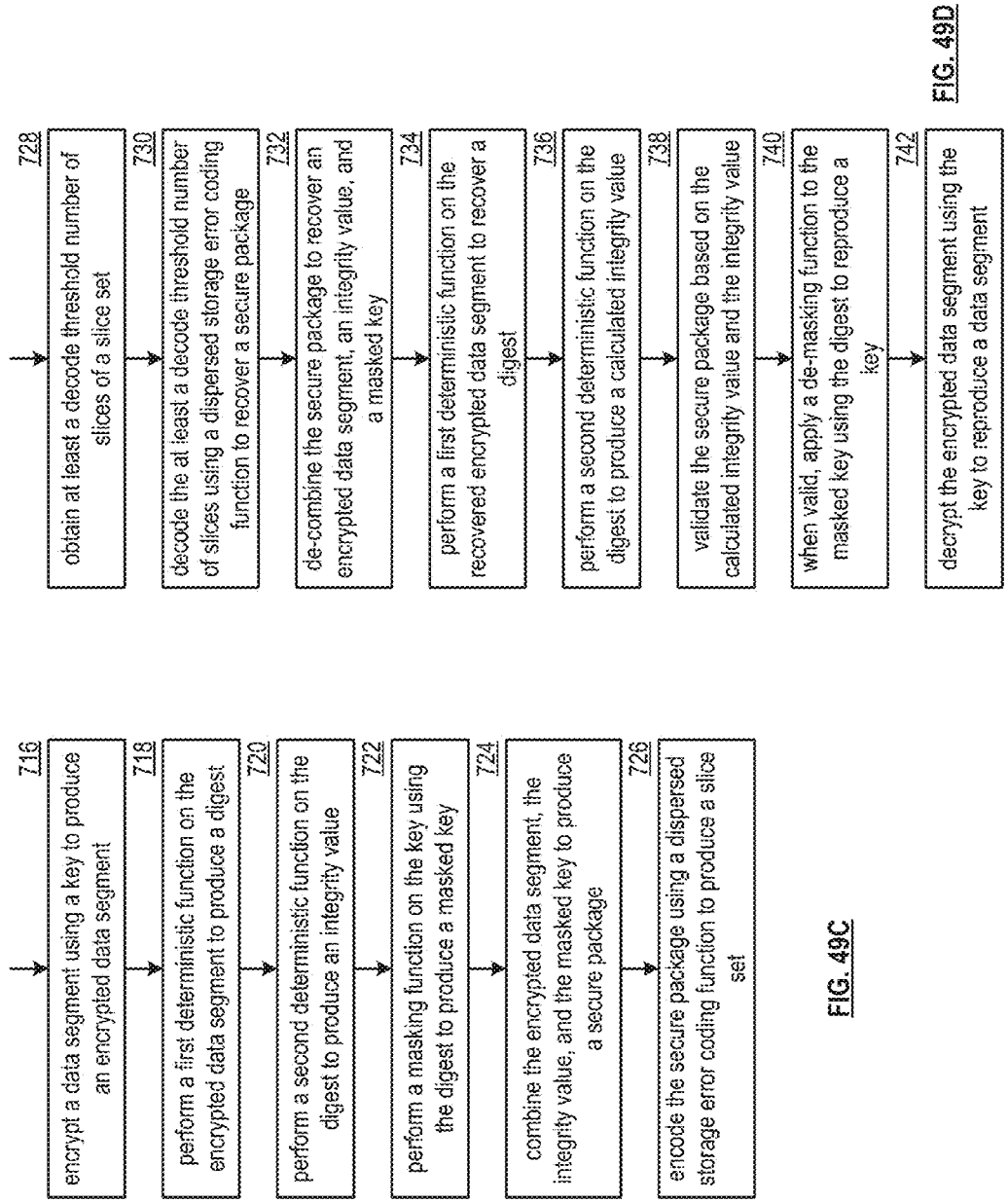

TEMPORARILY STORING DATA IN A DISPERSED STORAGE NETWORK

CROSS REFERENCE TO RELATED PATENTS

The present U.S. Utility Patent Application claims priority pursuant to 35 U.S.C. §119(e) to U.S. Provisional Application No. 61/769,588, entitled "CONFIRMING INTEGRITY OF DATA IN A DISPERSED STORAGE NETWORK," filed Feb. 26, 2013, which is hereby incorporated herein by reference in its entirety and made part of the present U.S. Utility Patent Application for all purposes.

The present U.S. Utility Patent Application also claims priority pursuant to 35 U.S.C. §120 as a continuation-in-part of U.S. Utility application Ser. No. 12/838,407, entitled "DISTRIBUTED STORAGE REVISION ROLLBACKS", filed Jul. 16, 2010, issued as U.S. Pat. No. 9,015,431 on Apr. 21, 2015, which claims priority pursuant to 35 U.S.C. §119(e) to U.S. Provisional Application No. 61/656,226, entitled "DISTRIBUTED STORAGE NETWORK DATA REVISION CONTROL", filed Oct. 29, 2009, both of which are hereby incorporated herein by reference in their entirety and made part of the present U.S. Utility Patent Application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Technical Field of the Invention

This invention relates generally to computer networks and more particularly to dispersed storage of data and distributed task processing of data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 24 is a schematic block diagram of an example of a storage operation of a DST execution unit in accordance with the present invention;

FIG. 32 is a diagram of an example of DST allocation information for the example of FIG. 30 in accordance with the present invention;

FIGS. 33-38 are schematic block diagrams of the DSTN module performing the example of FIG. 30 in accordance with the present invention;

FIG. 39 is a diagram of an example of combining result information into final results for the example of FIG. 30 in accordance with the present invention;

Figure 44A:
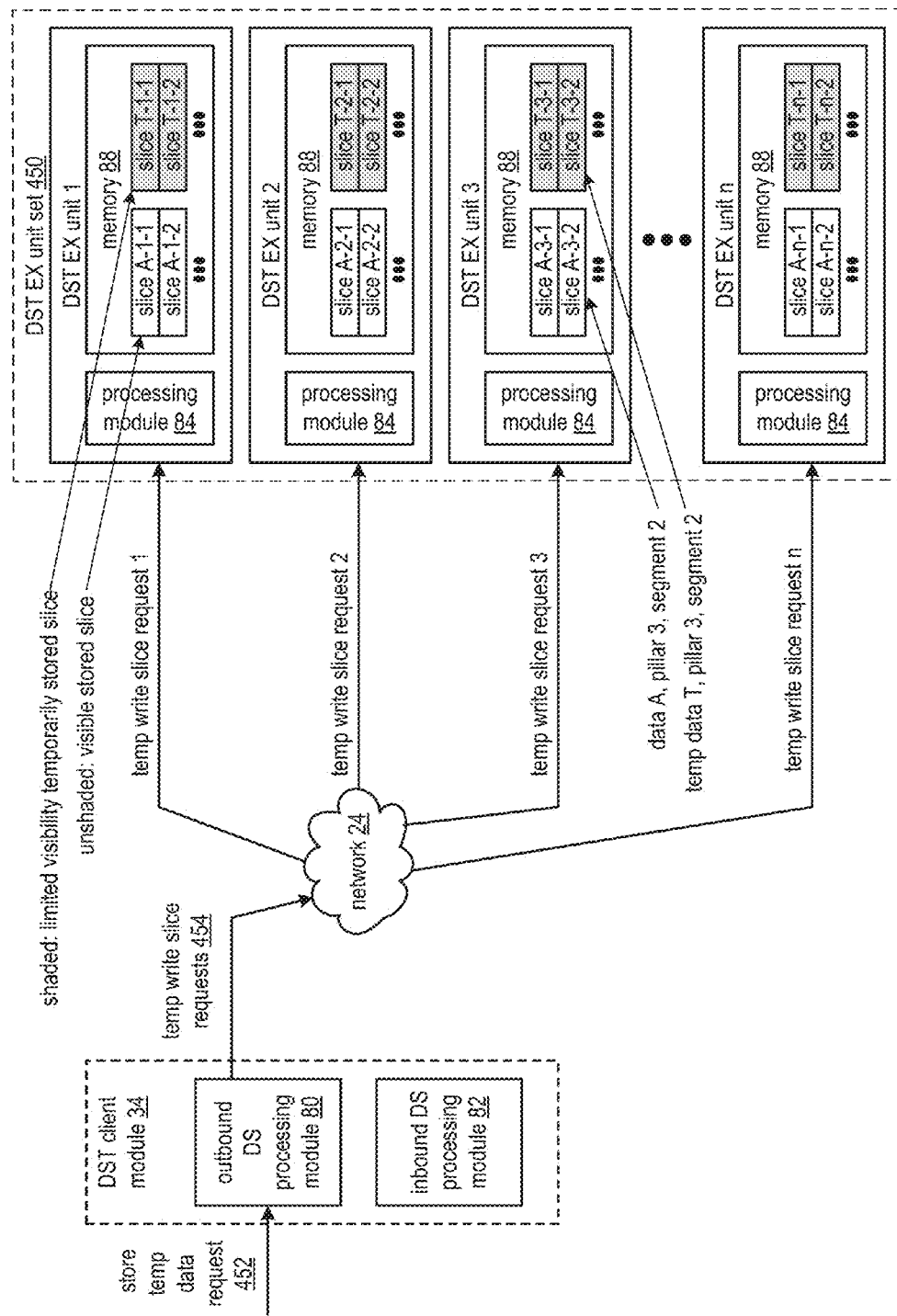
Figure 44B:
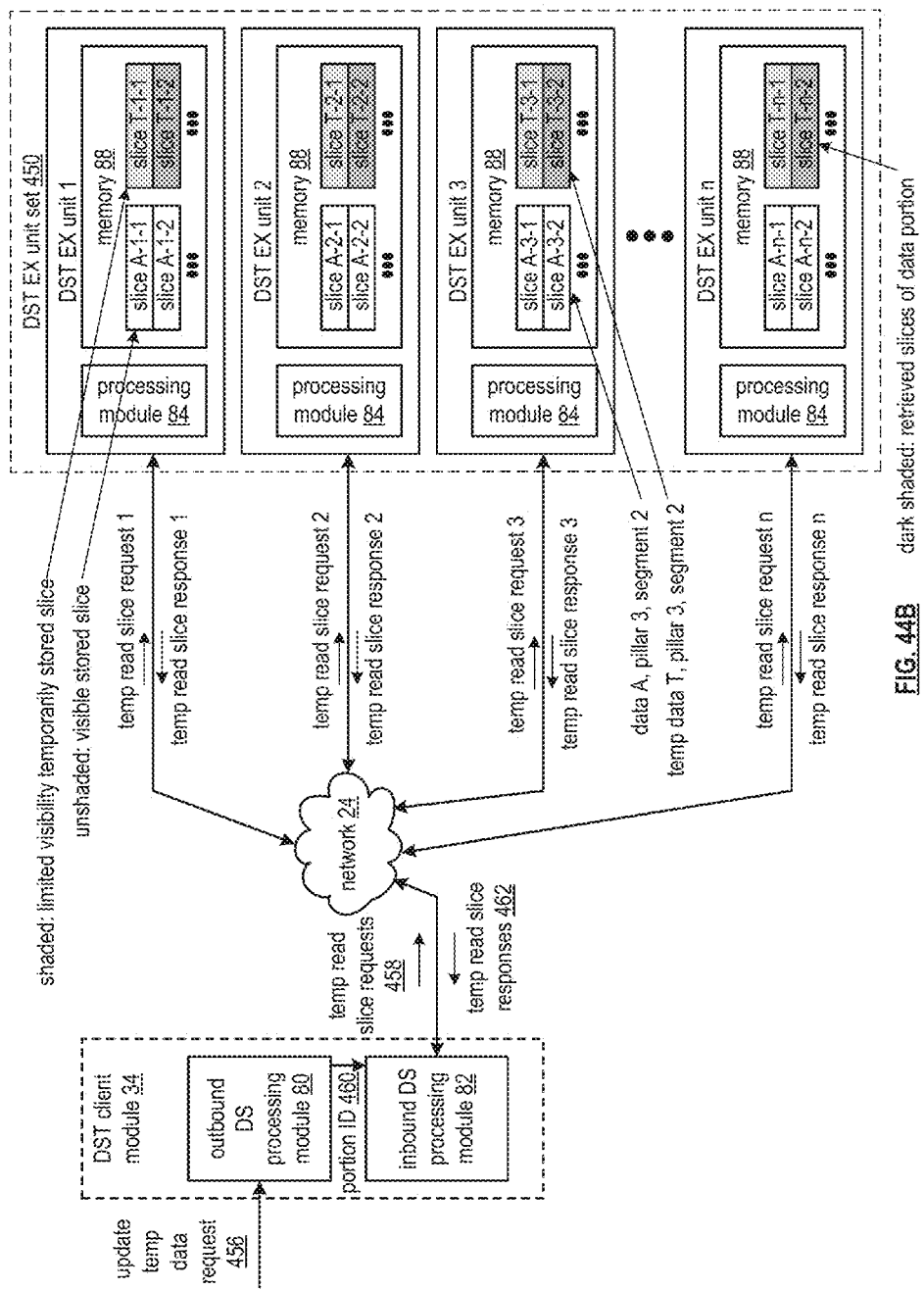
Figure 44C:
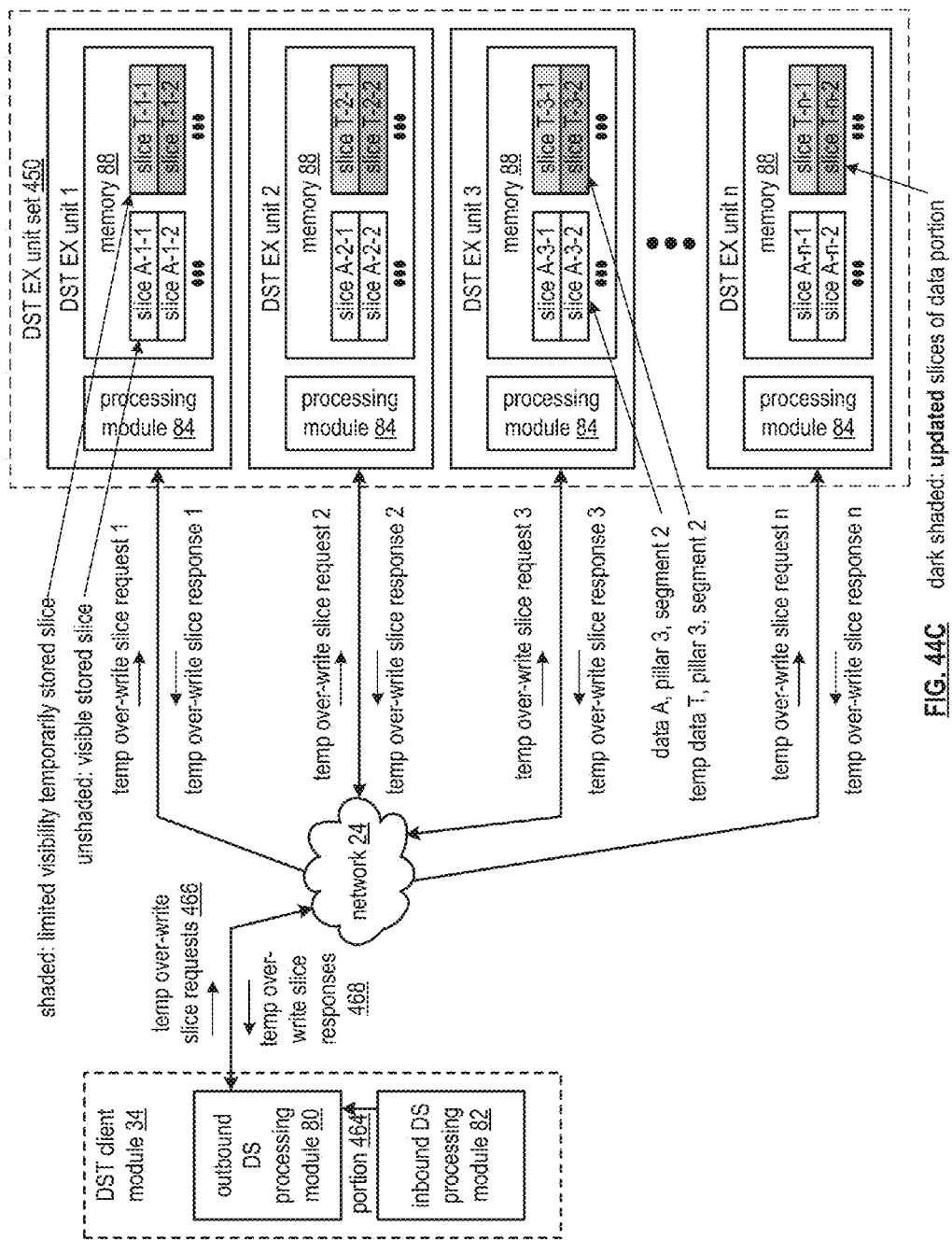
Figure 44D:
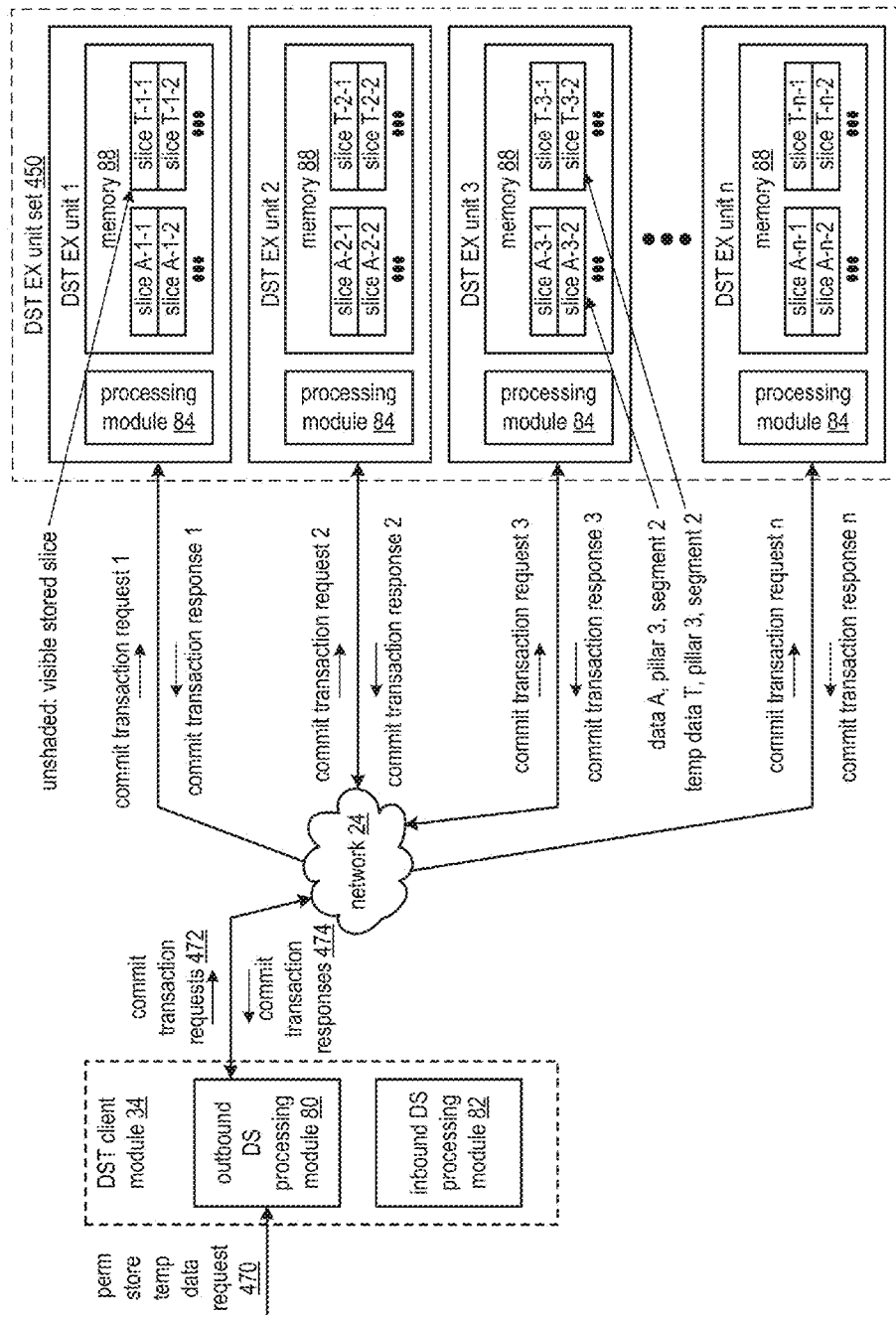
Figure 44E:
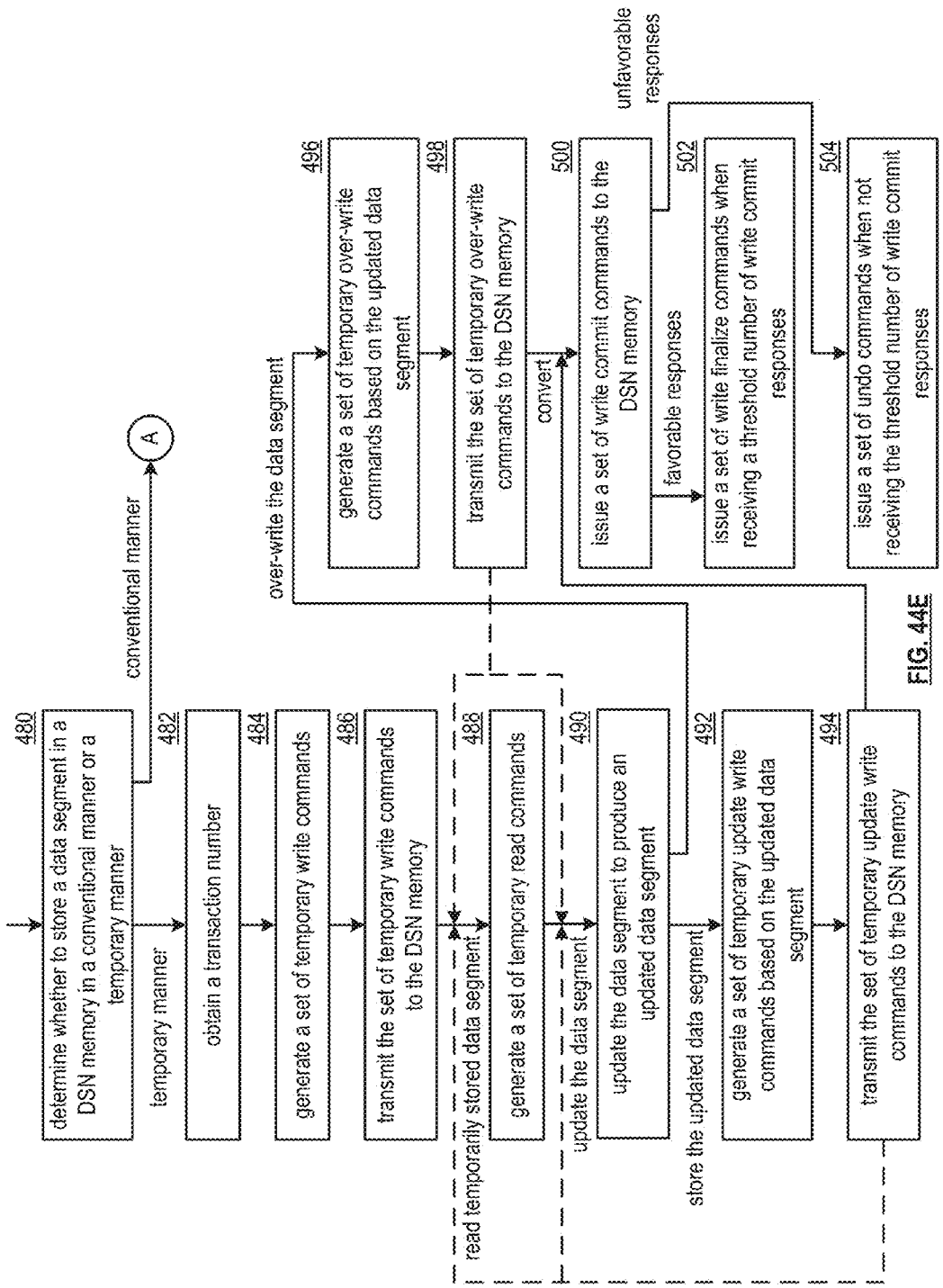
Figure 44F:
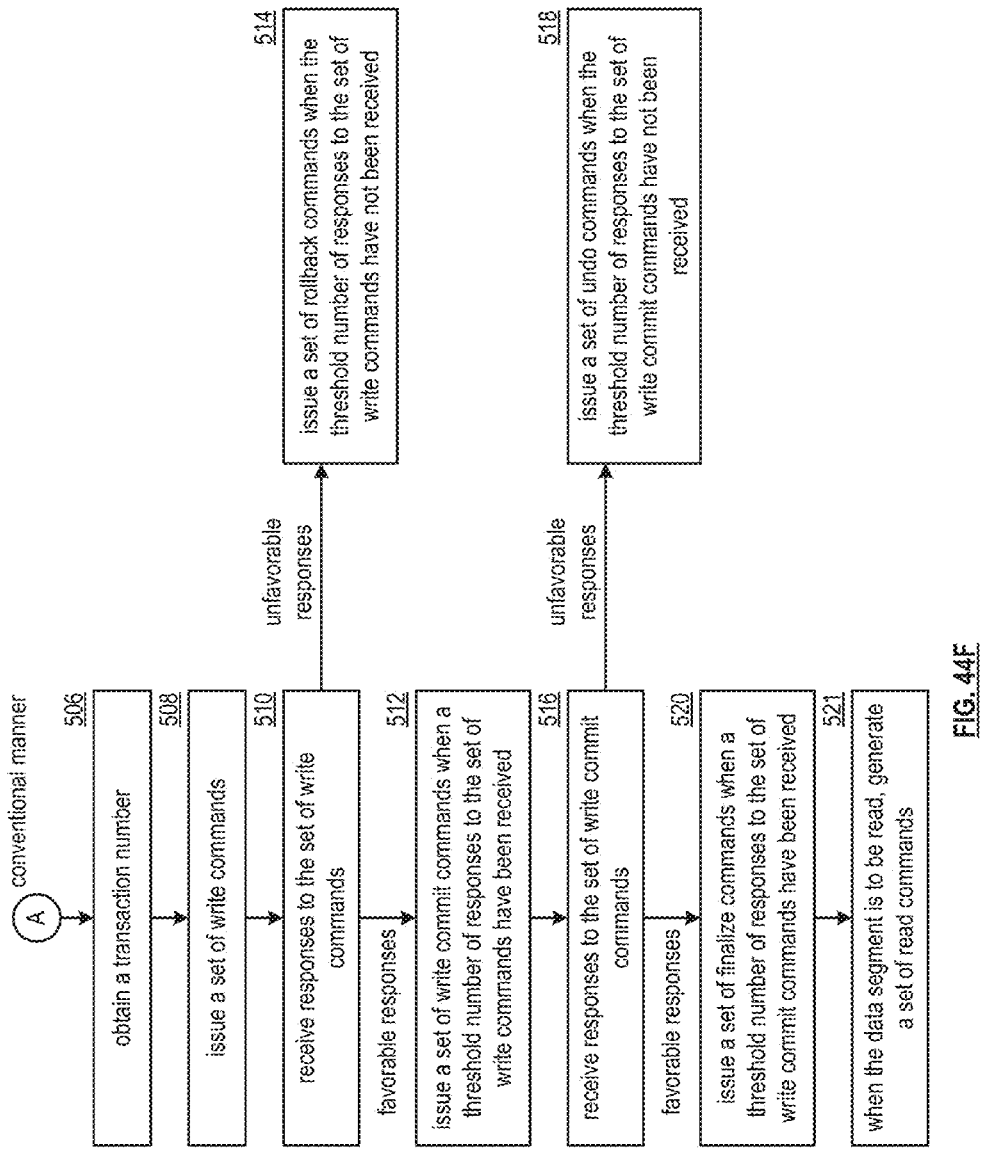
Figure 44G:
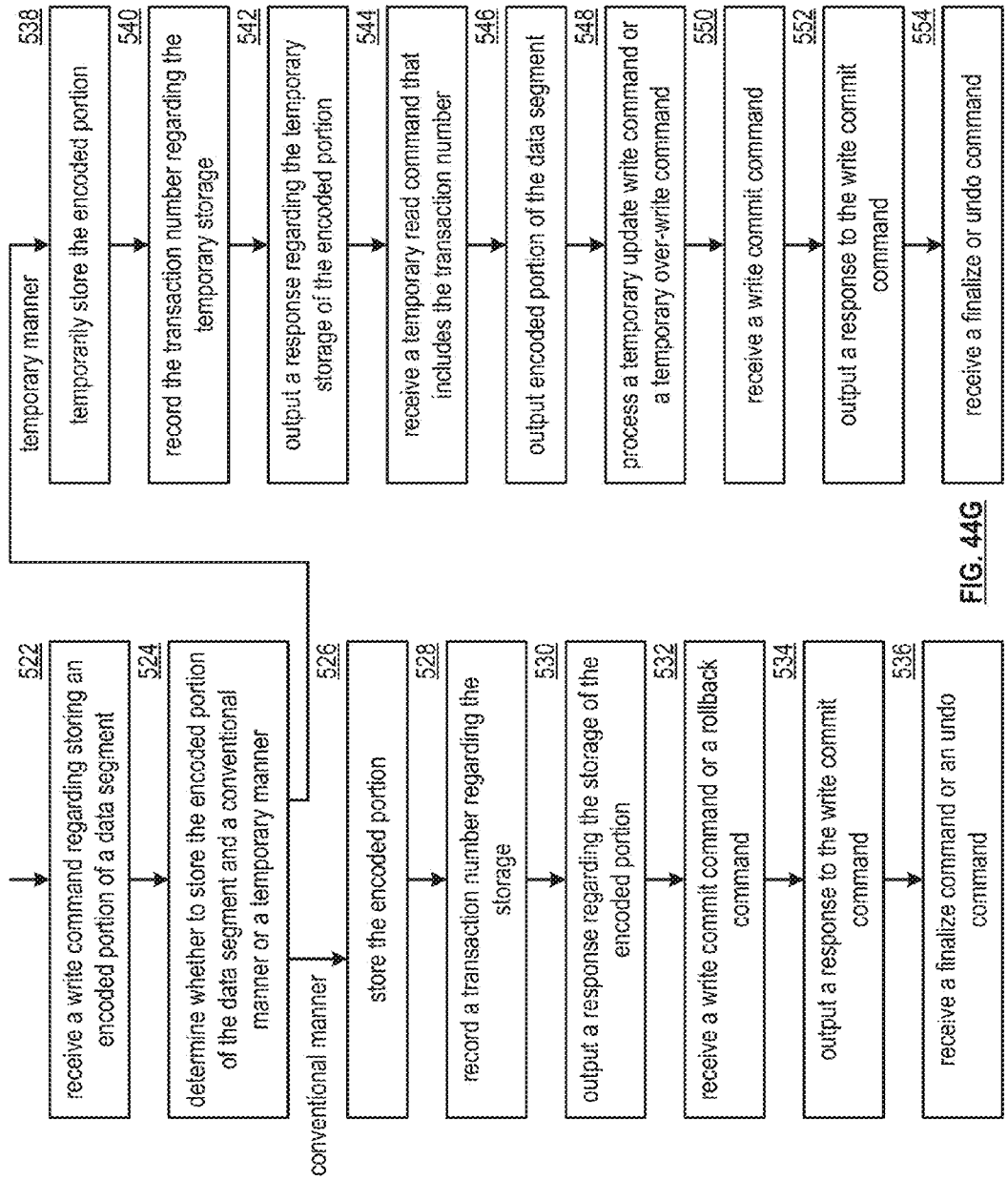
Figure 45A:
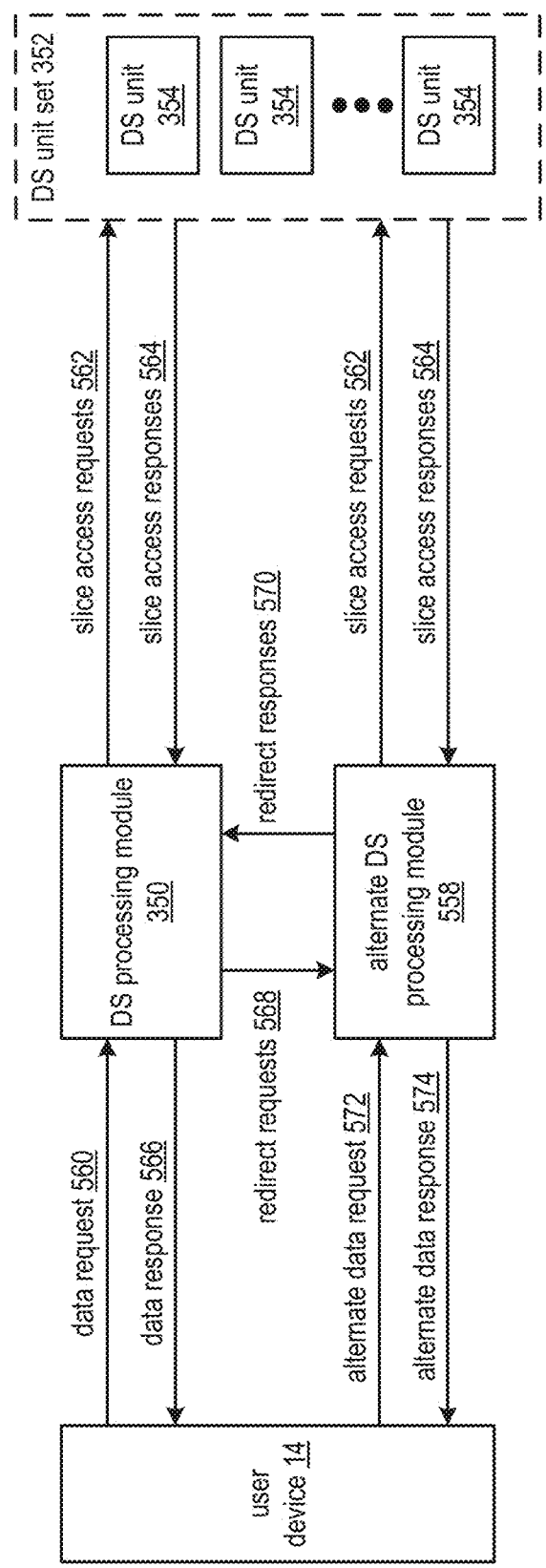
Figure 45B:
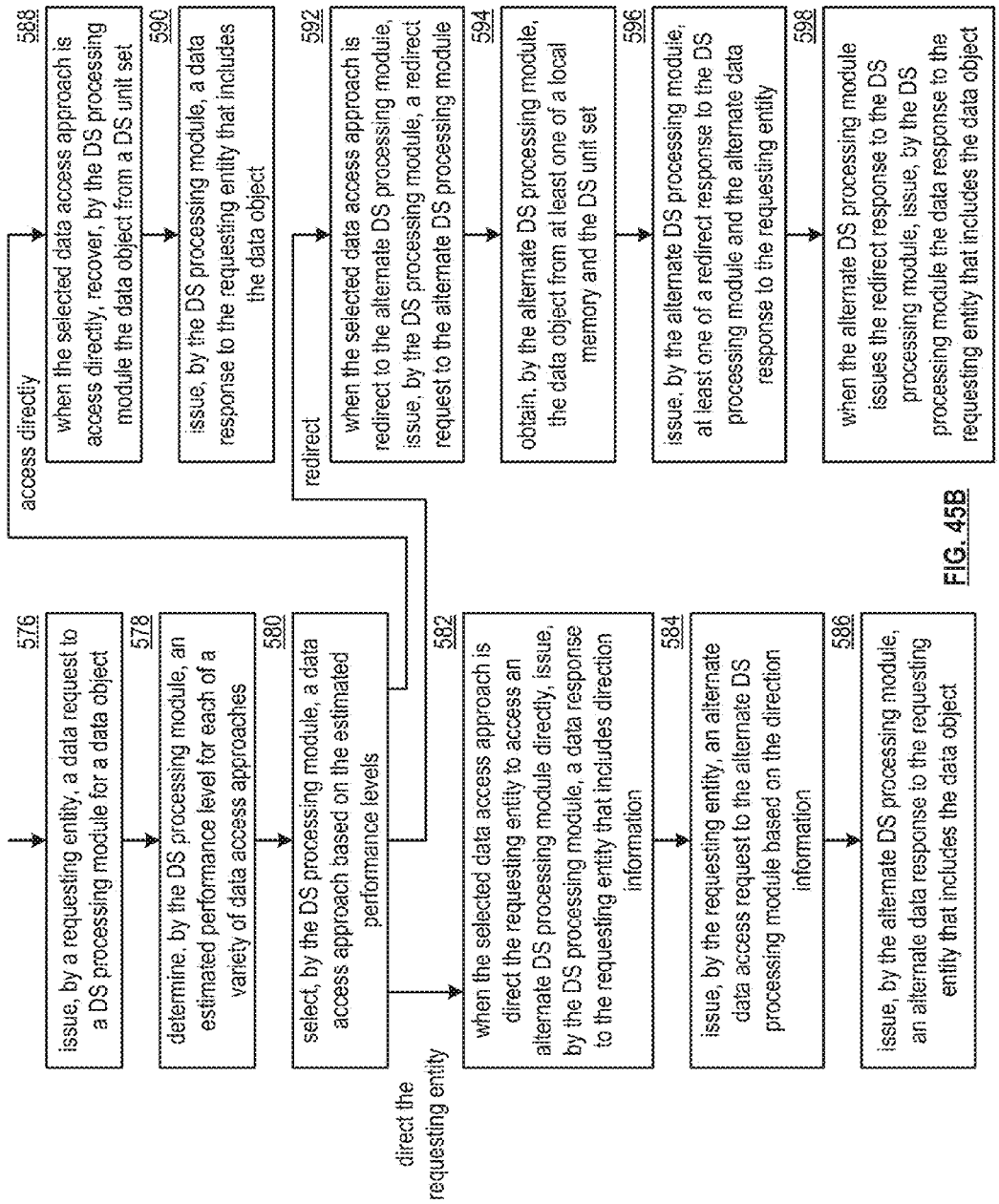
Figure 46A:
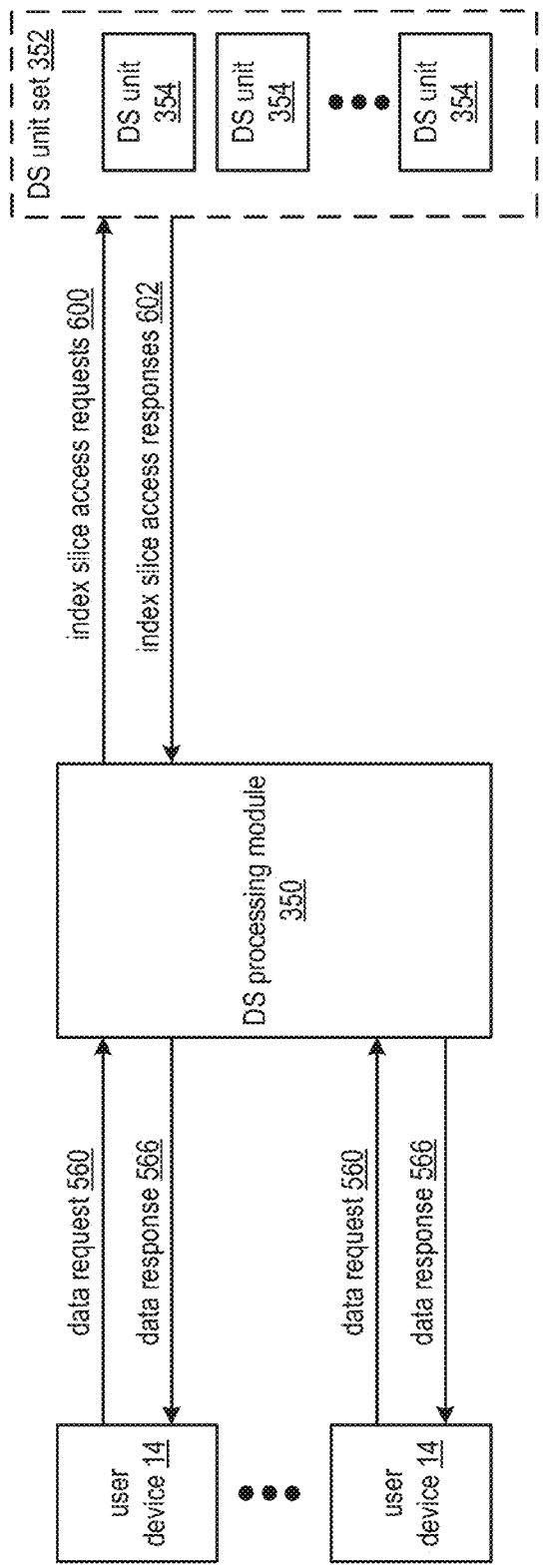
Figure 46B:
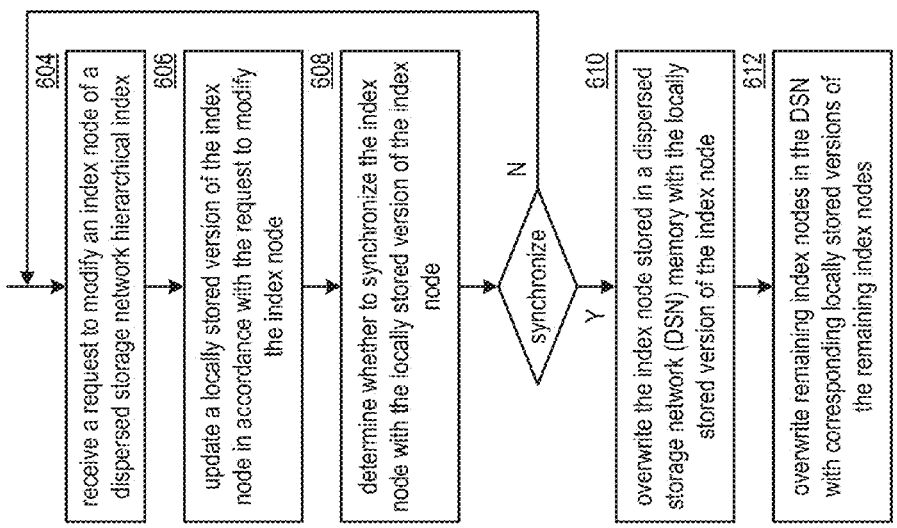
Figure 47A:
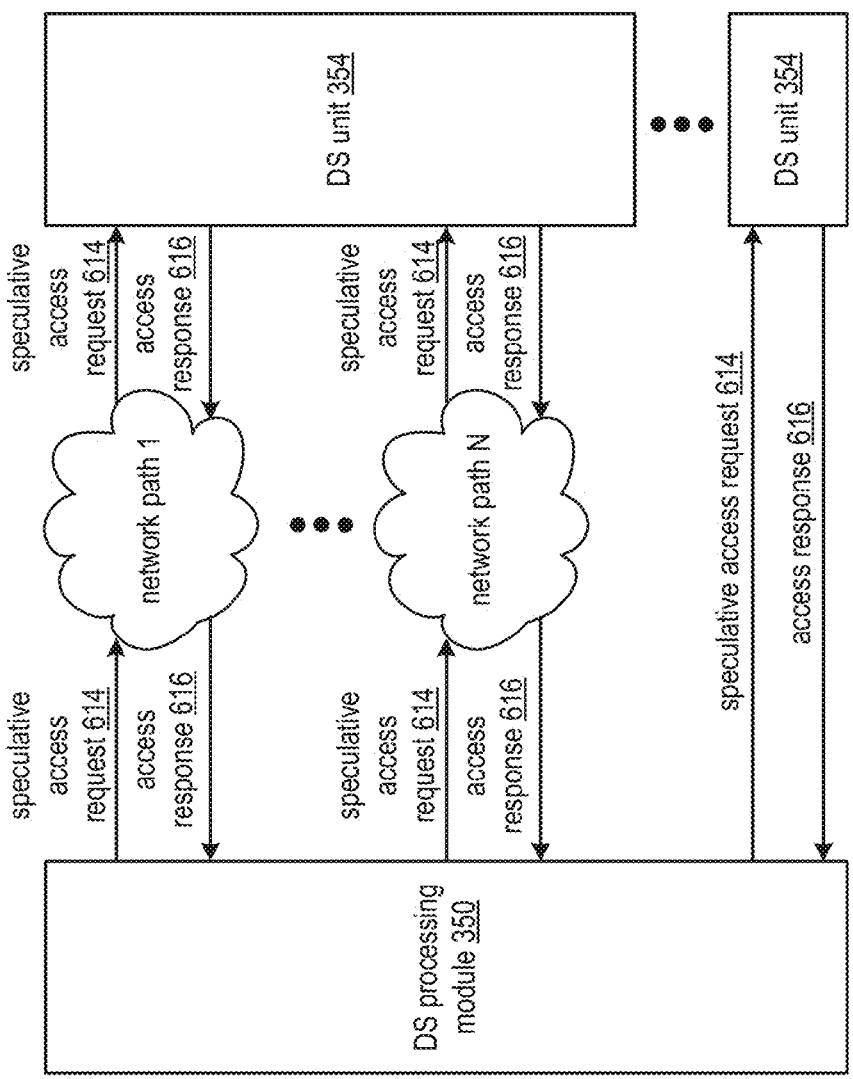
Figure 47B:
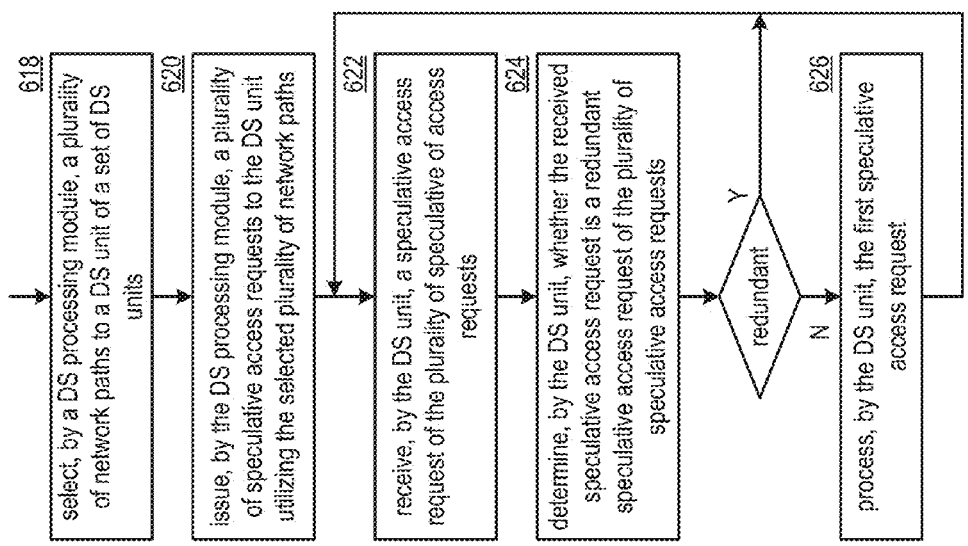
Figure 49A:
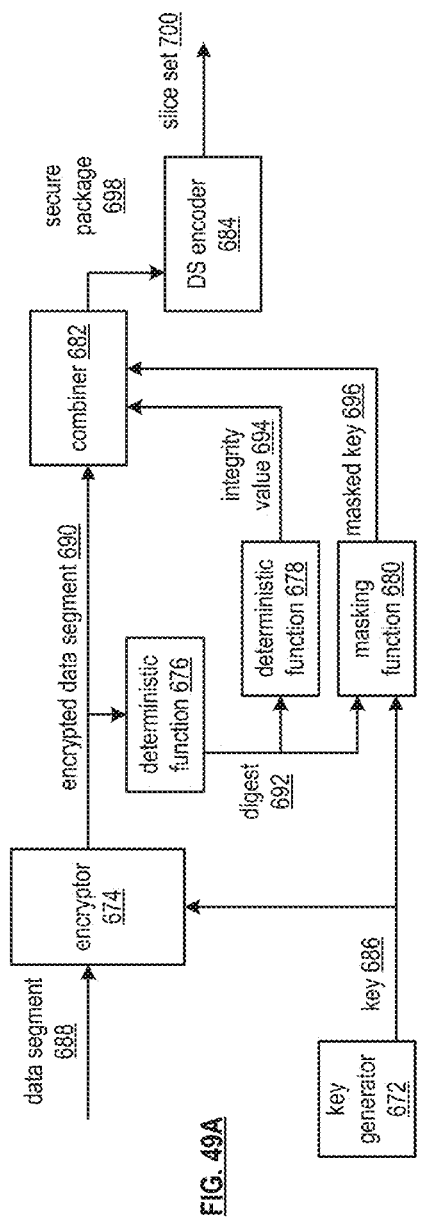
Figure 49B:
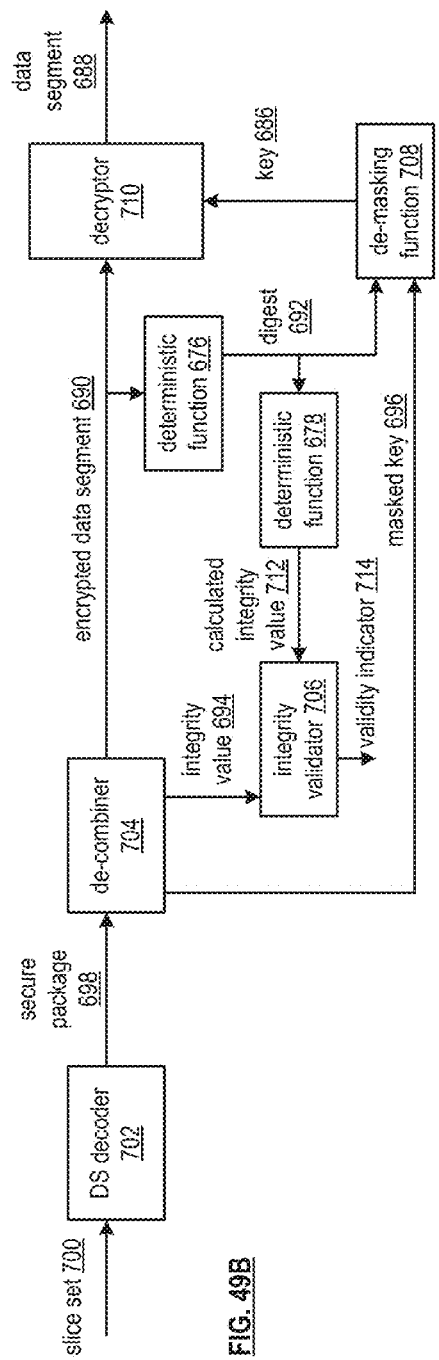

FIGS. 44A-D are schematic block diagrams of another embodiment of a dispersed storage network in accordance with the present invention;

FIG. 44E is a flowchart illustrating an example of temporarily storing data in accordance with the present invention;

FIG. 44F is a flowchart illustrating an example of storing data in a conventional manner in accordance with the present invention;

FIG. 44G is a flowchart illustrating another example of temporarily storing data in accordance with the present invention;

FIG. 45A is a schematic block diagram of another embodiment of a dispersed storage network in accordance with the present invention;

FIG. 45B is a flowchart illustrating an example of redirecting a data access request in accordance with the present invention;

FIG. 46A is a schematic block diagram of another embodiment of a dispersed storage network in accordance with the present invention;

FIG. 46B is a flowchart illustrating an example of updating a dispersed storage network hierarchical index in accordance with the present invention;

FIG. 47A is a schematic block diagram of another embodiment of a dispersed storage network in accordance with the present invention;

FIG. 47B is a flowchart illustrating another example of accessing a dispersed storage unit in accordance with the present invention;

FIG. 48A is a schematic block diagram of an embodiment of a data encoding system in accordance with the present invention;

FIG. 48B is a schematic block diagram of an embodiment of a data decoding system in accordance with the present invention;

FIG. 48C is a flowchart illustrating an example of storing data in accordance with the present invention;

FIG. 48D is a flowchart illustrating an example of retrieving data in accordance with the present invention;

FIG. 49A is a schematic block diagram of another embodiment of a data encoding system in accordance with the present invention;

FIG. 49B is a schematic block diagram of another embodiment of a data decoding system in accordance with the present invention;

FIG. 49C is a flowchart illustrating an example of encoding data in accordance with the present invention; and FIG. 49D is a flowchart illustrating an example of decoding data in accordance with the present invention.

DETAILED DESCRIPTION OF THE INVENTION

Figure 1:
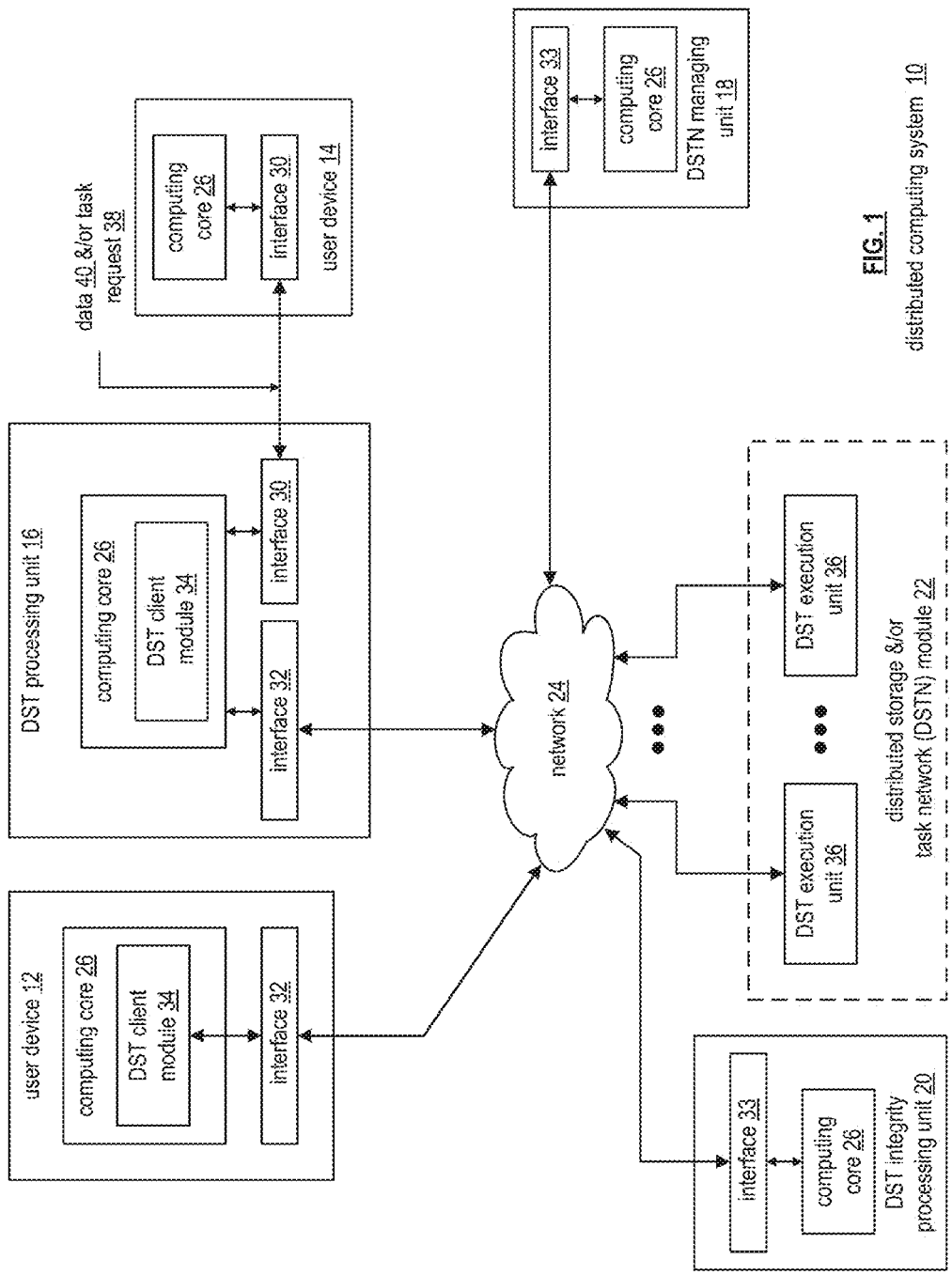
FIG. 1 is a schematic block diagram of an embodiment of a distributed computing system in accordance with the present invention.

FIG. 1 is a schematic block diagram of an embodiment of a distributed computing system 10 that includes a user device 12 and/or a user device 14, a distributed storage and/or task (DST) processing unit 16, a distributed storage and/or task network (DSTN) managing unit 18, a DST integrity processing unit 20, and a distributed storage and/or task network (DSTN) module 22. The components of the distributed computing system 10 are coupled via a network 24, which may include one or more wireless and/or wire lined communication systems; one or more private intranet systems and/or public internet systems; and/or one or more local area networks (LAN) and/or wide area networks (WAN).

The DSTN module 22 includes a plurality of distributed storage and/or task (DST) execution units 36 that may be located at geographically different sites (e.g., one in Chicago, one in Milwaukee, etc.). Each of the DST execution units is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc.

Each of the user devices 12-14, the DST processing unit 16, the DSTN managing unit 18, and the DST integrity processing unit 20 include a computing core 26 and may be a portable computing device and/or a fixed computing device. A portable computing device may be a social networking device, a gaming device, a cell phone, a smart phone, a personal digital assistant, a digital music player, a digital video player, a laptop computer, a handheld computer, a tablet, a video game controller, and/or any other portable device that includes a computing core. A fixed computing device may be a personal computer (PC), a computer server, a cable set-top box, a satellite receiver, a television set, a printer, a fax machine, home entertainment equipment, a video game console, and/or any type of home or office computing equipment. User device 12 and DST processing unit 16 are configured to include a DST client module 34.

With respect to interfaces, each interface 30, 32, and 33 includes software and/or hardware to support one or more communication links via the network 24 indirectly and/or directly. For example, interface 30 supports a communication link (e.g., wired, wireless, direct, via a LAN, via the network 24, etc.) between user device 14 and the DST processing unit 16. As another example, interface 32 supports communication links (e.g., a wired connection, a wireless connection, a LAN connection, and/or any other type of connection to/from the network 24) between user device 12 and the DSTN module 22 and between the DST processing unit 16 and the DSTN module 22. As yet another example, interface 33 supports a communication link for each of the DSTN managing unit 18 and DST integrity processing unit 20 to the network 24.

The distributed computing system 10 is operable to support dispersed storage (DS) error encoded data storage and retrieval, to support distributed task processing on received data, and/or to support distributed task processing on stored data. In general and with respect to DS error encoded data storage and retrieval, the distributed computing system 10 supports three primary operations: storage management, data storage and retrieval (an example of which will be discussed with reference to FIGS. 20-26), and data storage integrity verification. In accordance with these three primary functions, data can be encoded, distributedly stored in physically different locations, and subsequently retrieved in a reliable and secure manner. Such a system is tolerant of a significant number of failures (e.g., up to a failure level, which may be greater than or equal to a pillar width minus a decode threshold minus one) that may result from individual storage device failures and/or network equipment failures without loss of data and without the need for a redundant or backup copy. Further, the system allows the data to be stored for an indefinite period of time without data loss and does so in a secure manner (e.g., the system is very resistant to attempts at hacking the data).

The second primary function (i.e., distributed data storage and retrieval) begins and ends with a user device 12-14. For instance, if a second type of user device 14 has data 40 to store in the DSTN module 22, it sends the data 40 to the DST processing unit 16 via its interface 30. The interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data 40.

To support storage management, the DSTN managing unit 18 performs DS management services. One such DS management service includes the DSTN managing unit 18 establishing distributed data storage parameters (e.g., vault creation, distributed storage parameters, security parameters, billing information, user profile information, etc.) for a user device 12-14 individually or as part of a group of user devices. For example, the DSTN managing unit 18 coordinates creation of a vault (e.g., a virtual memory block) within memory of the DSTN module 22 for a user device, a group of devices, or for public access and establishes per vault dispersed storage (DS) error encoding parameters for a vault. The DSTN managing unit 18 may facilitate storage of DS error encoding parameters for each vault of a plurality of vaults by updating registry information for the distributed computing system 10. The facilitating includes storing updated registry information in one or more of the DSTN module 22, the user device 12, the DST processing unit 16, and the DST integrity processing unit 20.

The DS error encoding parameters (e.g., or dispersed storage error coding parameters) include data segmenting information (e.g., how many segments data (e.g., a file, a group of files, a data block, etc.) is divided into), segment security information (e.g., per segment encryption, compression, integrity checksum, etc.), error coding information (e.g., pillar width, decode threshold, read threshold, write threshold, etc.), slicing information (e.g., the number of encoded data slices that will be created for each data segment); and slice security information (e.g., per encoded data slice encryption, compression, integrity checksum, etc.).

The DSTN managing unit 18 creates and stores user profile information (e.g., an access control list (ACL)) in local memory and/or within memory of the DSTN module 22. The user profile information includes authentication information, permissions, and/or the security parameters. The security parameters may include encryption/decryption scheme, one or more encryption keys, key generation scheme, and/or data encoding/decoding scheme.

The DSTN managing unit 18 creates billing information for a particular user, a user group, a vault access, public vault access, etc. For instance, the DSTN managing unit 18 tracks the number of times a user accesses a private vault and/or public vaults, which can be used to generate a per-access billing information. In another instance, the DSTN managing unit 18 tracks the amount of data stored and/or retrieved by a user device and/or a user group, which can be used to generate a per-data-amount billing information.

Another DS management service includes the DSTN managing unit 18 performing network operations, network administration, and/or network maintenance. Network operations includes authenticating user data allocation requests (e.g., read and/or write requests), managing creation of vaults, establishing authentication credentials for user devices, adding/deleting components (e.g., user devices, DST execution units, and/or DST processing units) from the distributed computing system 10, and/or establishing authentication credentials for DST execution units 36. Network administration includes monitoring devices and/or units for failures, maintaining vault information, determining device and/or unit activation status, determining device and/or unit loading, and/or determining any other system level operation that affects the performance level of the system 10. Network maintenance includes facilitating replacing, upgrading, repairing, and/or expanding a device and/or unit of the system 10.

To support data storage integrity verification within the distributed computing system 10, the DST integrity processing unit 20 performs rebuilding of 'bad' or missing encoded data slices. At a high level, the DST integrity processing unit 20 performs rebuilding by periodically attempting to retrieve/list encoded data slices, and/or slice names of the encoded data slices, from the DSTN module 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in memory of the DSTN module 22. Note that the DST integrity processing unit 20 may be a separate unit as shown, it may be included in the DSTN module 22, it may be included in the DST processing unit 16, and/or distributed among the DST execution units 36.

To support distributed task processing on received data, the distributed computing system 10 has two primary operations: DST (distributed storage and/or task processing) management and DST execution on received data (an example of which will be discussed with reference to FIGS. 3-19). With respect to the storage portion of the DST management, the DSTN managing unit 18 functions as previously described. With respect to the tasking processing of the DST management, the DSTN managing unit 18 performs distributed task processing (DTP) management services. One such DTP management service includes the DSTN managing unit 18 establishing DTP parameters (e.g., user-vault affiliation information, billing information, user-task information, etc.) for a user device 12-14 individually or as part of a group of user devices.

Another DTP management service includes the DSTN managing unit 18 performing DTP network operations, network administration (which is essentially the same as described above), and/or network maintenance (which is essentially the same as described above). Network operations include, but are not limited to, authenticating user task processing requests (e.g., valid request, valid user, etc.), authenticating results and/or partial results, establishing DTP authentication credentials for user devices, adding/deleting components (e.g., user devices, DST execution units, and/or DST processing units) from the distributed computing system, and/or establishing DTP authentication credentials for DST execution units.

To support distributed task processing on stored data, the distributed computing system 10 has two primary operations: DST (distributed storage and/or task) management and DST execution on stored data. With respect to the DST execution on stored data, if the second type of user device 14 has a task request 38 for execution by the DSTN module 22, it sends the task request 38 to the DST processing unit 16 via its interface 30. An example of DST execution on stored data will be discussed in greater detail with reference to FIGS. 27-39. With respect to the DST management, it is substantially similar to the DST management to support distributed task processing on received data.

Figure 2:
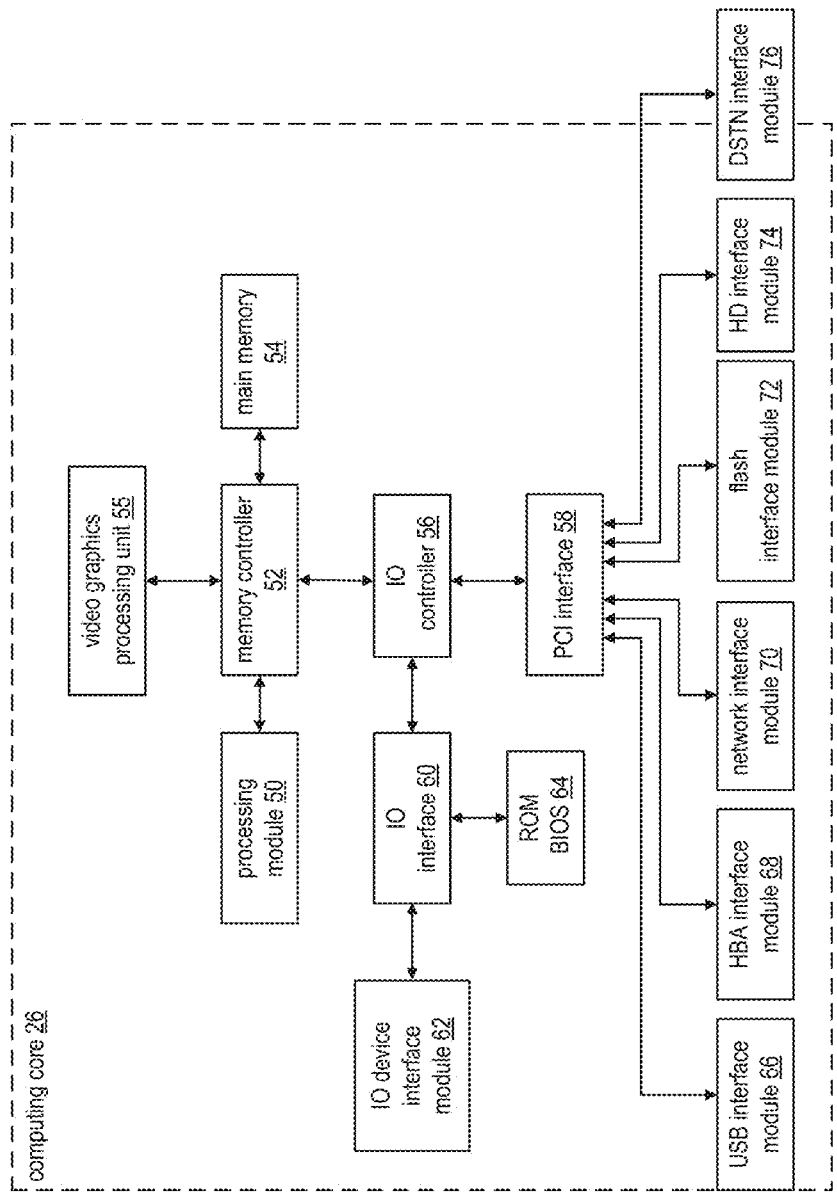
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSTN interface module 76.

The DSTN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSTN interface module 76 and/or the network interface module 70 may function as the interface 30 of the user device 14 of FIG. 1. Further note that the 10 device interface module 62 and/or the memory interface modules may be collectively or individually referred to as IO ports.

Figure 3:
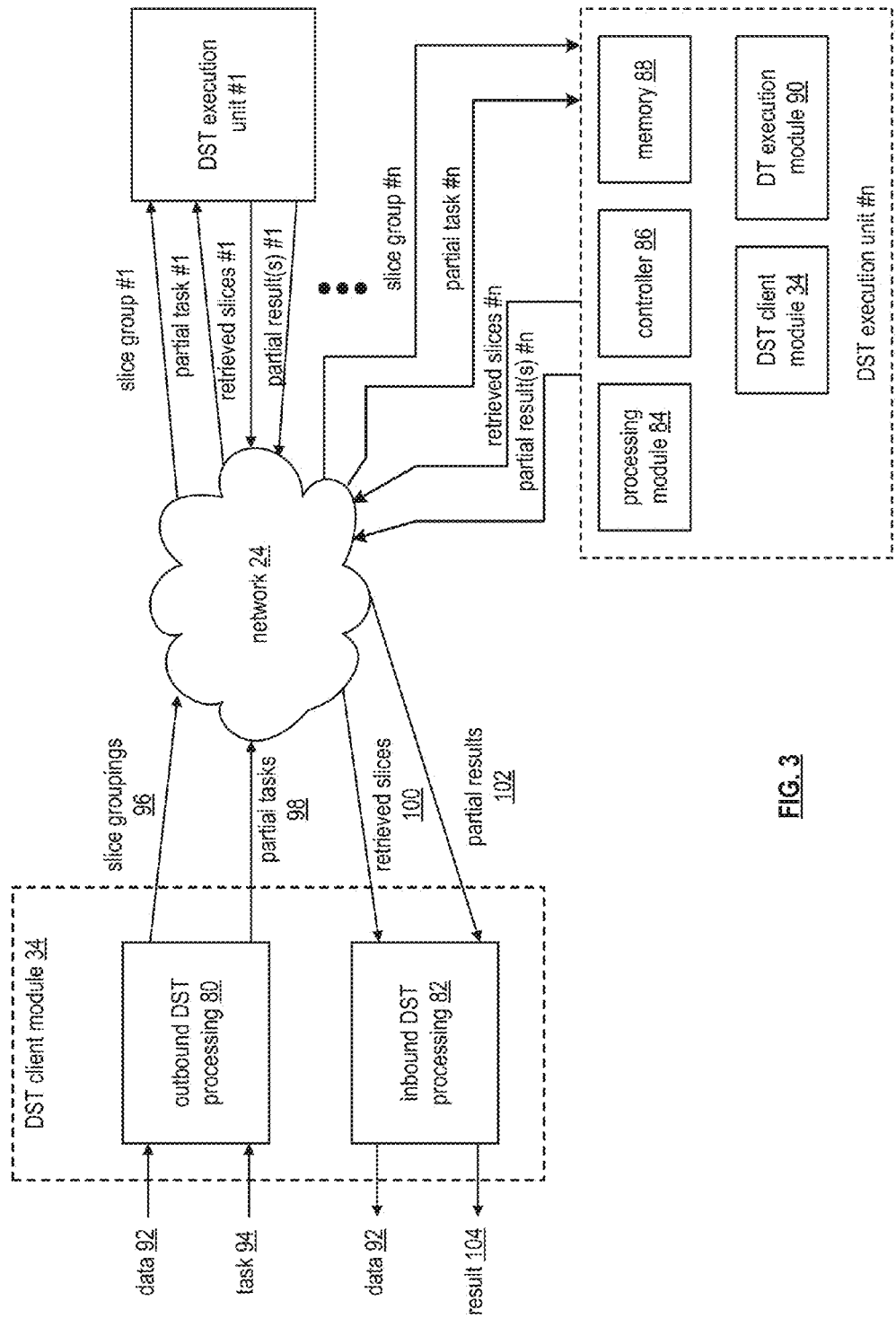
FIG. 3 is a diagram of an example of a distributed storage and task processing in accordance with the present invention.

FIG. 3 is a diagram of an example of the distributed computing system performing a distributed storage and task processing operation. The distributed computing system includes a DST (distributed storage and/or task) client module 34 (which may be in user device 14 and/or in DST processing unit 16 of FIG. 1), a network 24, a plurality of DST execution units 1-n that includes two or more DST execution units 36 of FIG. 1 (which form at least a portion of DSTN module 22 of FIG. 1), a DST managing module (not shown), and a DST integrity verification module (not shown). The DST client module 34 includes an outbound DST processing section 80 and an inbound DST processing section 82. Each of the DST execution units 1-n includes a controller 86, a processing module 84, memory 88, a DT (distributed task) execution module 90, and a DST client module 34.

In an example of operation, the DST client module 34 receives data 92 and one or more tasks 94 to be performed upon the data 92. The data 92 may be of any size and of any content, where, due to the size (e.g., greater than a few Terabytes), the content (e.g., secure data, etc.), and/or task(s) (e.g., MIPS intensive), distributed processing of the task(s) on the data is desired. For example, the data 92 may be one or more digital books, a copy of a company's emails, a large-scale Internet search, a video security file, one or more entertainment video files (e.g., television programs, movies, etc.), data files, and/or any other large amount of data (e.g., greater than a few Terabytes).

Within the DST client module 34, the outbound DST processing section 80 receives the data 92 and the task(s) 94. The outbound DST processing section 80 processes the data 92 to produce slice groupings 96. As an example of such processing, the outbound DST processing section 80 partitions the data 92 into a plurality of data partitions. For each data partition, the outbound DST processing section 80 dispersed storage (DS) error encodes the data partition to produce encoded data slices and groups the encoded data slices into a slice grouping 96. In addition, the outbound DST processing section 80 partitions the task 94 into partial tasks 98, where the number of partial tasks 98 may correspond to the number of slice groupings 96.

The outbound DST processing section 80 then sends, via the network 24, the slice groupings 96 and the partial tasks 98 to the DST execution units 1-n of the DSTN module 22 of FIG. 1. For example, the outbound DST processing section 80 sends slice group 1 and partial task 1 to DST execution unit 1. As another example, the outbound DST processing section 80 sends slice group #n and partial task #n to DST execution unit #n.

Each DST execution unit performs its partial task 98 upon its slice group 96 to produce partial results 102. For example, DST execution unit #1 performs partial task #1 on slice group #1 to produce a partial result #1, for results. As a more specific example, slice group #1 corresponds to a data partition of a series of digital books and the partial task #1 corresponds to searching for specific phrases, recording where the phrase is found, and establishing a phrase count. In this more specific example, the partial result #1 includes information as to where the phrase was found and includes the phrase count.

Upon completion of generating their respective partial results 102, the DST execution units send, via the network 24, their partial results 102 to the inbound DST processing section 82 of the DST client module 34. The inbound DST processing section 82 processes the received partial results 102 to produce a result 104. Continuing with the specific example of the preceding paragraph, the inbound DST processing section 82 combines the phrase count from each of the DST execution units 36 to produce a total phrase count. In addition, the inbound DST processing section 82 combines the 'where the phrase was found' information from each of the DST execution units 36 within their respective data partitions to produce 'where the phrase was found' information for the series of digital books.

In another example of operation, the DST client module 34 requests retrieval of stored data within the memory of the DST execution units 36 (e.g., memory of the DSTN module). In this example, the task 94 is retrieve data stored in the memory of the DSTN module. Accordingly, the outbound DST processing section 80 converts the task 94 into a plurality of partial tasks 98 and sends the partial tasks 98 to the respective DST execution units 1-n.

In response to the partial task 98 of retrieving stored data, a DST execution unit 36 identifies the corresponding encoded data slices 100 and retrieves them. For example, DST execution unit #1 receives partial task #1 and retrieves, in response thereto, retrieved slices #1. The DST execution units 36 send their respective retrieved slices 100 to the inbound DST processing section 82 via the network 24.

The inbound DST processing section 82 converts the retrieved slices 100 into data 92. For example, the inbound DST processing section 82 de-groups the retrieved slices 100 to produce encoded slices per data partition. The inbound DST processing section 82 then DS error decodes the encoded slices per data partition to produce data partitions. The inbound DST processing section 82 de-partitions the data partitions to recapture the data 92.

Figure 4:
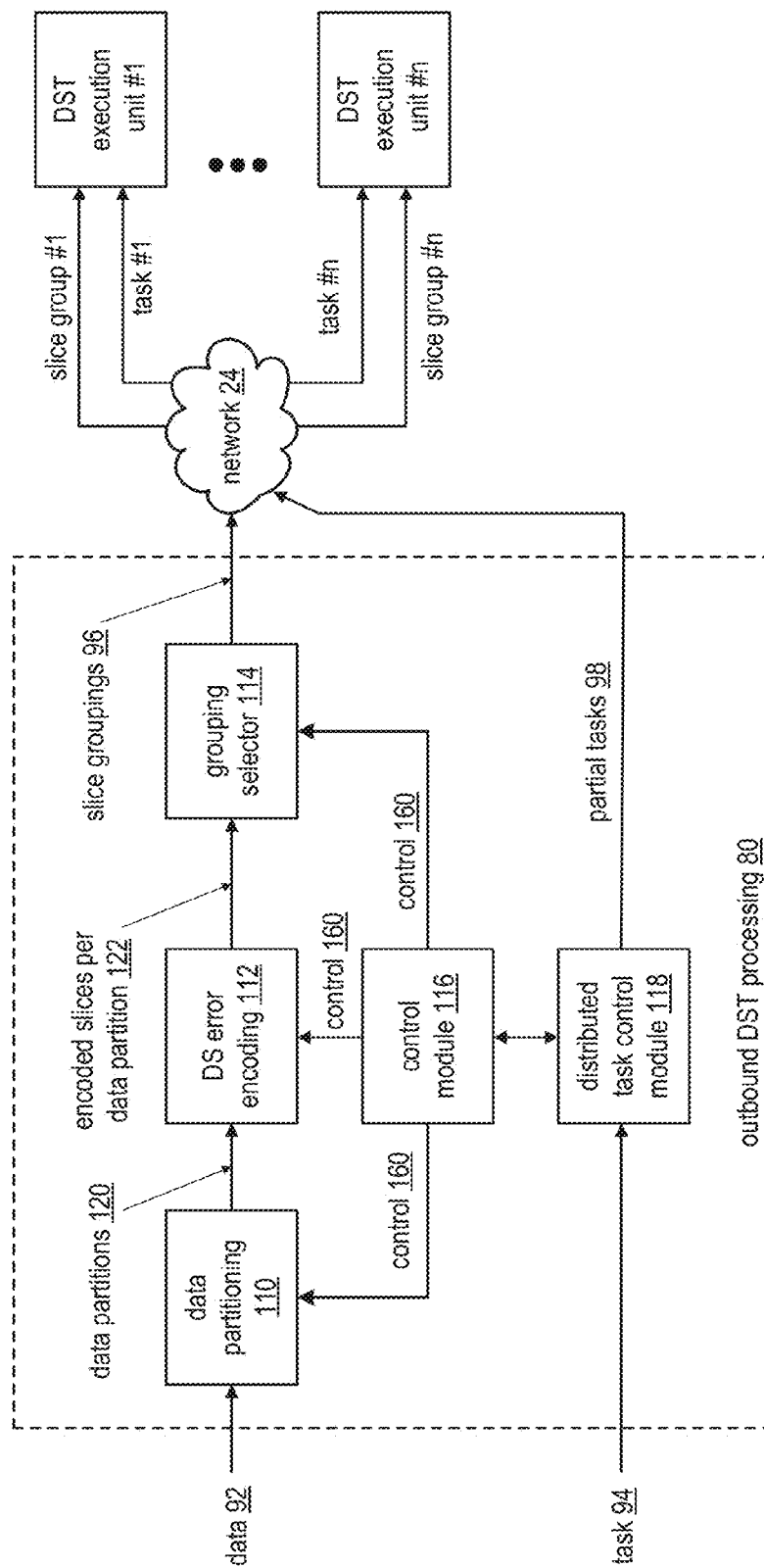
FIG. 4 is a schematic block diagram of an embodiment of an outbound distributed storage and/or task (DST) processing in accordance with the present invention.

FIG. 4 is a schematic block diagram of an embodiment of an outbound distributed storage and/or task (DST) processing section 80 of a DST client module 34 FIG. 1 coupled to a DSTN module 22 of a FIG. 1 (e.g., a plurality of n DST execution units 36) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 partitions data 92 into a plurality of data partitions 120. The number of partitions and the size of the partitions may be selected by the control module 116 via control 160 based on the data 92 (e.g., its size, its content, etc.), a corresponding task 94 to be performed (e.g., simple, complex, single step, multiple steps, etc.), DS encoding parameters (e.g., pillar width, decode threshold, write threshold, segment security parameters, slice security parameters, etc.), capabilities of the DST execution units 36 (e.g., processing resources, availability of processing recourses, etc.), and/or as may be inputted by a user, system administrator, or other operator (human or automated). For example, the data partitioning module 110 partitions the data 92 (e.g., 100 Terabytes) into 100,000 data segments, each being 1 Gigabyte in size. Alternatively, the data partitioning module 110 partitions the data 92 into a plurality of data segments, where some of data segments are of a different size, are of the same size, or a combination thereof.

The DS error encoding module 112 receives the data partitions 120 in a serial manner, a parallel manner, and/or a combination thereof. For each data partition 120, the DS error encoding module 112 DS error encodes the data partition 120 in accordance with control information 160 from the control module 116 to produce encoded data slices 122. The DS error encoding includes segmenting the data partition into data segments, segment security processing (e.g., encryption, compression, watermarking, integrity check (e.g., CRC), etc.), error encoding, slicing, and/or per slice security processing (e.g., encryption, compression, watermarking, integrity check (e.g., CRC), etc.). The control information 160 indicates which steps of the DS error encoding are active for a given data partition and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 122 of a data partition into a set of slice groupings 96. The number of slice groupings corresponds to the number of DST execution units 36 identified for a particular task 94. For example, if five DST execution units 36 are identified for the particular task 94, the grouping selector module groups the encoded slices 122 of a data partition into five slice groupings 96. The grouping selector module 114 outputs the slice groupings 96 to the corresponding DST execution units 36 via the network 24.

The distributed task control module 118 receives the task 94 and converts the task 94 into a set of partial tasks 98. For example, the distributed task control module 118 receives a task to find where in the data (e.g., a series of books) a phrase occurs and a total count of the phrase usage in the data. In this example, the distributed task control module 118 replicates the task 94 for each DST execution unit 36 to produce the partial tasks 98. In another example, the distributed task control module 118 receives a task to find where in the data a first phrase occurs, where in the data a second phrase occurs, and a total count for each phrase usage in the data. In this example, the distributed task control module 118 generates a first set of partial tasks 98 for finding and counting the first phrase and a second set of partial tasks for finding and counting the second phrase. The distributed task control module 118 sends respective first and/or second partial tasks 98 to each DST execution unit 36.

Figure 5:
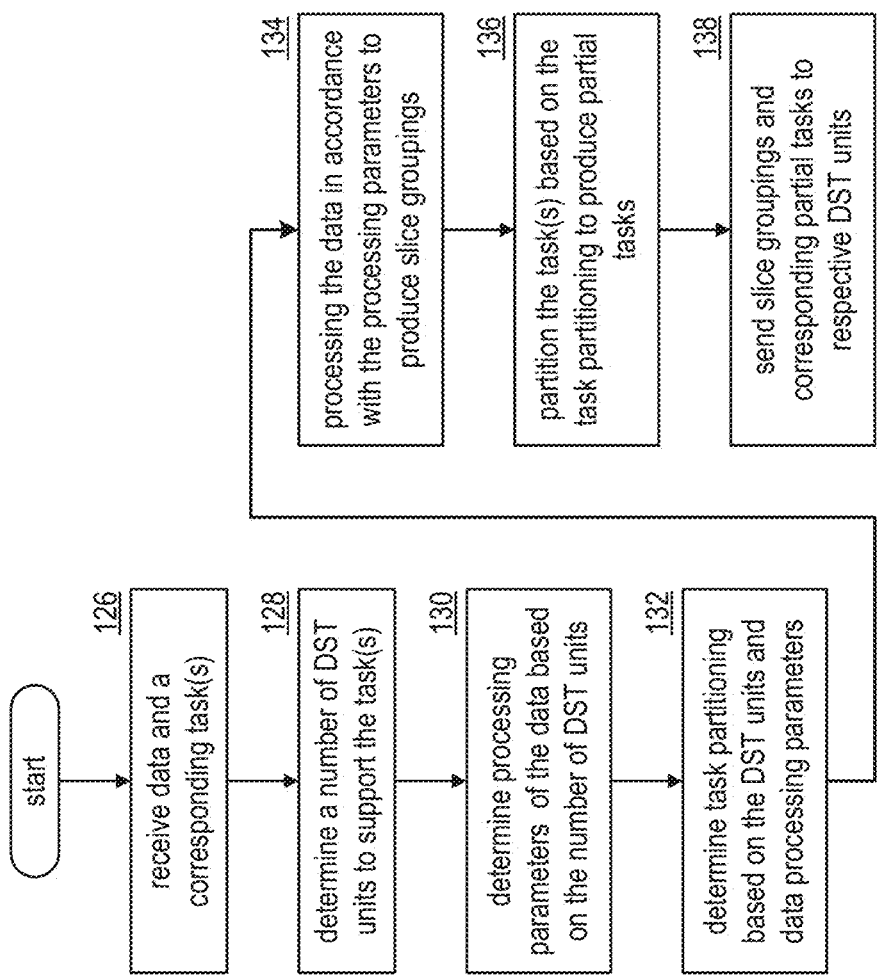
FIG. 5 is a logic diagram of an example of a method for outbound DST processing in accordance with the present invention.

FIG. 5 is a logic diagram of an example of a method for outbound distributed storage and task (DST) processing that begins at step 126 where a DST client module receives data and one or more corresponding tasks. The method continues at step 128 where the DST client module determines a number of DST units to support the task for one or more data partitions. For example, the DST client module may determine the number of DST units to support the task based on the size of the data, the requested task, the content of the data, a predetermined number (e.g., user indicated, system administrator determined, etc.), available DST units, capability of the DST units, and/or any other factor regarding distributed task processing of the data. The DST client module may select the same DST units for each data partition, may select different DST units for the data partitions, or a combination thereof.

The method continues at step 130 where the DST client module determines processing parameters of the data based on the number of DST units selected for distributed task processing. The processing parameters include data partitioning information, DS encoding parameters, and/or slice grouping information. The data partitioning information includes a number of data partitions, size of each data partition, and/or organization of the data partitions (e.g., number of data blocks in a partition, the size of the data blocks, and arrangement of the data blocks). The DS encoding parameters include segmenting information, segment security information, error encoding information (e.g., dispersed storage error encoding function parameters including one or more of pillar width, decode threshold, write threshold, read threshold, generator matrix), slicing information, and/or per slice security information. The slice grouping information includes information regarding how to arrange the encoded data slices into groups for the selected DST units. As a specific example, if the DST client module determines that five DST units are needed to support the task, then it determines that the error encoding parameters include a pillar width of five and a decode threshold of three.

The method continues at step 132 where the DST client module determines task partitioning information (e.g., how to partition the tasks) based on the selected DST units and data processing parameters. The data processing parameters include the processing parameters and DST unit capability information. The DST unit capability information includes the number of DT (distributed task) execution units, execution capabilities of each DT execution unit (e.g., MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.)), and/or any information germane to executing one or more tasks.

The method continues at step 134 where the DST client module processes the data in accordance with the processing parameters to produce slice groupings. The method continues at step 136 where the DST client module partitions the task based on the task partitioning information to produce a set of partial tasks. The method continues at step 138 where the DST client module sends the slice groupings and the corresponding partial tasks to respective DST units.

Figure 6:
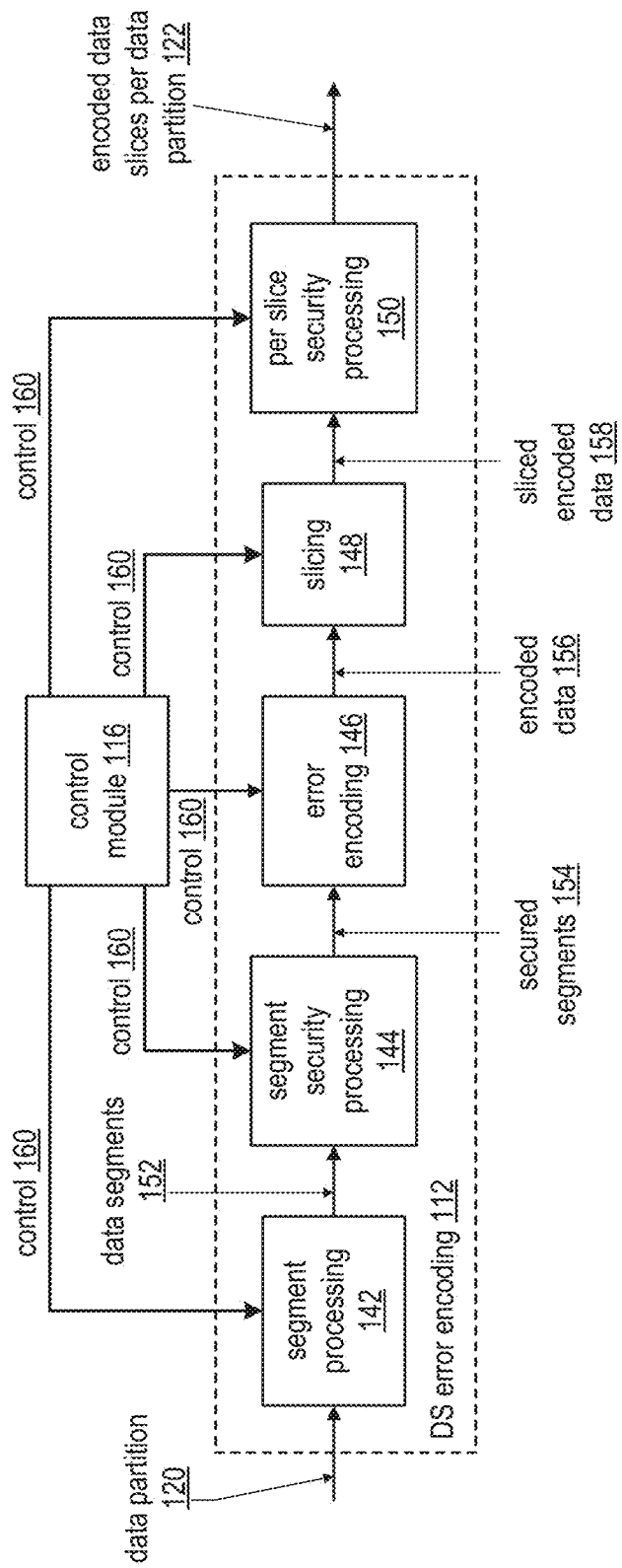
FIG. 6 is a schematic block diagram of an embodiment of a dispersed error encoding in accordance with the present invention.

FIG. 6 is a schematic block diagram of an embodiment of the dispersed storage (DS) error encoding module 112 of an outbound distributed storage and task (DST) processing section. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives a data partition 120 from a data partitioning module and receives segmenting information as the control information 160 from the control module 116. The segmenting information indicates how the segment processing module 142 is to segment the data partition 120. For example, the segmenting information indicates how many rows to segment the data based on a decode threshold of an error encoding scheme, indicates how many columns to segment the data into based on a number and size of data blocks within the data partition 120, and indicates how many columns to include in a data segment 152. The segment processing module 142 segments the data 120 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., cyclic redundancy check (CRC), etc.), and/or any other type of digital security. For example, when the segment security processing module 144 is enabled, it may compress a data segment 152, encrypt the compressed data segment, and generate a CRC value for the encrypted data segment to produce a secure data segment 154. When the segment security processing module 144 is not enabled, it passes the data segments 152 to the error encoding module 146 or is bypassed such that the data segments 152 are provided to the error encoding module 146.

The error encoding module 146 encodes the secure data segments 154 in accordance with error correction encoding parameters received as control information 160 from the control module 116. The error correction encoding parameters (e.g., also referred to as dispersed storage error coding parameters) include identifying an error correction encoding scheme (e.g., forward error correction algorithm, a Reed-Solomon based algorithm, an online coding algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment 154 to produce an encoded data segment 156.

The slicing module 148 slices the encoded data segment 156 in accordance with the pillar width of the error correction encoding parameters received as control information 160. For example, if the pillar width is five, the slicing module 148 slices an encoded data segment 156 into a set of five encoded data slices. As such, for a plurality of encoded data segments 156 for a given data partition, the slicing module outputs a plurality of sets of encoded data slices 158.

The per slice security processing module 150, when enabled by the control module 116, secures each encoded data slice 158 based on slice security information received as control information 160 from the control module 116. The slice security information includes data compression, encryption, watermarking, integrity check (e.g., CRC, etc.), and/or any other type of digital security. For example, when the per slice security processing module 150 is enabled, it compresses an encoded data slice 158, encrypts the compressed encoded data slice, and generates a CRC value for the encrypted encoded data slice to produce a secure encoded data slice 122. When the per slice security processing module 150 is not enabled, it passes the encoded data slices 158 or is bypassed such that the encoded data slices 158 are the output of the DS error encoding module 112. Note that the control module 116 may be omitted and each module stores its own parameters.

Figure 7:
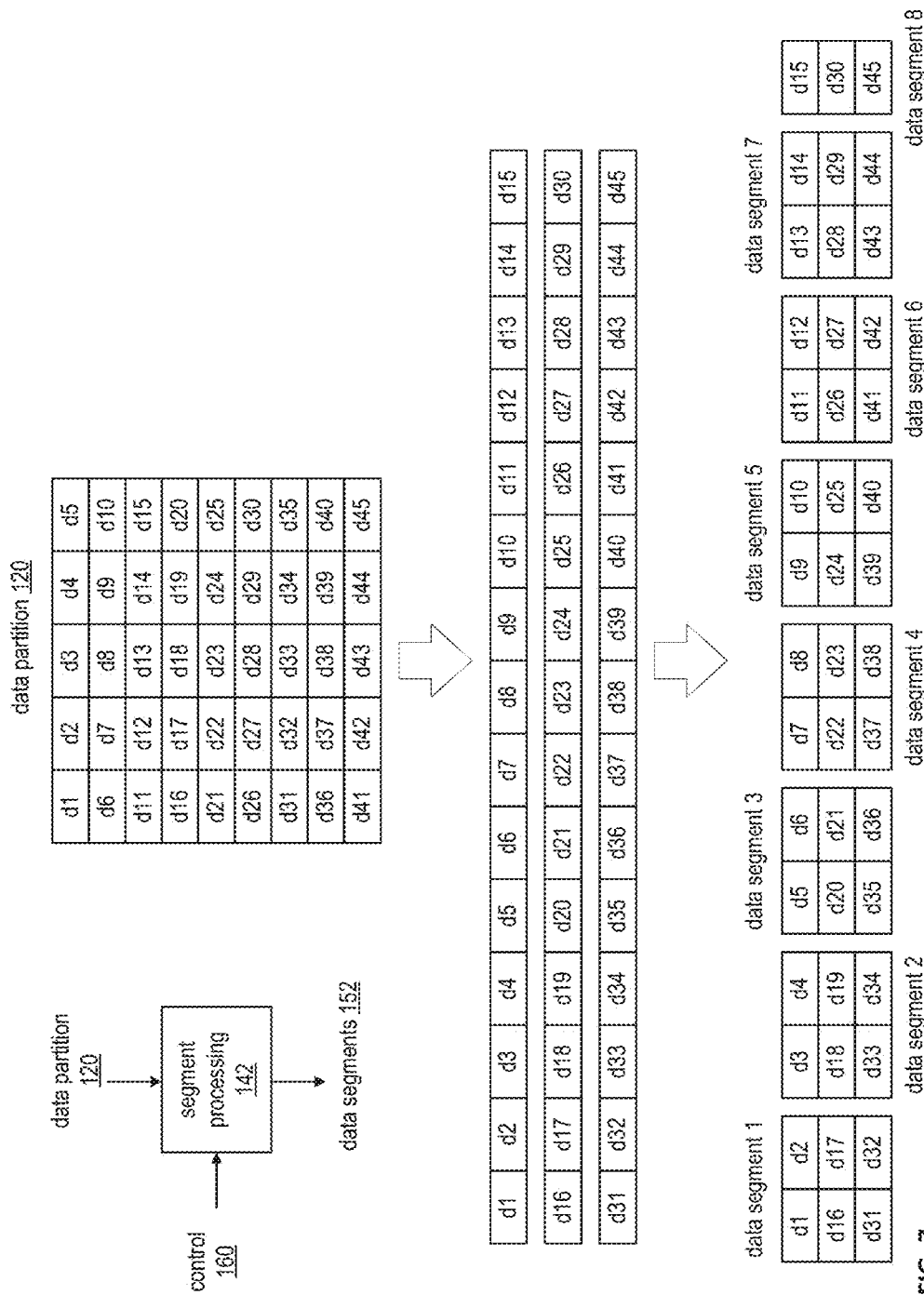
FIG. 7 is a diagram of an example of a segment processing of the dispersed error encoding in accordance with the present invention.

FIG. 7 is a diagram of an example of a segment processing of a dispersed storage (DS) error encoding module. In this example, a segment processing module 142 receives a data partition 120 that includes 45 data blocks (e.g., d1-d45), receives segmenting information (i.e., control information 160) from a control module, and segments the data partition 120 in accordance with the control information 160 to produce data segments 152. Each data block may be of the same size as other data blocks or of a different size. In addition, the size of each data block may be a few bytes to megabytes of data. As previously mentioned, the segmenting information indicates how many rows to segment the data partition into, indicates how many columns to segment the data partition into, and indicates how many columns to include in a data segment.

In this example, the decode threshold of the error encoding scheme is three; as such the number of rows to divide the data partition into is three. The number of columns for each row is set to 15, which is based on the number and size of data blocks. The data blocks of the data partition are arranged in rows and columns in a sequential order (i.e., the first row includes the first 15 data blocks; the second row includes the second 15 data blocks; and the third row includes the last 15 data blocks).

With the data blocks arranged into the desired sequential order, they are divided into data segments based on the segmenting information. In this example, the data partition is divided into 8 data segments; the first 7 include 2 columns of three rows and the last includes 1 column of three rows. Note that the first row of the 8 data segments is in sequential order of the first 15 data blocks; the second row of the 8 data segments in sequential order of the second 15 data blocks; and the third row of the 8 data segments in sequential order of the last 15 data blocks. Note that the number of data blocks, the grouping of the data blocks into segments, and size of the data blocks may vary to accommodate the desired distributed task processing function.

Figure 8:
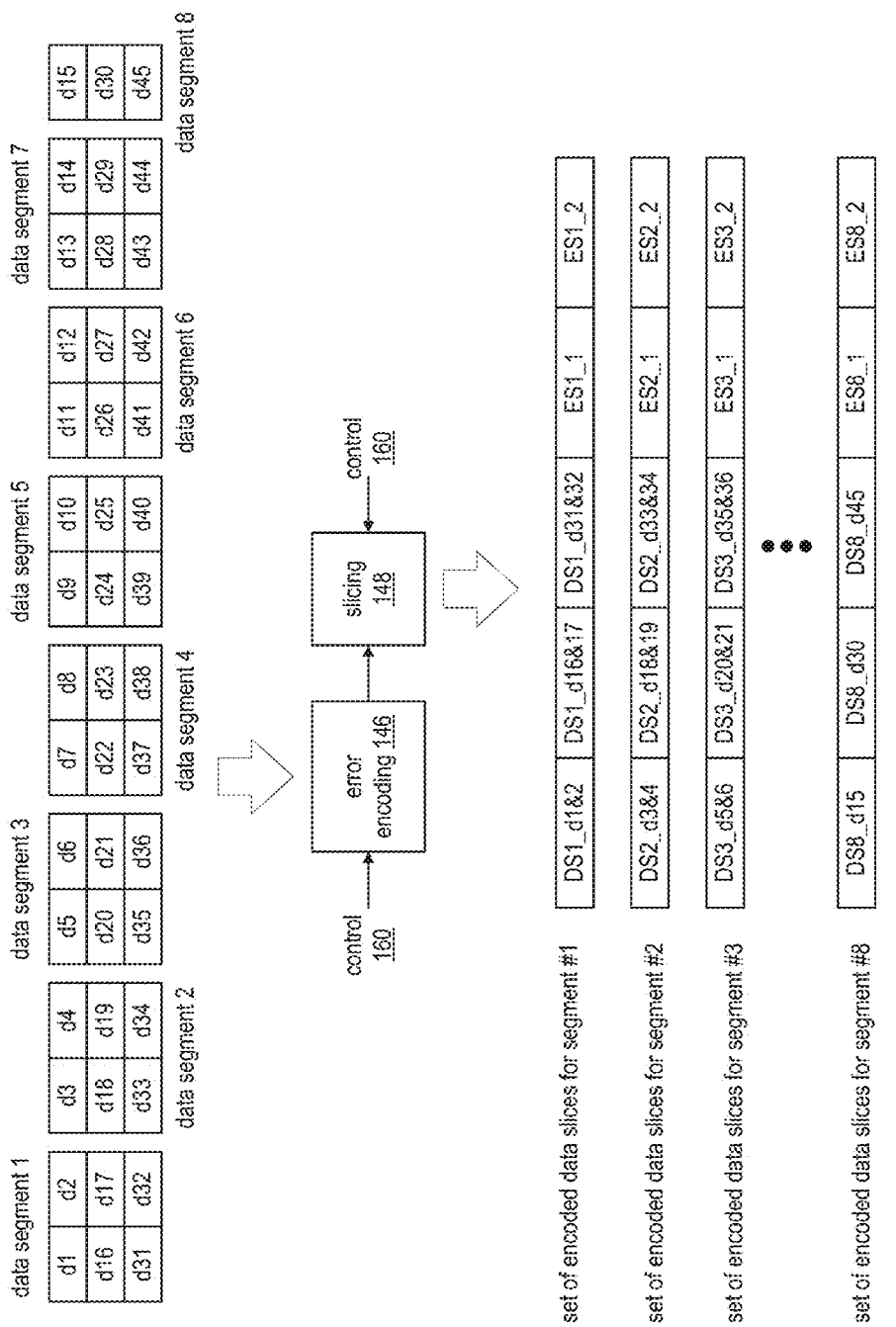
FIG. 8 is a diagram of an example of error encoding and slicing processing of the dispersed error encoding in accordance with the present invention.

FIG. 8 is a diagram of an example of error encoding and slicing processing of the dispersed error encoding processing the data segments of FIG. 7. In this example, data segment 1 includes 3 rows with each row being treated as one word for encoding. As such, data segment 1 includes three words for encoding: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

In operation, an error encoding module 146 and a slicing module 148 convert each data segment into a set of encoded data slices in accordance with error correction encoding parameters as control information 160. More specifically, when the error correction encoding parameters indicate a unity matrix Reed-Solomon based encoding algorithm, 5 pillars, and decode threshold of 3, the first three encoded data slices of the set of encoded data slices for a data segment are substantially similar to the corresponding word of the data segment. For instance, when the unity matrix Reed-Solomon based encoding algorithm is applied to data segment 1, the content of the first encoded data slice (DS1_d1&2) of the first set of encoded data slices (e.g., corresponding to data segment 1) is substantially similar to content of the first word (e.g., d1 & d2); the content of the second encoded data slice (DS1_d16&17) of the first set of encoded data slices is substantially similar to content of the second word (e.g., d16 & d17); and the content of the third encoded data slice (DS1_d31&32) of the first set of encoded data slices is substantially similar to content of the third word (e.g., d31 & d32).

The content of the fourth and fifth encoded data slices (e.g., ES1_1 and ES1_2) of the first set of encoded data slices include error correction data based on the first-third words of the first data segment. With such an encoding and slicing scheme, retrieving any three of the five encoded data slices allows the data segment to be accurately reconstructed.

The encoding and slicing of data segments 2-7 yield sets of encoded data slices similar to the set of encoded data slices of data segment 1. For instance, the content of the first encoded data slice (DS2_d3&4) of the second set of encoded data slices (e.g., corresponding to data segment 2) is substantially similar to content of the first word (e.g., d3 & d4); the content of the second encoded data slice (DS2_d18&19) of the second set of encoded data slices is substantially similar to content of the second word (e.g., d18 & d19); and the content of the third encoded data slice (DS2_d33&34) of the second set of encoded data slices is substantially similar to content of the third word (e.g., d33 & d34). The content of the fourth and fifth encoded data slices (e.g., ES1_1 and ES1_2) of the second set of encoded data slices includes error correction data based on the first-third words of the second data segment.

Figure 9:
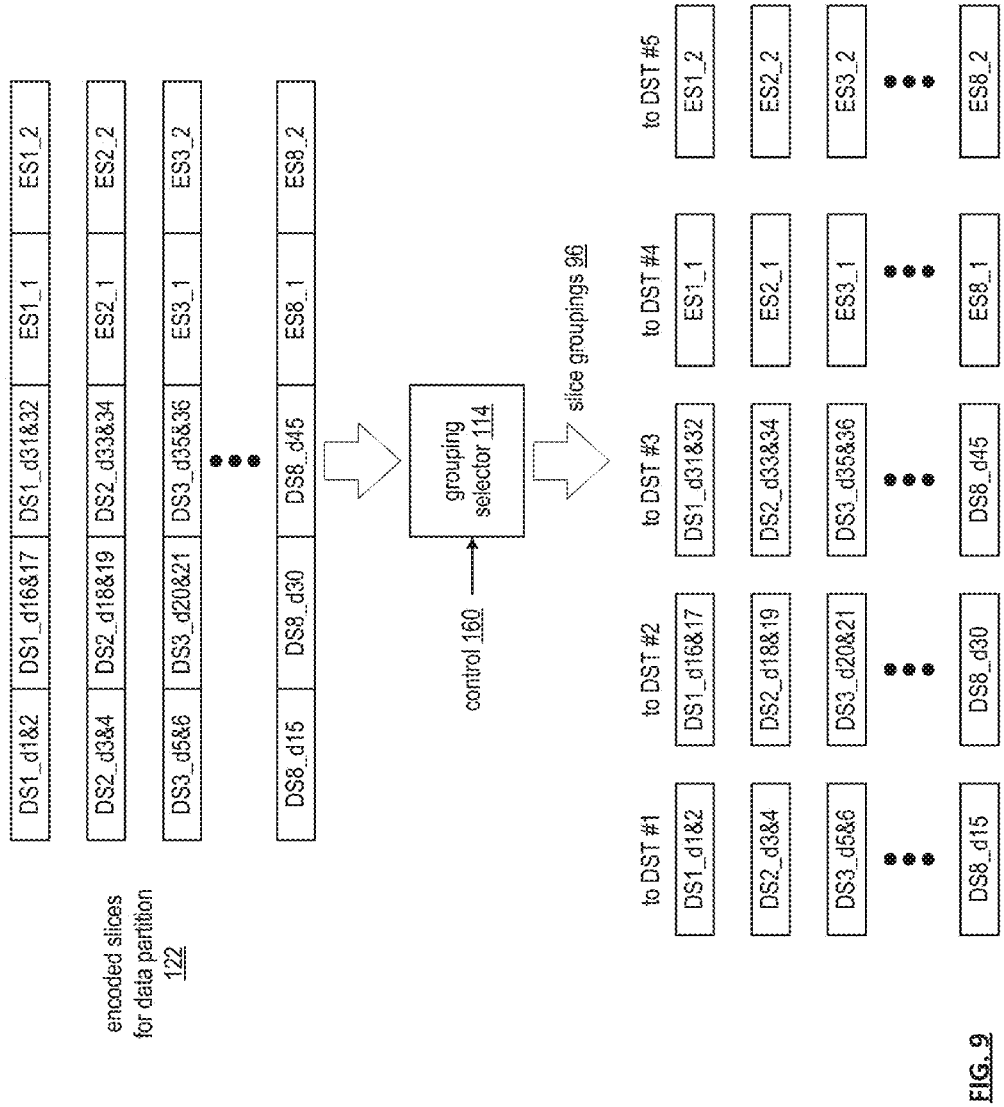
FIG. 9 is a diagram of an example of grouping selection processing of the outbound DST processing in accordance with the present invention.

FIG. 9 is a diagram of an example of grouping selection processing of an outbound distributed storage and task (DST) processing in accordance with group selection information as control information 160 from a control module. Encoded slices for data partition 122 are grouped in accordance with the control information 160 to produce slice groupings 96. In this example, a grouping selector module 114 organizes the encoded data slices into five slice groupings (e.g., one for each DST execution unit of a distributed storage and task network (DSTN) module). As a specific example, the grouping selector module 114 creates a first slice grouping for a DST execution unit #1, which includes first encoded slices of each of the sets of encoded slices. As such, the first DST execution unit receives encoded data slices corresponding to data blocks 1-15 (e.g., encoded data slices of contiguous data).

The grouping selector module 114 also creates a second slice grouping for a DST execution unit #2, which includes second encoded slices of each of the sets of encoded slices. As such, the second DST execution unit receives encoded data slices corresponding to data blocks 16-30. The grouping selector module 114 further creates a third slice grouping for DST execution unit #3, which includes third encoded slices of each of the sets of encoded slices. As such, the third DST execution unit receives encoded data slices corresponding to data blocks 31-45.

The grouping selector module 114 creates a fourth slice grouping for DST execution unit #4, which includes fourth encoded slices of each of the sets of encoded slices. As such, the fourth DST execution unit receives encoded data slices corresponding to first error encoding information (e.g., encoded data slices of error coding (EC) data). The grouping selector module 114 further creates a fifth slice grouping for DST execution unit #5, which includes fifth encoded slices of each of the sets of encoded slices. As such, the fifth DST execution unit receives encoded data slices corresponding to second error encoding information.

Figure 10:
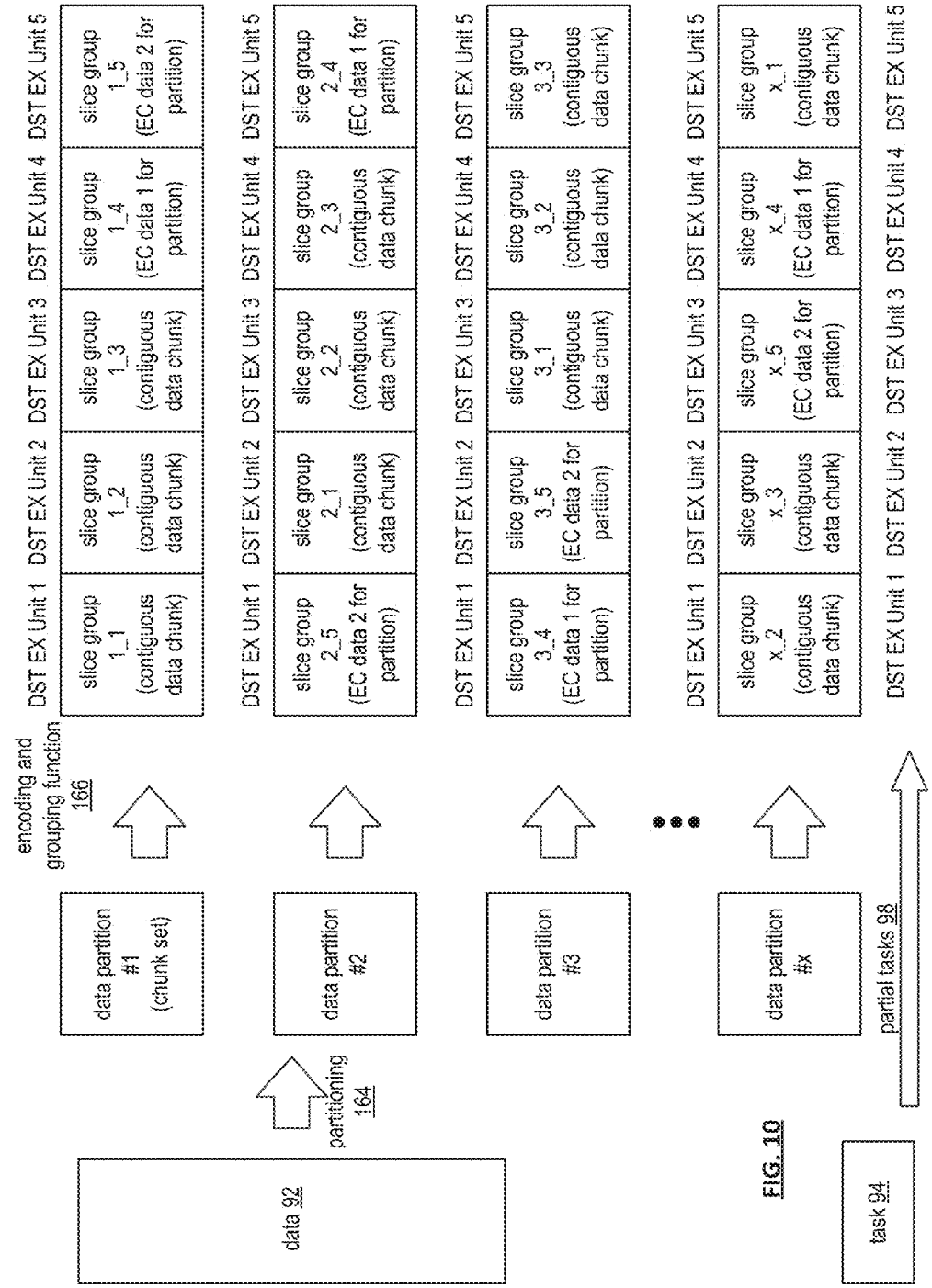
FIG. 10 is a diagram of an example of converting data into slice groups in accordance with the present invention.

FIG. 10 is a diagram of an example of converting data 92 into slice groups that expands on the preceding figures. As shown, the data 92 is partitioned in accordance with a partitioning function 164 into a plurality of data partitions (1-*x*, where x is an integer greater than 4). Each data partition (or chunkset of data) is encoded and grouped into slice groupings as previously discussed by an encoding and grouping function 166. For a given data partition, the slice groupings are sent to distributed storage and task (DST) execution units. From data partition to data partition, the ordering of the slice groupings to the DST execution units may vary.

For example, the slice groupings of data partition #1 is sent to the DST execution units such that the first DST execution receives first encoded data slices of each of the sets of encoded data slices, which corresponds to a first continuous data chunk of the first data partition (e.g., refer to FIG. 9), a second DST execution receives second encoded data slices of each of the sets of encoded data slices, which corresponds to a second continuous data chunk of the first data partition, etc.

For the second data partition, the slice groupings may be sent to the DST execution units in a different order than it was done for the first data partition. For instance, the first slice grouping of the second data partition (e.g., slice group 2_1) is sent to the second DST execution unit; the second slice grouping of the second data partition (e.g., slice group 2_2) is sent to the third DST execution unit; the third slice grouping of the second data partition (e.g., slice group 2_3) is sent to the fourth DST execution unit; the fourth slice grouping of the second data partition (e.g., slice group 2_4, which includes first error coding information) is sent to the fifth DST execution unit; and the fifth slice grouping of the second data partition (e.g., slice group 2_5, which includes second error coding information) is sent to the first DST execution unit.

The pattern of sending the slice groupings to the set of DST execution units may vary in a predicted pattern, a random pattern, and/or a combination thereof from data partition to data partition. In addition, from data partition to data partition, the set of DST execution units may change. For example, for the first data partition, DST execution units 1-5 may be used; for the second data partition, DST execution units 6-10 may be used; for the third data partition, DST execution units 3-7 may be used; etc. As is also shown, the task is divided into partial tasks that are sent to the DST execution units in conjunction with the slice groupings of the data partitions.

Figure 11:
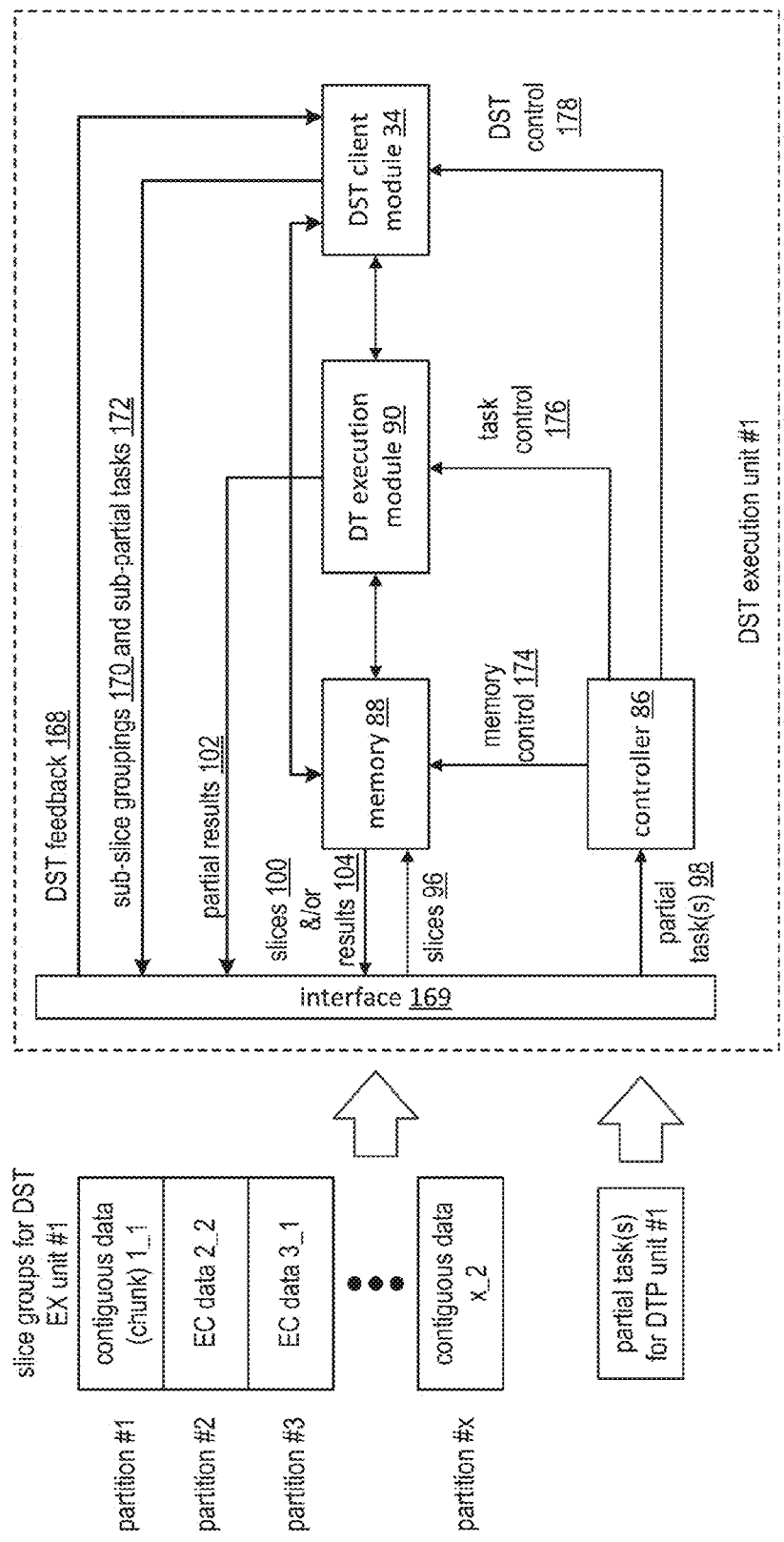
FIG. 11 is a schematic block diagram of an embodiment of a DST execution unit in accordance with the present invention.

FIG. 11 is a schematic block diagram of an embodiment of a DST (distributed storage and/or task) execution unit that includes an interface 169, a controller 86, memory 88, one or more DT (distributed task) execution modules 90, and a DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a slice group, the DST execution module receives a slice grouping 96 (e.g., slice group #1) via interface 169. The slice grouping 96 includes, per partition, encoded data slices of contiguous data or encoded data slices of error coding (EC) data. For slice group #1, the DST execution module receives encoded data slices of contiguous data for partitions #1 and #x (and potentially others between 3 and x) and receives encoded data slices of EC data for partitions #2 and #3 (and potentially others between 3 and x). Examples of encoded data slices of contiguous data and encoded data slices of error coding (EC) data are discussed with reference to FIG. 9. The memory 88 stores the encoded data slices of slice groupings 96 in accordance with memory control information 174 it receives from the controller 86.

The controller 86 (e.g., a processing module, a CPU, etc.) generates the memory control information 174 based on a partial task(s) 98 and distributed computing information (e.g., user information (e.g., user ID, distributed computing permissions, data access permission, etc.), vault information (e.g., virtual memory assigned to user, user group, temporary storage for task processing, etc.), task validation information, etc.). For example, the controller 86 interprets the partial task(s) 98 in light of the distributed computing information to determine whether a requestor is authorized to perform the task 98, is authorized to access the data, and/or is authorized to perform the task on this particular data. When the requestor is authorized, the controller 86 determines, based on the task 98 and/or another input, whether the encoded data slices of the slice grouping 96 are to be temporarily stored or permanently stored. Based on the foregoing, the controller 86 generates the memory control information 174 to write the encoded data slices of the slice grouping 96 into the memory 88 and to indicate whether the slice grouping 96 is permanently stored or temporarily stored.

With the slice grouping 96 stored in the memory 88, the controller 86 facilitates execution of the partial task(s) 98. In an example, the controller 86 interprets the partial task 98 in light of the capabilities of the DT execution module(s) 90. The capabilities include one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, etc. If the controller 86 determines that the DT execution module(s) 90 have sufficient capabilities, it generates task control information 176.

The task control information 176 may be a generic instruction (e.g., perform the task on the stored slice grouping) or a series of operational codes. In the former instance, the DT execution module 90 includes a co-processor function specifically configured (fixed or programmed) to perform the desired task 98. In the latter instance, the DT execution module 90 includes a general processor topology where the controller stores an algorithm corresponding to the particular task 98. In this instance, the controller 86 provides the operational codes (e.g., assembly language, source code of a programming language, object code, etc.) of the algorithm to the DT execution module 90 for execution.

Depending on the nature of the task 98, the DT execution module 90 may generate intermediate partial results 102 that are stored in the memory 88 or in a cache memory (not shown) within the DT execution module 90. In either case, when the DT execution module 90 completes execution of the partial task 98, it outputs one or more partial results 102. The partial results 102 may also be stored in memory 88.

If, when the controller 86 is interpreting whether capabilities of the DT execution module(s) 90 can support the partial task 98, the controller 86 determines that the DT execution module(s) 90 cannot adequately support the task 98 (e.g., does not have the right resources, does not have sufficient available resources, available resources would be too slow, etc.), it then determines whether the partial task 98 should be fully offloaded or partially offloaded.

If the controller 86 determines that the partial task 98 should be fully offloaded, it generates DST control information 178 and provides it to the DST client module 34. The DST control information 178 includes the partial task 98, memory storage information regarding the slice grouping 96, and distribution instructions. The distribution instructions instruct the DST client module 34 to divide the partial task 98 into sub-partial tasks 172, to divide the slice grouping 96 into sub-slice groupings 170, and identify of other DST execution units. The DST client module 34 functions in a similar manner as the DST client module 34 of FIGS. 3-10 to produce the sub-partial tasks 172 and the sub-slice groupings 170 in accordance with the distribution instructions.

The DST client module 34 receives DST feedback 168 (e.g., sub-partial results), via the interface 169, from the DST execution units to which the task was offloaded. The DST client module 34 provides the sub-partial results to the DST execution unit, which processes the sub-partial results to produce the partial result(s) 102.

If the controller 86 determines that the partial task 98 should be partially offloaded, it determines what portion of the task 98 and/or slice grouping 96 should be processed locally and what should be offloaded. For the portion that is being locally processed, the controller 86 generates task control information 176 as previously discussed. For the portion that is being offloaded, the controller 86 generates DST control information 178 as previously discussed.

When the DST client module 34 receives DST feedback 168 (e.g., sub-partial results) from the DST executions units to which a portion of the task was offloaded, it provides the sub-partial results to the DT execution module 90. The DT execution module 90 processes the sub-partial results with the sub-partial results it created to produce the partial result(s) 102.

The memory 88 may be further utilized to retrieve one or more of stored slices 100, stored results 104, partial results 102 when the DT execution module 90 stores partial results 102 and/or results 104 in the memory 88. For example, when the partial task 98 includes a retrieval request, the controller 86 outputs the memory control 174 to the memory 88 to facilitate retrieval of slices 100 and/or results 104.

Figure 12:
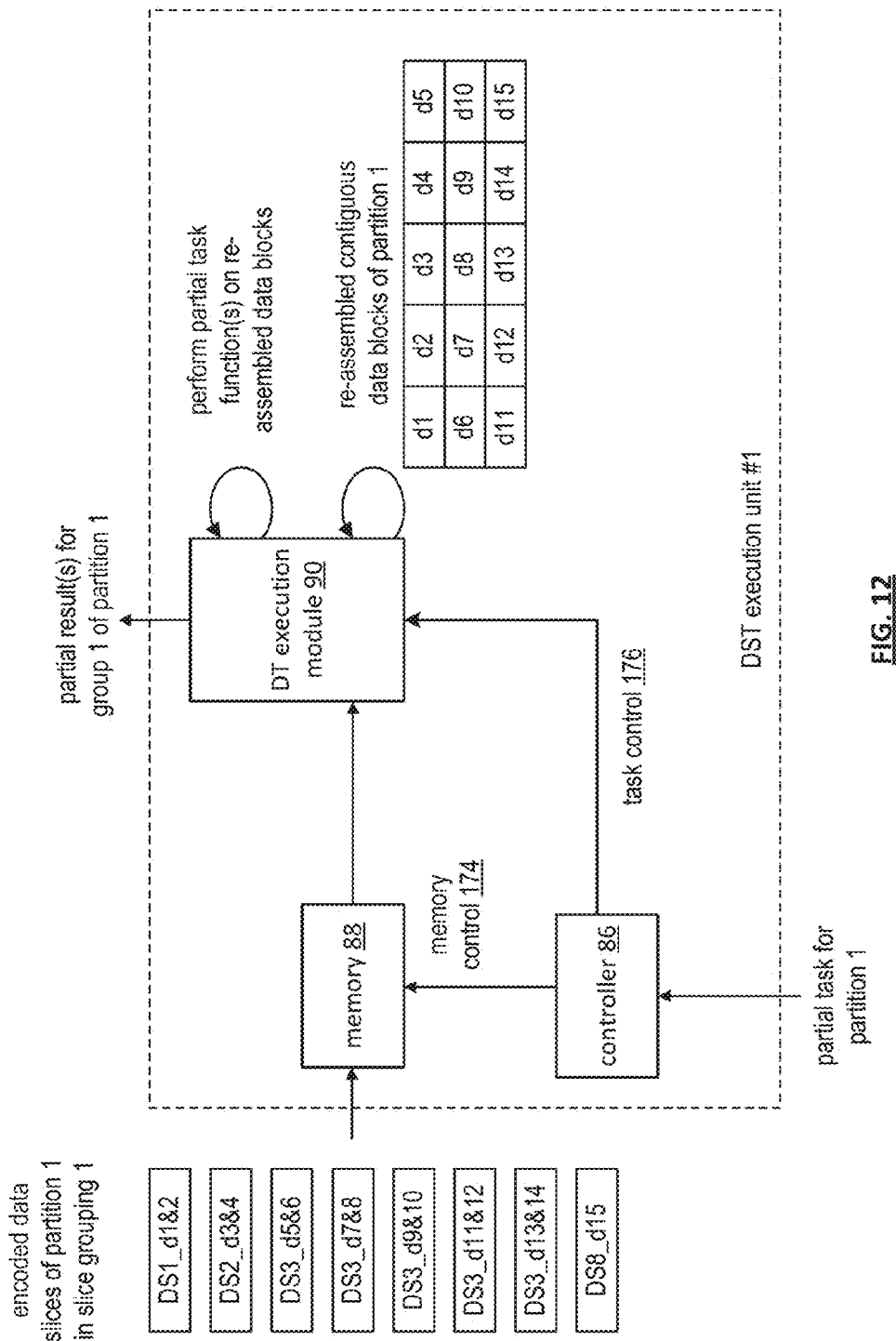
FIG. 12 is a schematic block diagram of an example of operation of a DST execution unit in accordance with the present invention.

FIG. 12 is a schematic block diagram of an example of operation of a distributed storage and task (DST) execution unit storing encoded data slices and executing a task thereon. To store the encoded data slices of a partition 1 of slice grouping 1, a controller 86 generates write commands as memory control information 174 such that the encoded slices are stored in desired locations (e.g., permanent or temporary) within memory 88.

Once the encoded slices are stored, the controller 86 provides task control information 176 to a distributed task (DT) execution module 90. As a first step of executing the task in accordance with the task control information 176, the DT execution module 90 retrieves the encoded slices from memory 88. The DT execution module 90 then reconstructs contiguous data blocks of a data partition. As shown for this example, reconstructed contiguous data blocks of data partition 1 include data blocks 1-15 (e.g., d1-d15).

With the contiguous data blocks reconstructed, the DT execution module 90 performs the task on the reconstructed contiguous data blocks. For example, the task may be to search the reconstructed contiguous data blocks for a particular word or phrase, identify where in the reconstructed contiguous data blocks the particular word or phrase occurred, and/or count the occurrences of the particular word or phrase on the reconstructed contiguous data blocks. The DST execution unit continues in a similar manner for the encoded data slices of other partitions in slice grouping 1. Note that with using the unity matrix error encoding scheme previously discussed, if the encoded data slices of contiguous data are uncorrupted, the decoding of them is a relatively straightforward process of extracting the data.

If, however, an encoded data slice of contiguous data is corrupted (or missing), it can be rebuilt by accessing other DST execution units that are storing the other encoded data slices of the set of encoded data slices of the corrupted encoded data slice. In this instance, the DST execution unit having the corrupted encoded data slices retrieves at least three encoded data slices (of contiguous data and of error coding data) in the set from the other DST execution units (recall for this example, the pillar width is 5 and the decode threshold is 3). The DST execution unit decodes the retrieved data slices using the DS error encoding parameters to recapture the corresponding data segment. The DST execution unit then re-encodes the data segment using the DS error encoding parameters to rebuild the corrupted encoded data slice. Once the encoded data slice is rebuilt, the DST execution unit functions as previously described.

Figure 13:
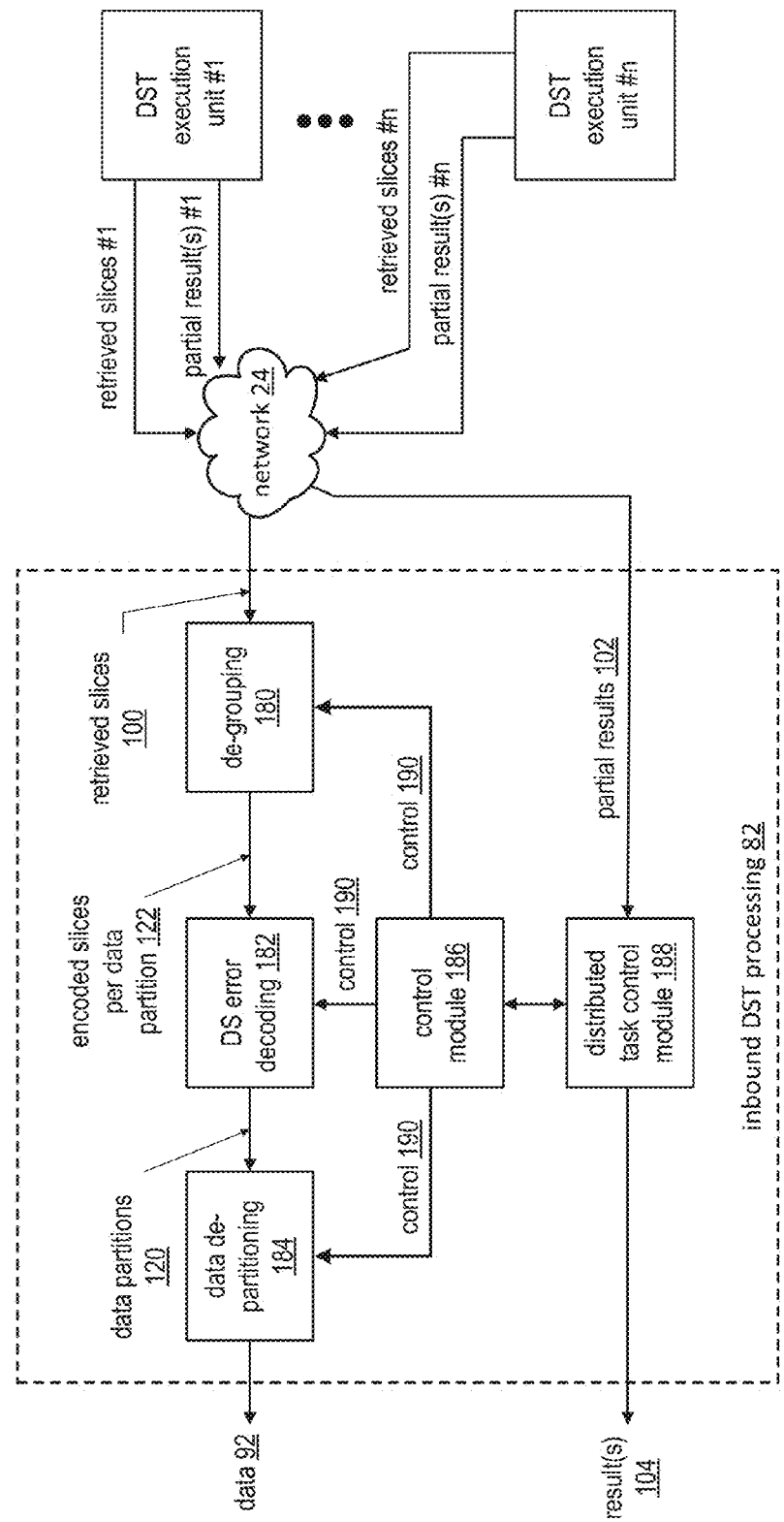
FIG. 13 is a schematic block diagram of an embodiment of an inbound distributed storage and/or task (DST) processing in accordance with the present invention.

FIG. 13 is a schematic block diagram of an embodiment of an inbound distributed storage and/or task (DST) processing section 82 of a DST client module coupled to DST execution units of a distributed storage and task network (DSTN) module via a network 24. The inbound DST processing section 82 includes a de-grouping module 180, a DS (dispersed storage) error decoding module 182, a data de-partitioning module 184, a control module 186, and a distributed task control module 188. Note that the control module 186 and/or the distributed task control module 188 may be separate modules from corresponding ones of outbound DST processing section or may be the same modules.

In an example of operation, the DST execution units have completed execution of corresponding partial tasks on the corresponding slice groupings to produce partial results 102. The inbound DST processing section 82 receives the partial results 102 via the distributed task control module 188. The inbound DST processing section 82 then processes the partial results 102 to produce a final result, or results 104. For example, if the task was to find a specific word or phrase within data, the partial results 102 indicate where in each of the prescribed portions of the data the corresponding DST execution units found the specific word or phrase. The distributed task control module 188 combines the individual partial results 102 for the corresponding portions of the data into a final result 104 for the data as a whole.

In another example of operation, the inbound DST processing section 82 is retrieving stored data from the DST execution units (i.e., the DSTN module). In this example, the DST execution units output encoded data slices 100 corresponding to the data retrieval requests. The de-grouping module 180 receives retrieved slices 100 and de-groups them to produce encoded data slices per data partition 122. The DS error decoding module 182 decodes, in accordance with DS error encoding parameters, the encoded data slices per data partition 122 to produce data partitions 120.

The data de-partitioning module 184 combines the data partitions 120 into the data 92. The control module 186 controls the conversion of retrieved slices 100 into the data 92 using control signals 190 to each of the modules. For instance, the control module 186 provides de-grouping information to the de-grouping module 180, provides the DS error encoding parameters to the DS error decoding module 182, and provides de-partitioning information to the data de-partitioning module 184.

Figure 14:
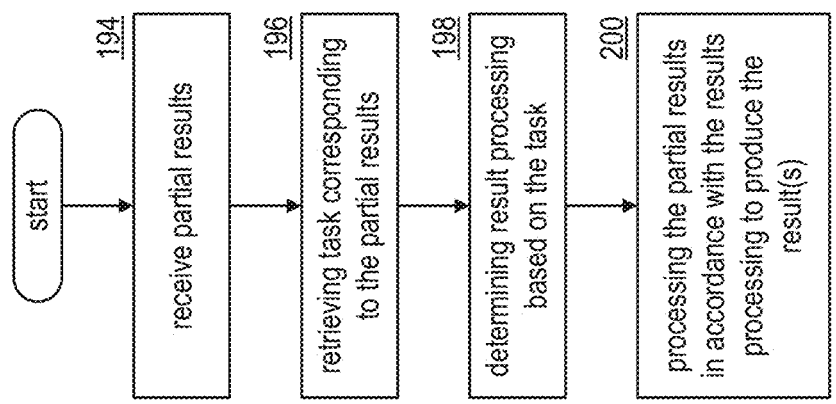
FIG. 14 is a logic diagram of an example of a method for inbound DST processing in accordance with the present invention.

FIG. 14 is a logic diagram of an example of a method that is executable by distributed storage and task (DST) client module regarding inbound DST processing. The method begins at step 194 where the DST client module receives partial results. The method continues at step 196 where the DST client module retrieves the task corresponding to the partial results. For example, the partial results include header information that identifies the requesting entity, which correlates to the requested task.

The method continues at step 198 where the DST client module determines result processing information based on the task. For example, if the task were to identify a particular word or phrase within the data, the result processing information would indicate to aggregate the partial results for the corresponding portions of the data to produce the final result. As another example, if the task were to count the occurrences of a particular word or phrase within the data, results of processing the information would indicate to add the partial results to produce the final results. The method continues at step 200 where the DST client module processes the partial results in accordance with the result processing information to produce the final result or results.

Figure 15:
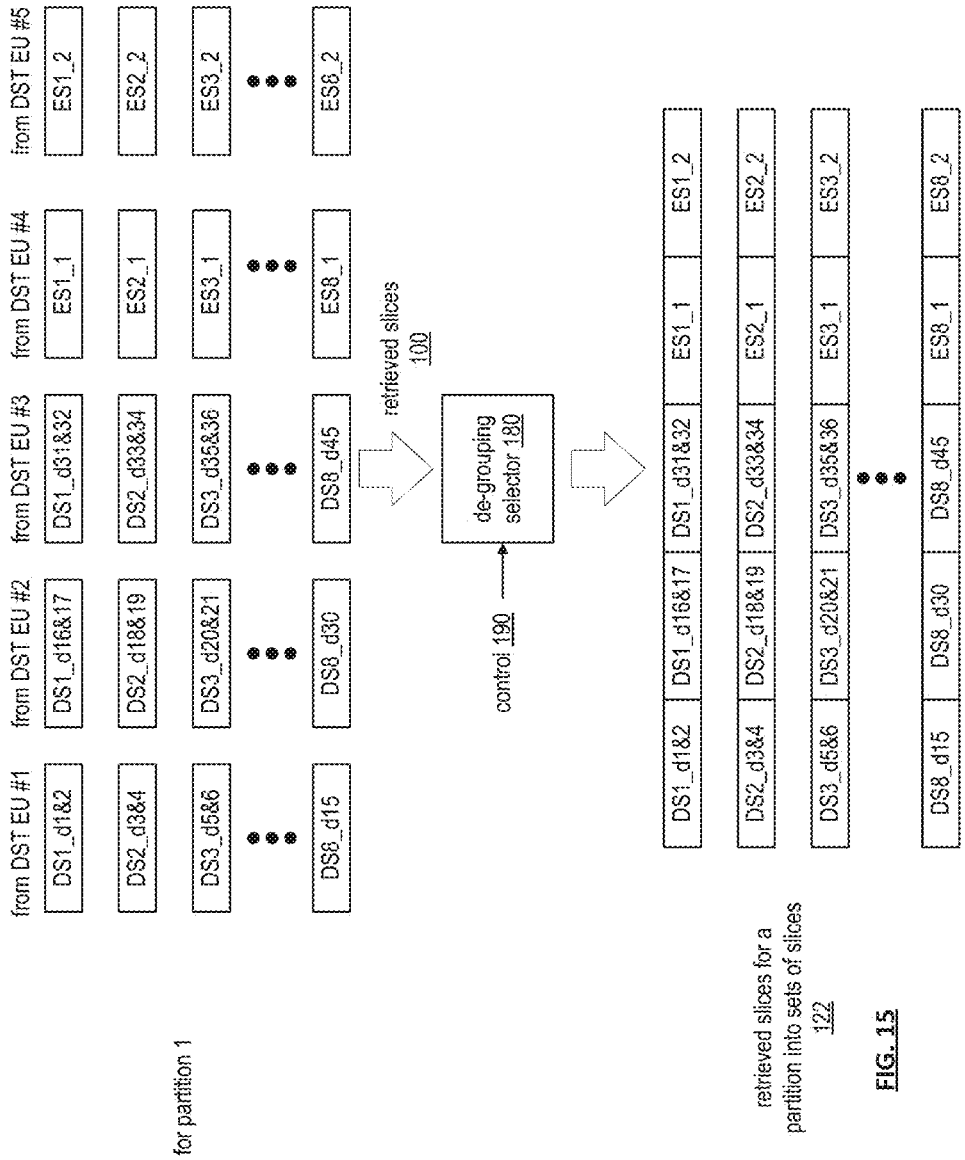
FIG. 15 is a diagram of an example of de-grouping selection processing of the inbound DST processing in accordance with the present invention.

FIG. 15 is a diagram of an example of de-grouping selection processing of an inbound distributed storage and task (DST) processing section of a DST client module. In general, this is an inverse process of the grouping module of the outbound DST processing section of FIG. 9. Accordingly, for each data partition (e.g., partition #1), the de-grouping module retrieves the corresponding slice grouping from the DST execution units (EU) (e.g., DST 1-5).

As shown, DST execution unit #1 provides a first slice grouping, which includes the first encoded slices of each of the sets of encoded slices (e.g., encoded data slices of contiguous data of data blocks 1-15); DST execution unit #2 provides a second slice grouping, which includes the second encoded slices of each of the sets of encoded slices (e.g., encoded data slices of contiguous data of data blocks 16-30); DST execution unit #3 provides a third slice grouping, which includes the third encoded slices of each of the sets of encoded slices (e.g., encoded data slices of contiguous data of data blocks 31-45); DST execution unit #4 provides a fourth slice grouping, which includes the fourth encoded slices of each of the sets of encoded slices (e.g., first encoded data slices of error coding (EC) data); and DST execution unit #5 provides a fifth slice grouping, which includes the fifth encoded slices of each of the sets of encoded slices (e.g., first encoded data slices of error coding (EC) data).

The de-grouping module de-groups the slice groupings (e.g., received slices 100) using a de-grouping selector 180 controlled by a control signal 190 as shown in the example to produce a plurality of sets of encoded data slices (e.g., retrieved slices for a partition into sets of slices 122). Each set corresponding to a data segment of the data partition.

Figure 16:
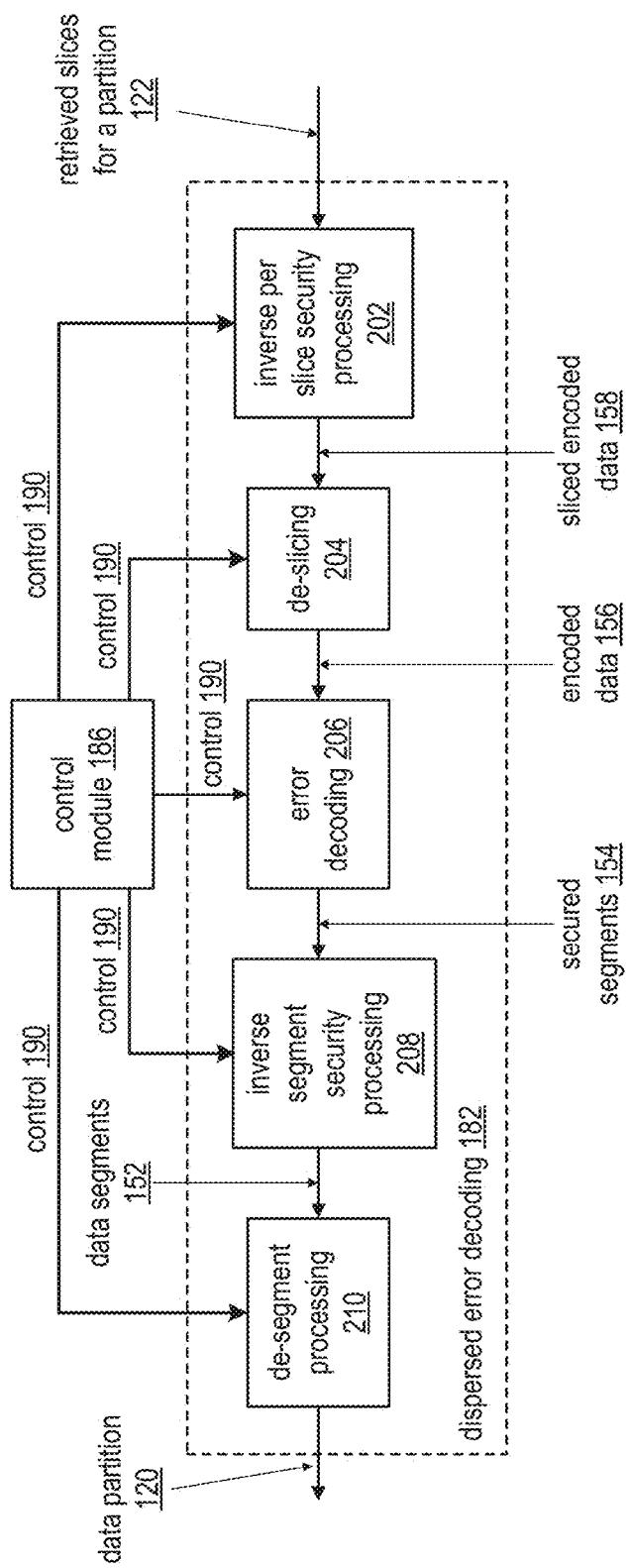
FIG. 16 is a schematic block diagram of an embodiment of a dispersed error decoding in accordance with the present invention.

FIG. 16 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, a de-segmenting processing module 210, and a control module 186.

In an example of operation, the inverse per slice security processing module 202, when enabled by the control module 186, unsecures each encoded data slice 122 based on slice de-security information received as control information 190 (e.g., the compliment of the slice security information discussed with reference to FIG. 6) received from the control module 186. The slice security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 122, it decrypts each verified encoded data slice, and decompresses each decrypted encoded data slice to produce slice encoded data 158. When the inverse per slice security processing module 202 is not enabled, it passes the encoded data slices 122 as the sliced encoded data 158 or is bypassed such that the retrieved encoded data slices 122 are provided as the sliced encoded data 158.

The de-slicing module 204 de-slices the sliced encoded data 158 into encoded data segments 156 in accordance with a pillar width of the error correction encoding parameters received as control information 190 from the control module 186. For example, if the pillar width is five, the de-slicing module 204 de-slices a set of five encoded data slices into an encoded data segment 156. The error decoding module 206 decodes the encoded data segments 156 in accordance with error correction decoding parameters received as control information 190 from the control module 186 to produce secure data segments 154. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments 154 based on segment security information received as control information 190 from the control module 186. The segment security information includes data decompression, decryption, de-watermarking, integrity check (e.g., CRC, etc.) verification, and/or any other type of digital security. For example, when the inverse segment security processing module 208 is enabled, it verifies integrity information (e.g., a CRC value) of each secure data segment 154, it decrypts each verified secured data segment, and decompresses each decrypted secure data segment to produce a data segment 152. When the inverse segment security processing module 208 is not enabled, it passes the decoded data segment 154 as the data segment 152 or is bypassed.

The de-segment processing module 210 receives the data segments 152 and receives de-segmenting information as control information 190 from the control module 186. The de-segmenting information indicates how the de-segment processing module 210 is to de-segment the data segments 152 into a data partition 120. For example, the de-segmenting information indicates how the rows and columns of data segments are to be rearranged to yield the data partition 120.

Figure 17:
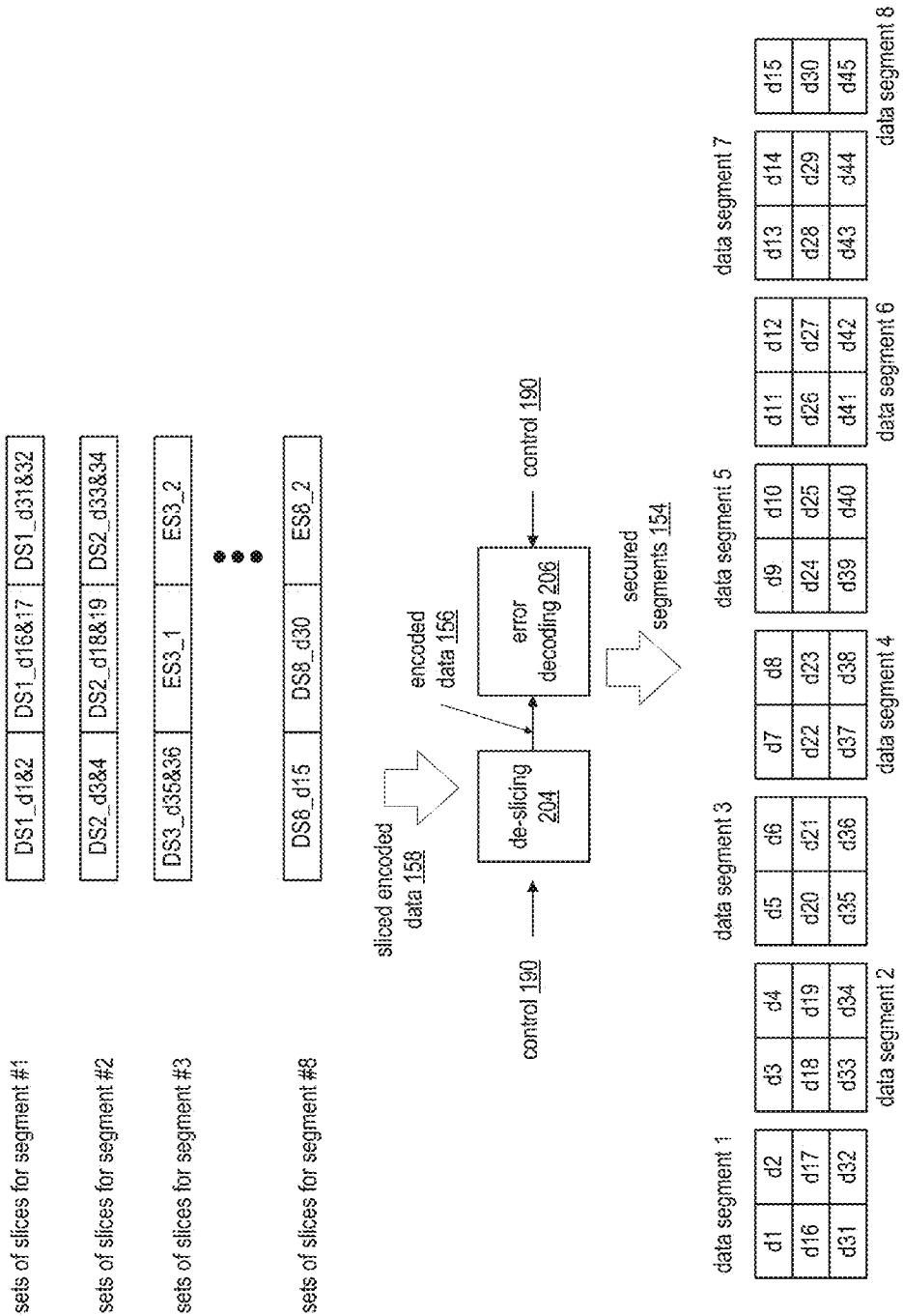
FIG. 17 is a diagram of an example of de-slicing and error decoding processing of the dispersed error decoding in accordance with the present invention.

FIG. 17 is a diagram of an example of de-slicing and error decoding processing of a dispersed error decoding module. A de-slicing module 204 receives at least a decode threshold number of encoded data slices 158 for each data segment in accordance with control information 190 and provides encoded data 156. In this example, a decode threshold is three. As such, each set of encoded data slices 158 is shown to have three encoded data slices per data segment. The de-slicing module 204 may receive three encoded data slices per data segment because an associated distributed storage and task (DST) client module requested retrieving only three encoded data slices per segment or selected three of the retrieved encoded data slices per data segment. As shown, which is based on the unity matrix encoding previously discussed with reference to FIG. 8, an encoded data slice may be a data-based encoded data slice (e.g., DS1_d1&d2) or an error code based encoded data slice (e.g., ES3_1).

An error decoding module 206 decodes the encoded data 156 of each data segment in accordance with the error correction decoding parameters of control information 190 to produce data secured segments 154. In this example, data segment 1 includes 3 rows with each row being treated as one word for encoding. As such, data segment 1 includes three words: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

Figure 18:
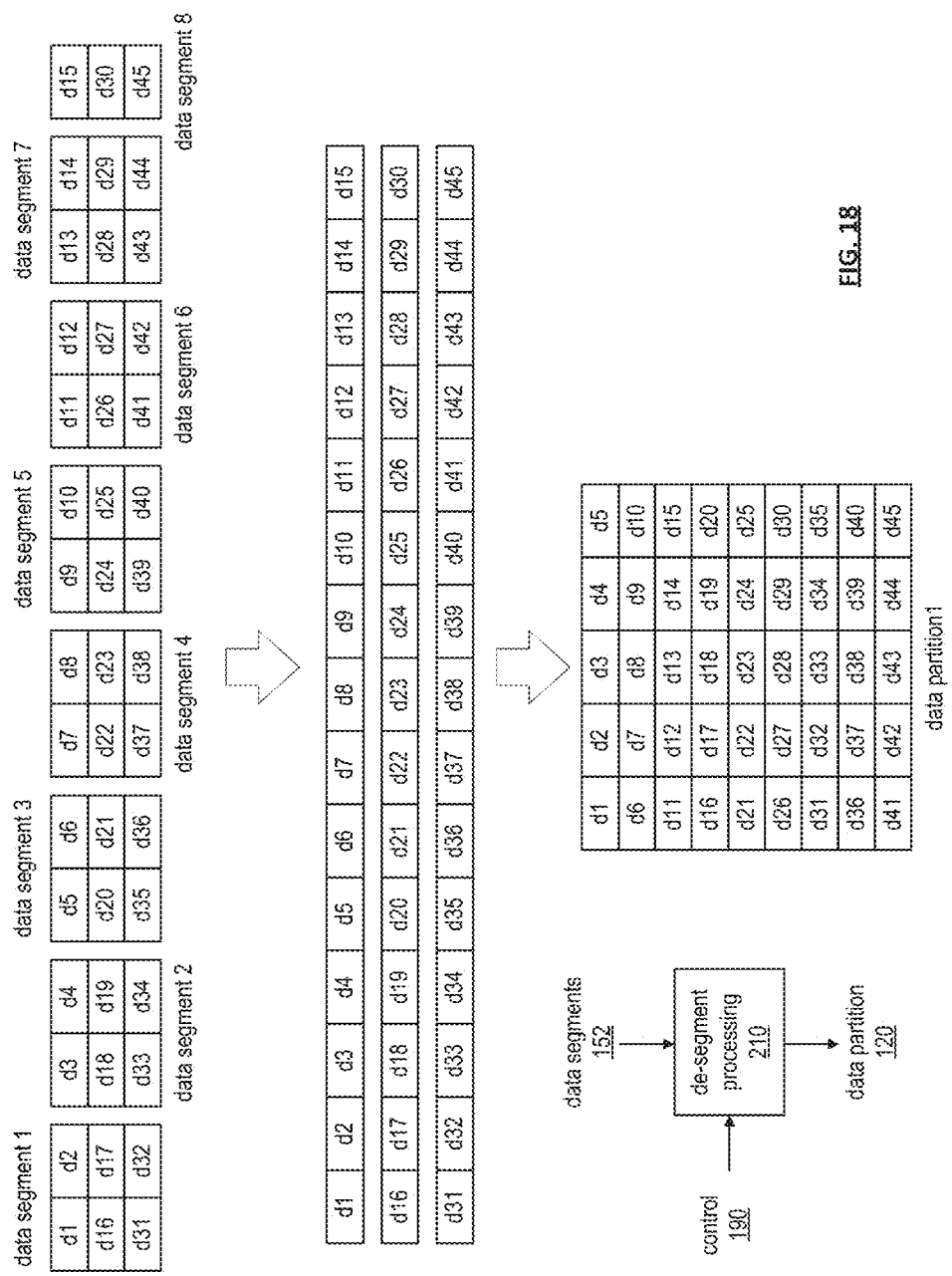
FIG. 18 is a diagram of an example of a de-segment processing of the dispersed error decoding in accordance with the present invention.

FIG. 18 is a diagram of an example of de-segment processing of an inbound distributed storage and task (DST) processing. In this example, a de-segment processing module 210 receives data segments 152 (e.g., 1-8) and rearranges the data blocks of the data segments into rows and columns in accordance with de-segmenting information of control information 190 to produce a data partition 120. Note that the number of rows is based on the decode threshold (e.g., 3 in this specific example) and the number of columns is based on the number and size of the data blocks.

The de-segmenting module 210 converts the rows and columns of data blocks into the data partition 120. Note that each data block may be of the same size as other data blocks or of a different size. In addition, the size of each data block may be a few bytes to megabytes of data.

Figure 19:
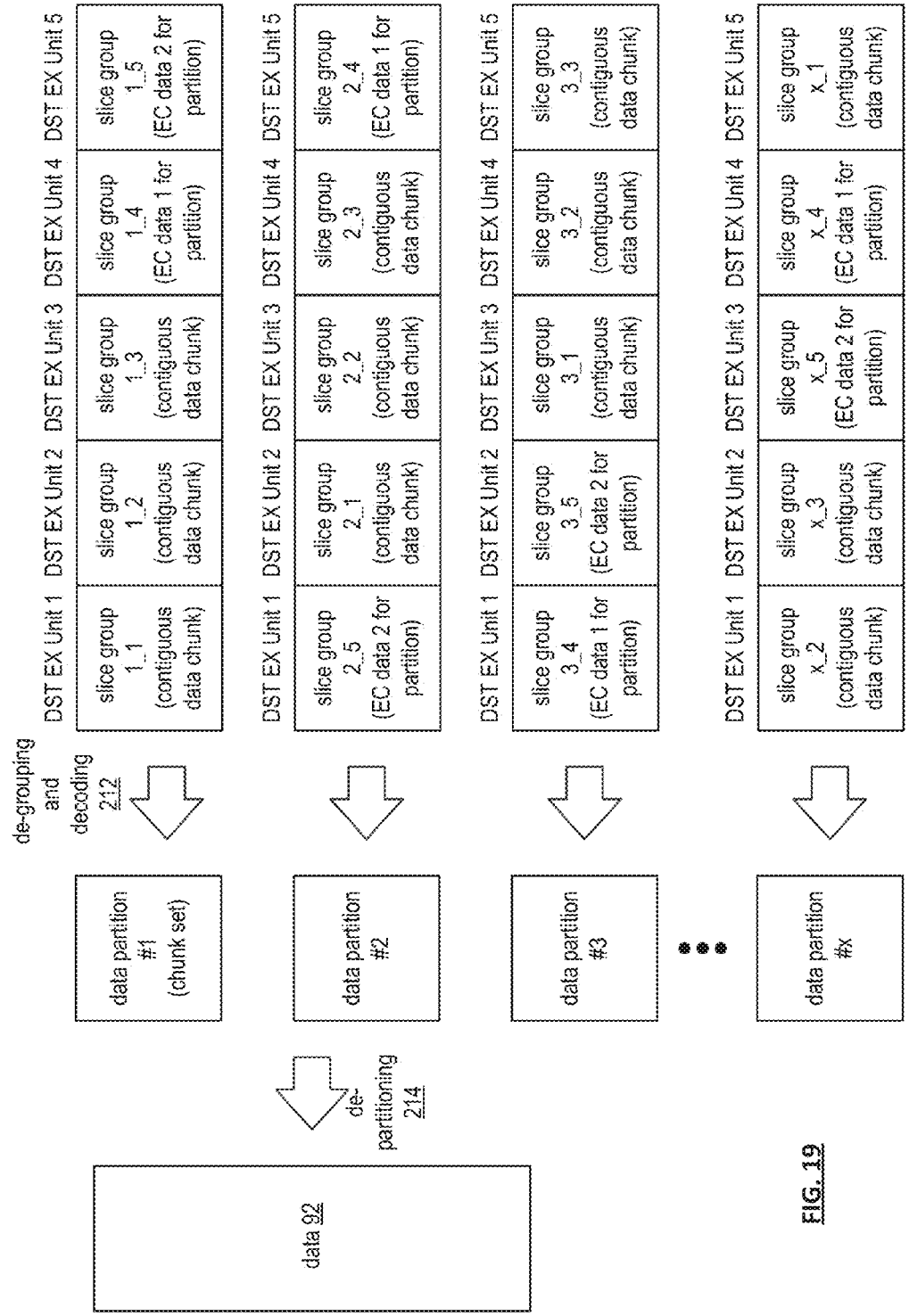
FIG. 19 is a diagram of an example of converting slice groups into data in accordance with the present invention.

FIG. 19 is a diagram of an example of converting slice groups into data 92 within an inbound distributed storage and task (DST) processing section. As shown, the data 92 is reconstructed from a plurality of data partitions (1-x, where x is an integer greater than 4). Each data partition (or chunk set of data) is decoded and re-grouped using a de-grouping and decoding function 212 and a de-partition function 214 from slice groupings as previously discussed. For a given data partition, the slice groupings (e.g., at least a decode threshold per data segment of encoded data slices) are received from DST execution units. From data partition to data partition, the ordering of the slice groupings received from the DST execution units may vary as discussed with reference to FIG. 10.

Figure 20:
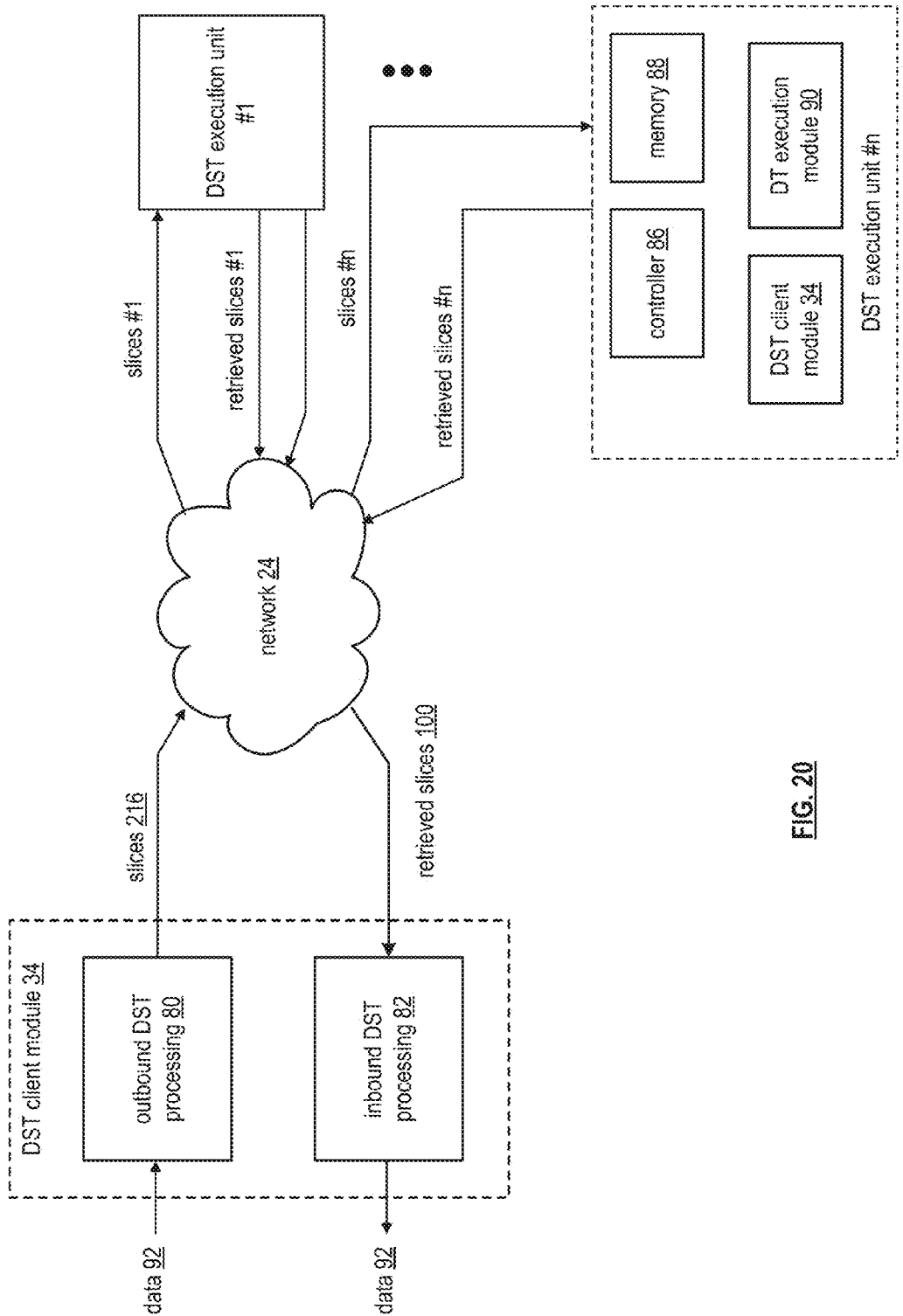
FIG. 20 is a diagram of an example of a distributed storage within the distributed computing system in accordance with the present invention.

FIG. 20 is a diagram of an example of a distributed storage and/or retrieval within the distributed computing system. The distributed computing system includes a plurality of distributed storage and/or task (DST) processing client modules 34 (one shown) coupled to a distributed storage and/or task processing network (DSTN) module, or multiple DSTN modules, via a network 24. The DST client module 34 includes an outbound DST processing section 80 and an inbound DST processing section 82. The DSTN module includes a plurality of DST execution units. Each DST execution unit includes a controller 86, memory 88, one or more distributed task (DT) execution modules 90, and a DST client module 34.

In an example of data storage, the DST client module 34 has data 92 that it desires to store in the DSTN module. The data 92 may be a file (e.g., video, audio, text, graphics, etc.), a data object, a data block, an update to a file, an update to a data block, etc. In this instance, the outbound DST processing module 80 converts the data 92 into encoded data slices 216 as will be further described with reference to FIGS. 21-23. The outbound DST processing module 80 sends, via the network 24, to the DST execution units for storage as further described with reference to FIG. 24.

In an example of data retrieval, the DST client module 34 issues a retrieve request to the DST execution units for the desired data 92. The retrieve request may address each DST executions units storing encoded data slices of the desired data, address a decode threshold number of DST execution units, address a read threshold number of DST execution units, or address some other number of DST execution units. In response to the request, each addressed DST execution unit retrieves its encoded data slices 100 of the desired data and sends them to the inbound DST processing section 82, via the network 24.

When, for each data segment, the inbound DST processing section 82 receives at least a decode threshold number of encoded data slices 100, it converts the encoded data slices 100 into a data segment. The inbound DST processing section 82 aggregates the data segments to produce the retrieved data 92.

Figure 21:
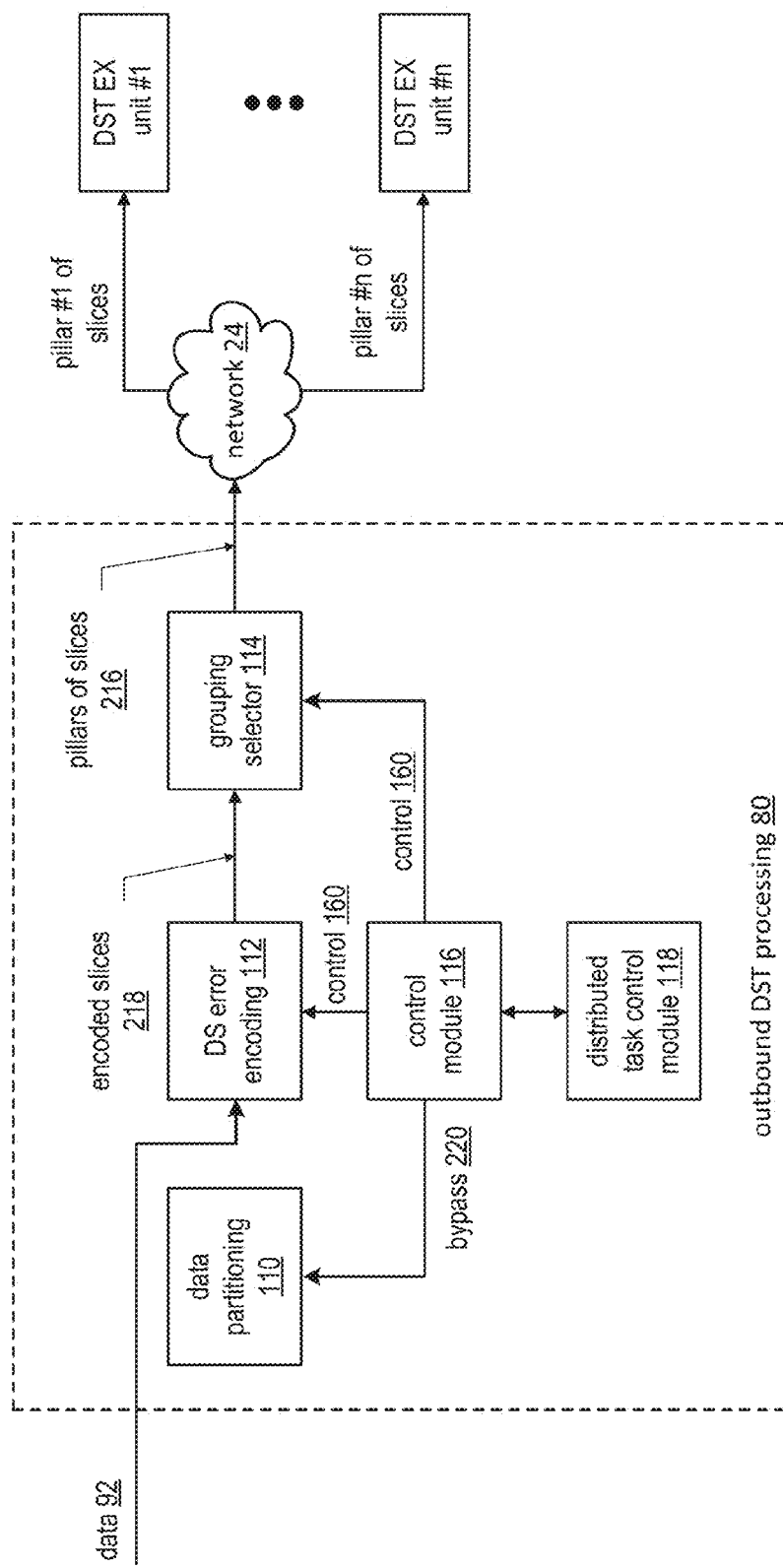
FIG. 21 is a schematic block diagram of an example of operation of outbound distributed storage and/or task (DST) processing for storing data in accordance with the present invention.

FIG. 21 is a schematic block diagram of an embodiment of an outbound distributed storage and/or task (DST) processing section 80 of a DST client module coupled to a distributed storage and task network (DSTN) module (e.g., a plurality of DST execution units) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 is by-passed such that data 92 is provided directly to the DS error encoding module 112. The control module 116 coordinates the by-passing of the data partitioning module 110 by outputting a bypass 220 message to the data partitioning module 110.

The DS error encoding module 112 receives the data 92 in a serial manner, a parallel manner, and/or a combination thereof. The DS error encoding module 112 DS error encodes the data in accordance with control information 160 from the control module 116 to produce encoded data slices 218. The DS error encoding includes segmenting the data 92 into data segments, segment security processing (e.g., encryption, compression, watermarking, integrity check (e.g., CRC, etc.)), error encoding, slicing, and/or per slice security processing (e.g., encryption, compression, watermarking, integrity check (e.g., CRC, etc.)). The control information 160 indicates which steps of the DS error encoding are active for the data 92 and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 218 of the data segments into pillars of slices 216. The number of pillars corresponds to the pillar width of the DS error encoding parameters. In this example, the distributed task control module 118 facilitates the storage request.

Figure 22:
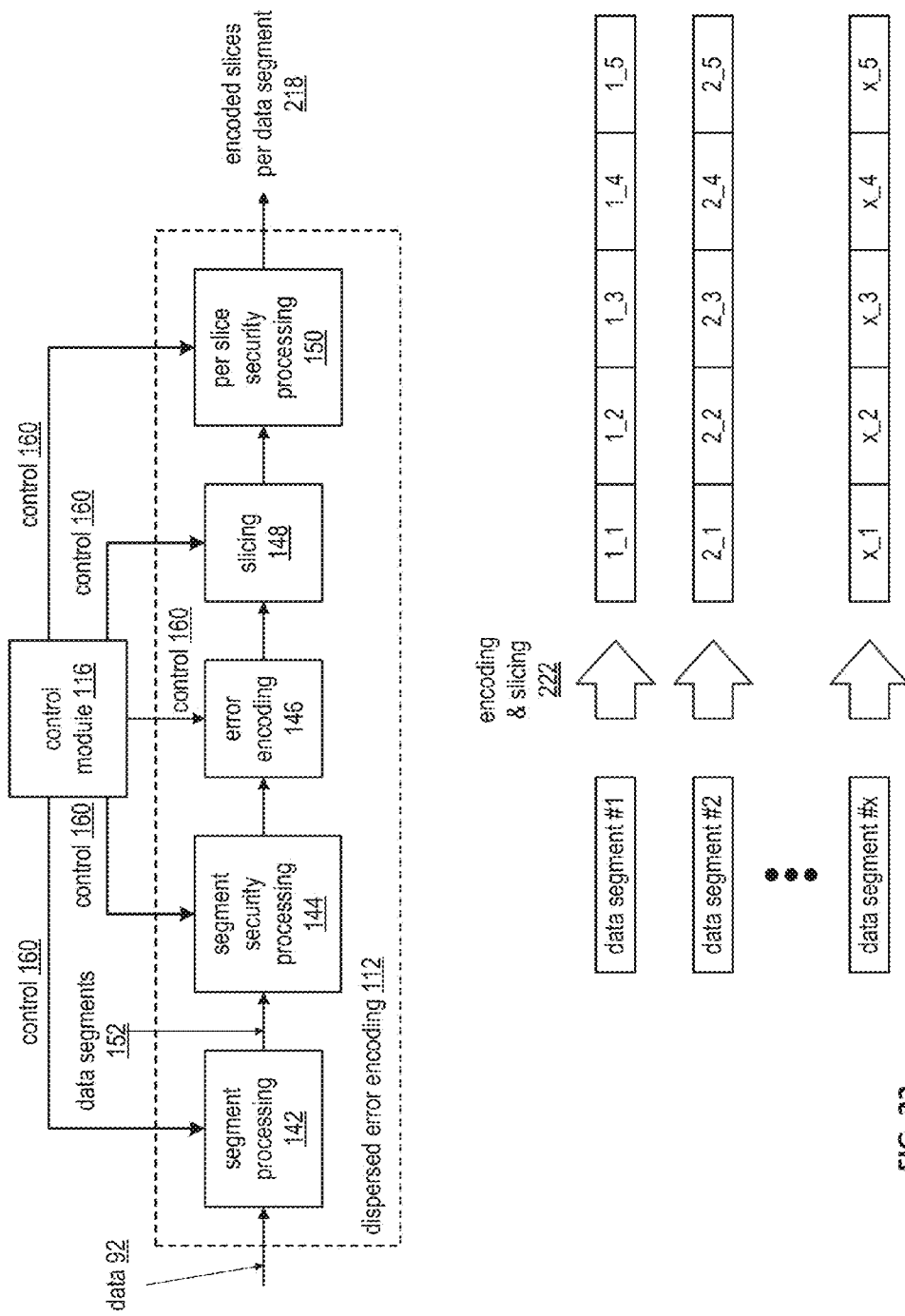
FIG. 22 is a schematic block diagram of an example of a dispersed error encoding for the example of FIG. 21 in accordance with the present invention.

FIG. 22 is a schematic block diagram of an example of a dispersed storage (DS) error encoding module 112 for the example of FIG. 21. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives data 92 and receives segmenting information as control information 160 from the control module 116. The segmenting information indicates how the segment processing module is to segment the data. For example, the segmenting information indicates the size of each data segment. The segment processing module 142 segments the data 92 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., CRC, etc.), and/or any other type of digital security. For example, when the segment security processing module 144 is enabled, it compresses a data segment 152, encrypts the compressed data segment, and generates a CRC value for the encrypted data segment to produce a secure data segment. When the segment security processing module 144 is not enabled, it passes the data segments 152 to the error encoding module 146 or is bypassed such that the data segments 152 are provided to the error encoding module 146.

The error encoding module 146 encodes the secure data segments in accordance with error correction encoding parameters received as control information 160 from the control module 116. The error correction encoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment to produce an encoded data segment.

The slicing module 148 slices the encoded data segment in accordance with a pillar width of the error correction encoding parameters. For example, if the pillar width is five, the slicing module slices an encoded data segment into a set of five encoded data slices. As such, for a plurality of data segments, the slicing module 148 outputs a plurality of sets of encoded data slices as shown within encoding and slicing function 222 as described.

The per slice security processing module 150, when enabled by the control module 116, secures each encoded data slice based on slice security information received as control information 160 from the control module 116. The slice security information includes data compression, encryption, watermarking, integrity check (e.g., CRC, etc.), and/or any other type of digital security. For example, when the per slice security processing module 150 is enabled, it may compress an encoded data slice, encrypt the compressed encoded data slice, and generate a CRC value for the encrypted encoded data slice to produce a secure encoded data slice tweaking. When the per slice security processing module 150 is not enabled, it passes the encoded data slices or is bypassed such that the encoded data slices 218 are the output of the DS error encoding module 112.

Figure 23:
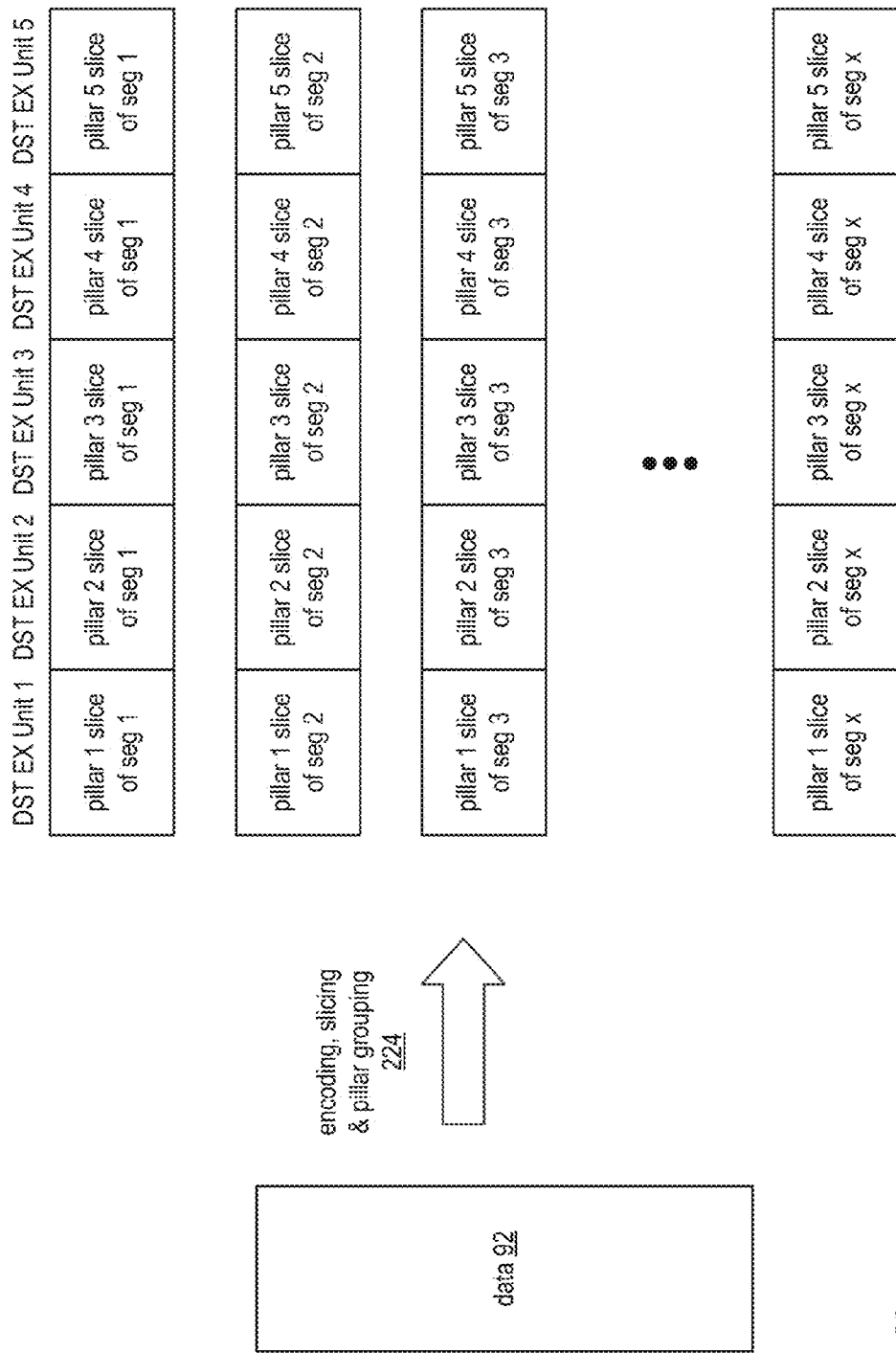
FIG. 23 is a diagram of an example of converting data into pillar slice groups for storage in accordance with the present invention.

FIG. 23 is a diagram of an example of converting data 92 into pillar slice groups utilizing encoding, slicing and pillar grouping function 224 for storage in memory of a distributed storage and task network (DSTN) module. As previously discussed the data 92 is encoded and sliced into a plurality of sets of encoded data slices; one set per data segment. The grouping selector module organizes the sets of encoded data slices into pillars of data slices. In this example, the DS error encoding parameters include a pillar width of 5 and a decode threshold of 3. As such, for each data segment, 5 encoded data slices are created.

The grouping selector module takes the first encoded data slice of each of the sets and forms a first pillar, which may be sent to the first DST execution unit. Similarly, the grouping selector module creates the second pillar from the second slices of the sets; the third pillar from the third slices of the sets; the fourth pillar from the fourth slices of the sets; and the fifth pillar from the fifth slices of the set.

FIG. 24 is a schematic block diagram of an embodiment of a distributed storage and/or task (DST) execution unit that includes an interface 169, a controller 86, memory 88, one or more distributed task (DT) execution modules 90, and a DST client module 34. A computing core 26 may be utilized to implement the one or more DT execution modules 90 and the DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a pillar of slices 216, the DST execution unit receives, via interface 169, a pillar of slices 216 (e.g., pillar #1 slices). The memory 88 stores the encoded data slices 216 of the pillar of slices in accordance with memory control information 174 it receives from the controller 86. The controller 86 (e.g., a processing module, a CPU, etc.) generates the memory control information 174 based on distributed storage information (e.g., user information (e.g., user ID, distributed storage permissions, data access permission, etc.), vault information (e.g., virtual memory assigned to user, user group, etc.), etc.). Similarly, when retrieving slices, the DST execution unit receives, via interface 169, a slice retrieval request. The memory 88 retrieves the slice in accordance with memory control information 174 it receives from the controller 86. The memory 88 outputs the slice 100, via the interface 169, to a requesting entity.

Figure 25:
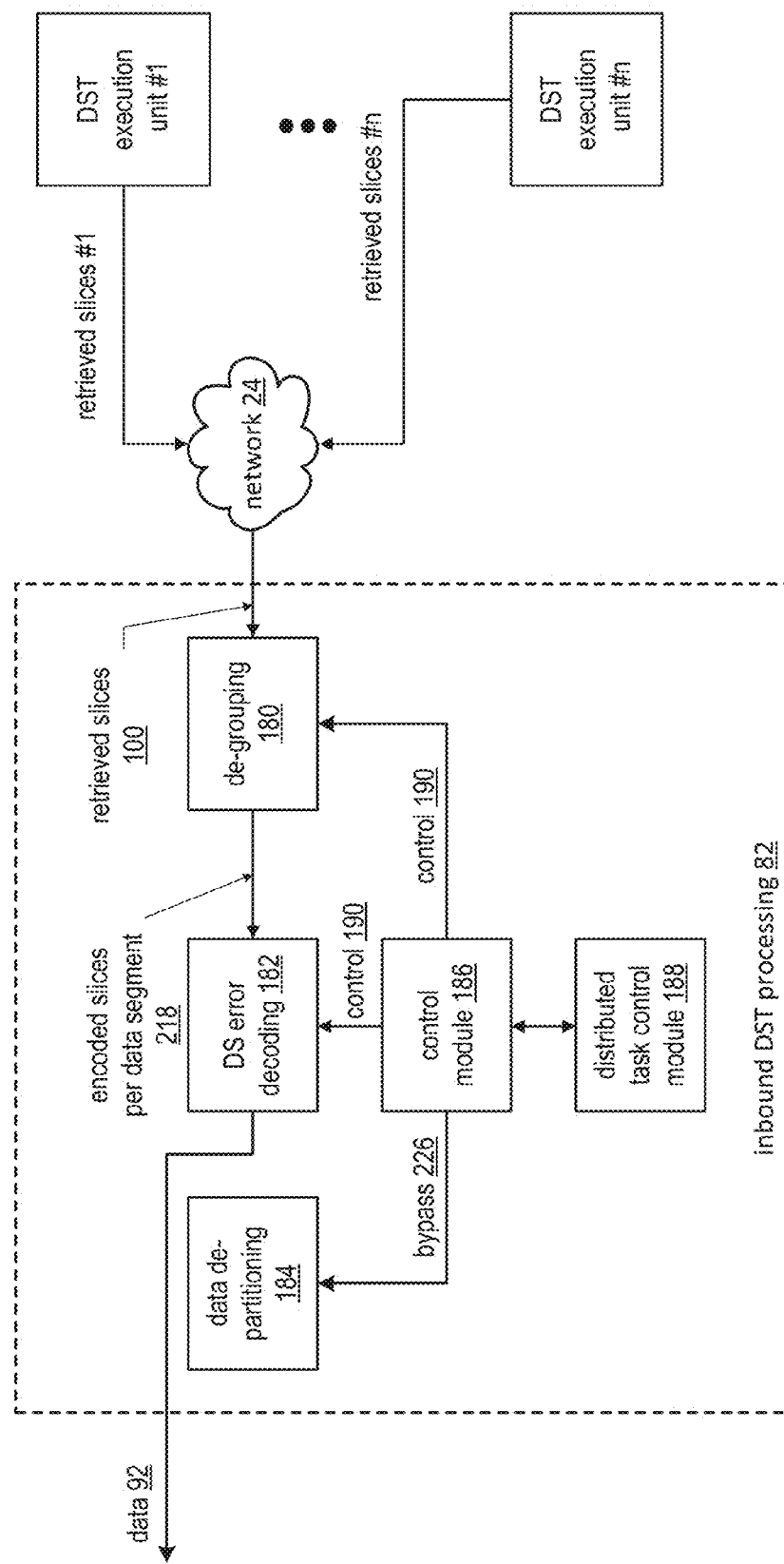
FIG. 25 is a schematic block diagram of an example of operation of inbound distributed storage and/or task (DST) processing for retrieving dispersed error encoded data in accordance with the present invention.

FIG. 25 is a schematic block diagram of an example of operation of an inbound distributed storage and/or task (DST) processing section 82 for retrieving dispersed error encoded data 92. The inbound DST processing section 82 includes a de-grouping module 180, a dispersed storage (DS) error decoding module 182, a data de-partitioning module 184, a control module 186, and a distributed task control module 188. Note that the control module 186 and/or the distributed task control module 188 may be separate modules from corresponding ones of an outbound DST processing section or may be the same modules.

In an example of operation, the inbound DST processing section 82 is retrieving stored data 92 from the DST execution units (i.e., the DSTN module). In this example, the DST execution units output encoded data slices corresponding to data retrieval requests from the distributed task control module 188. The de-grouping module 180 receives pillars of slices 100 and de-groups them in accordance with control information 190 from the control module 186 to produce sets of encoded data slices 218. The DS error decoding module 182 decodes, in accordance with the DS error encoding parameters received as control information 190 from the control module 186, each set of encoded data slices 218 to produce data segments, which are aggregated into retrieved data 92. The data de-partitioning module 184 is by-passed in this operational mode via a bypass signal 226 of control information 190 from the control module 186.

Figure 26:
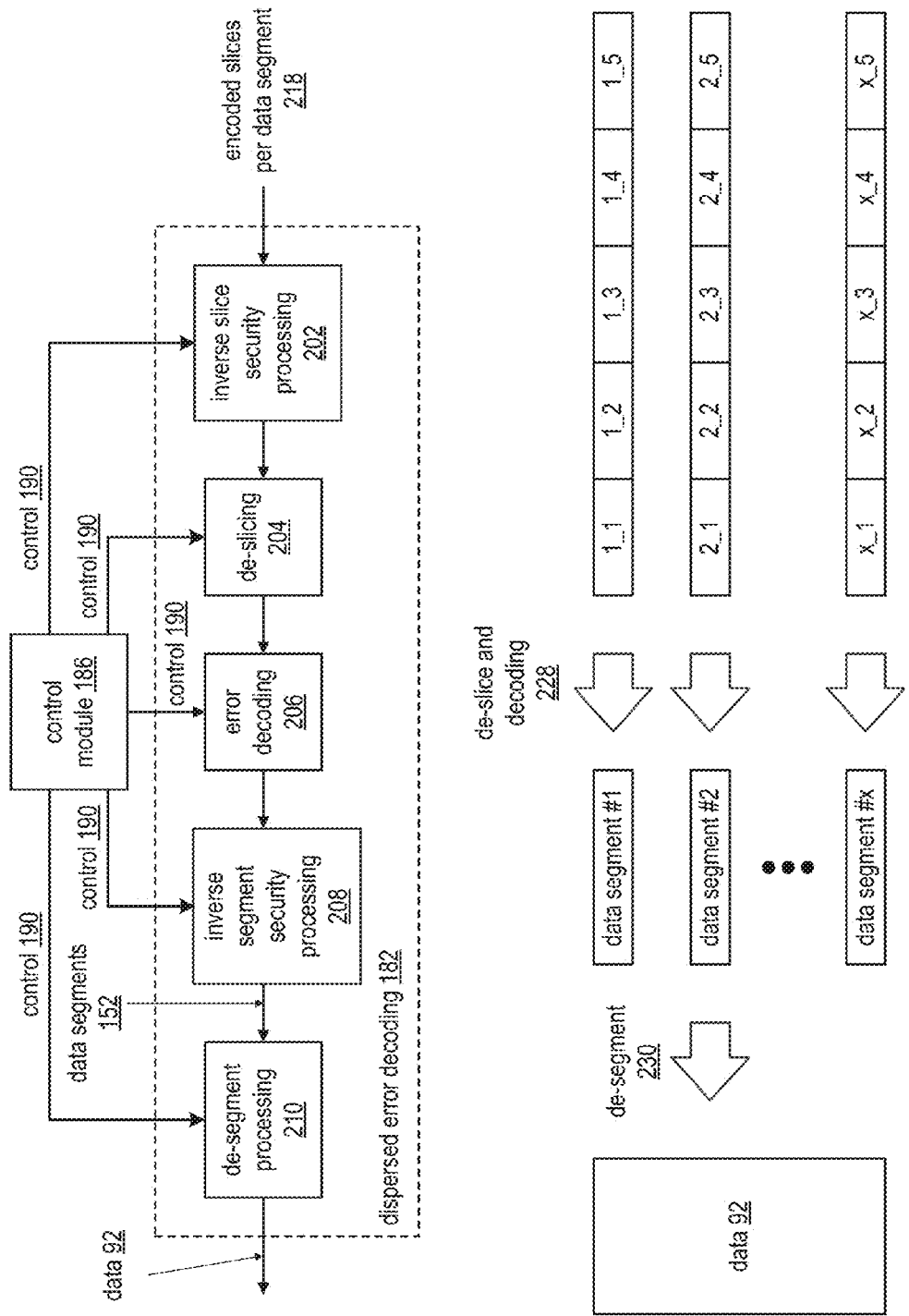
FIG. 26 is a schematic block diagram of an example of a dispersed error decoding for the example of FIG. 25 in accordance with the present invention.

FIG. 26 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, and a de-segmenting processing module 210. The dispersed error decoding module 182 is operable to de-slice and decode encoded slices per data segment 218 utilizing a de-slicing and decoding function 228 to produce a plurality of data segments that are de-segmented utilizing a de-segment function 230 to recover data 92.

In an example of operation, the inverse per slice security processing module 202, when enabled by the control module 186 via control information 190, unsecures each encoded data slice 218 based on slice de-security information (e.g., the compliment of the slice security information discussed with reference to FIG. 6) received as control information 190 from the control module 186. The slice de-security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 218, it decrypts each verified encoded data slice, and decompresses each decrypted encoded data slice to produce slice encoded data. When the inverse per slice security processing module 202 is not enabled, it passes the encoded data slices 218 as the sliced encoded data or is bypassed such that the retrieved encoded data slices 218 are provided as the sliced encoded data.

The de-slicing module 204 de-slices the sliced encoded data into encoded data segments in accordance with a pillar width of the error correction encoding parameters received as control information 190 from a control module 186. For example, if the pillar width is five, the de-slicing module de-slices a set of five encoded data slices into an encoded data segment. Alternatively, the encoded data segment may include just three encoded data slices (e.g., when the decode threshold is 3).

The error decoding module 206 decodes the encoded data segments in accordance with error correction decoding parameters received as control information 190 from the control module 186 to produce secure data segments. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments based on segment security information received as control information 190 from the control module 186. The segment security information includes data decompression, decryption, de-watermarking, integrity check (e.g., CRC, etc.) verification, and/or any other type of digital security. For example, when the inverse segment security processing module is enabled, it verifies integrity information (e.g., a CRC value) of each secure data segment, it decrypts each verified secured data segment, and decompresses each decrypted secure data segment to produce a data segment 152. When the inverse segment security processing module 208 is not enabled, it passes the decoded data segment 152 as the data segment or is bypassed. The de-segmenting processing module 210 aggregates the data segments 152 into the data 92 in accordance with control information 190 from the control module 186.

Figure 27:
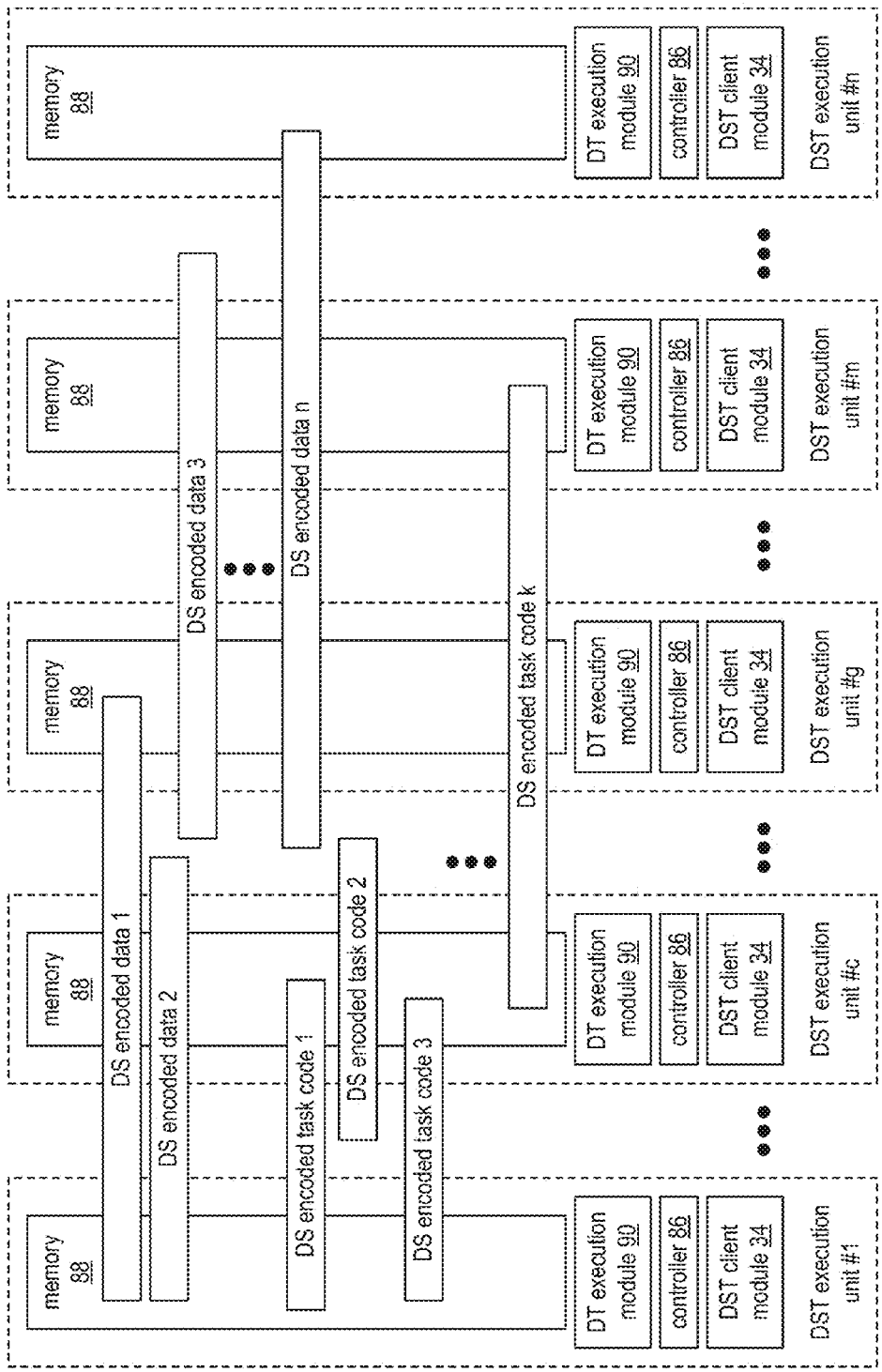
FIG. 27 is a schematic block diagram of an example of a distributed storage and task processing network (DSTN) module storing a plurality of data and a plurality of task codes in accordance with the present invention.

FIG. 27 is a schematic block diagram of an example of a distributed storage and task processing network (DSTN) module that includes a plurality of distributed storage and task (DST) execution units (#1 through #n, where, for example, n is an integer greater than or equal to three). Each of the DST execution units includes a DST client module 34, a controller 86, one or more DT (distributed task) execution modules 90, and memory 88.

In this example, the DSTN module stores, in the memory of the DST execution units, a plurality of DS (dispersed storage) encoded data (e.g., 1 through n, where n is an integer greater than or equal to two) and stores a plurality of DS encoded task codes (e.g., 1 through k, where k is an integer greater than or equal to two). The DS encoded data may be encoded in accordance with one or more examples described with reference to FIGS. 3-19 (e.g., organized in slice groupings) or encoded in accordance with one or more examples described with reference to FIGS. 20-26 (e.g., organized in pillar groups). The data that is encoded into the DS encoded data may be of any size and/or of any content. For example, the data may be one or more digital books, a copy of a company's emails, a large-scale Internet search, a video security file, one or more entertainment video files (e.g., television programs, movies, etc.), data files, and/or any other large amount of data (e.g., greater than a few Terabytes).

The tasks that are encoded into the DS encoded task code may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. The tasks may be encoded into the DS encoded task code in accordance with one or more examples described with reference to FIGS. 3-19 (e.g., organized in slice groupings) or encoded in accordance with one or more examples described with reference to FIGS. 20-26 (e.g., organized in pillar groups).

In an example of operation, a DST client module of a user device or of a DST processing unit issues a DST request to the DSTN module. The DST request may include a request to retrieve stored data, or a portion thereof, may include a request to store data that is included with the DST request, may include a request to perform one or more tasks on stored data, may include a request to perform one or more tasks on data included with the DST request, etc. In the cases where the DST request includes a request to store data or to retrieve data, the client module and/or the DSTN module processes the request as previously discussed with reference to one or more of FIGS. 3-19 (e.g., slice groupings) and/or 20-26 (e.g., pillar groupings). In the case where the DST request includes a request to perform one or more tasks on data included with the DST request, the DST client module and/or the DSTN module process the DST request as previously discussed with reference to one or more of FIGS. 3-19.

In the case where the DST request includes a request to perform one or more tasks on stored data, the DST client module and/or the DSTN module processes the DST request as will be described with reference to one or more of FIGS. 28-39. In general, the DST client module identifies data and one or more tasks for the DSTN module to execute upon the identified data. The DST request may be for a one-time execution of the task or for an on-going execution of the task. As an example of the latter, as a company generates daily emails, the DST request may be to daily search new emails for inappropriate content and, if found, record the content, the email sender(s), the email recipient(s), email routing information, notify human resources of the identified email, etc.

Figure 28:
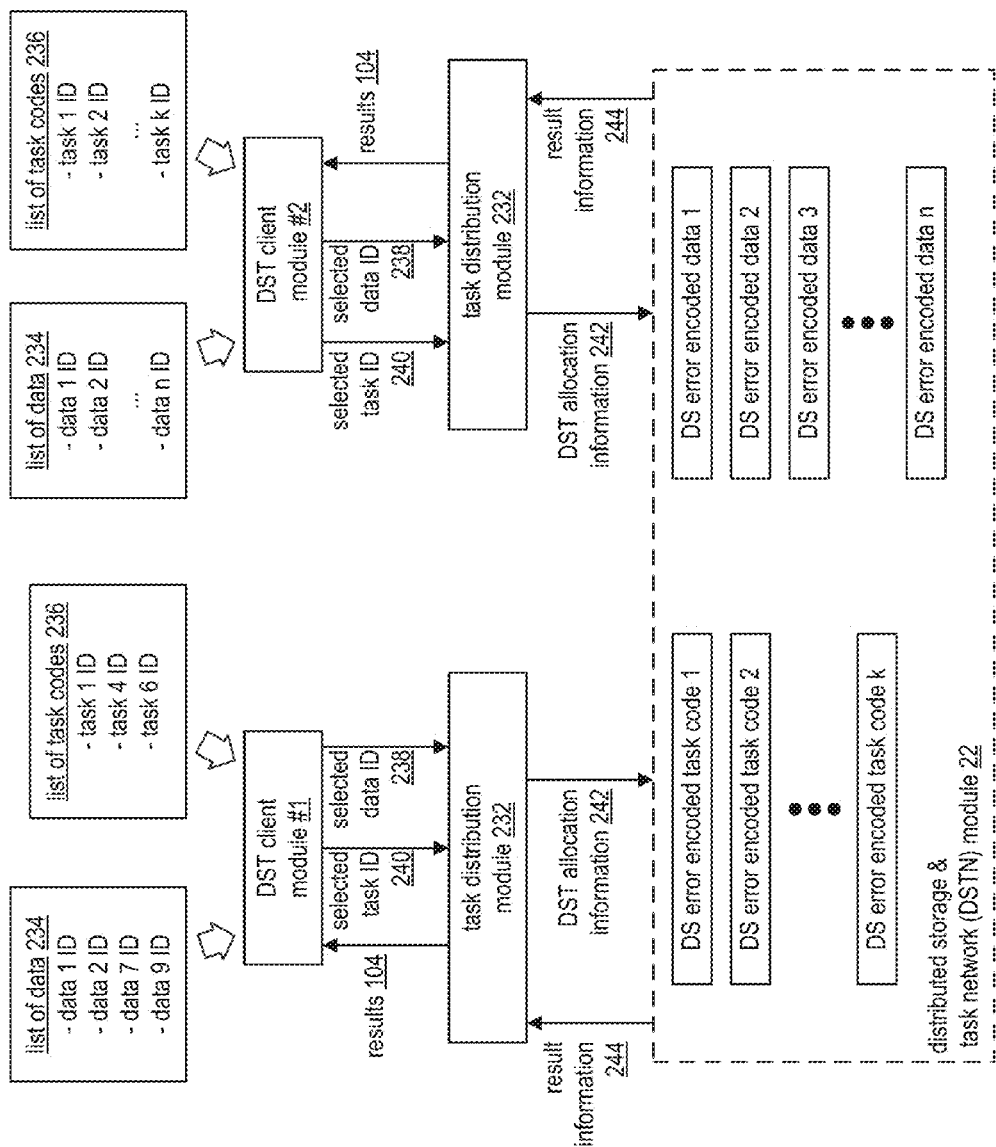
FIG. 28 is a schematic block diagram of an example of the distributed computing system performing tasks on stored data in accordance with the present invention.

FIG. 28 is a schematic block diagram of an example of a distributed computing system performing tasks on stored data. In this example, two distributed storage and task (DST) client modules 1-2 are shown: the first may be associated with a user device and the second may be associated with a DST processing unit or a high priority user device (e.g., high priority clearance user, system administrator, etc.). Each DST client module includes a list of stored data 234 and a list of tasks codes 236. The list of stored data 234 includes one or more entries of data identifying information, where each entry identifies data stored in the DSTN module 22. The data identifying information (e.g., data ID) includes one or more of a data file name, a data file directory listing, DSTN addressing information of the data, a data object identifier, etc. The list of tasks 236 includes one or more entries of task code identifying information, when each entry identifies task codes stored in the DSTN module 22. The task code identifying information (e.g., task ID) includes one or more of a task file name, a task file directory listing, DSTN addressing information of the task, another type of identifier to identify the task, etc.

As shown, the list of data 234 and the list of tasks 236 are each smaller in number of entries for the first DST client module than the corresponding lists of the second DST client module. This may occur because the user device associated with the first DST client module has fewer privileges in the distributed computing system than the device associated with the second DST client module. Alternatively, this may occur because the user device associated with the first DST client module serves fewer users than the device associated with the second DST client module and is restricted by the distributed computing system accordingly. As yet another alternative, this may occur through no restraints by the distributed computing system, it just occurred because the operator of the user device associated with the first DST client module has selected fewer data and/or fewer tasks than the operator of the device associated with the second DST client module.

In an example of operation, the first DST client module selects one or more data entries 238 and one or more tasks 240 from its respective lists (e.g., selected data ID and selected task ID). The first DST client module sends its selections to a task distribution module 232. The task distribution module 232 may be within a stand-alone device of the distributed computing system, may be within the user device that contains the first DST client module, or may be within the DSTN module 22.

Regardless of the task distribution module's location, it generates DST allocation information 242 from the selected task ID 240 and the selected data ID 238. The DST allocation information 242 includes data partitioning information, task execution information, and/or intermediate result information. The task distribution module 232 sends the DST allocation information 242 to the DSTN module 22. Note that one or more examples of the DST allocation information will be discussed with reference to one or more of FIGS. 29-39.

The DSTN module 22 interprets the DST allocation information 242 to identify the stored DS encoded data (e.g., DS error encoded data 2) and to identify the stored DS error encoded task code (e.g., DS error encoded task code 1). In addition, the DSTN module 22 interprets the DST allocation information 242 to determine how the data is to be partitioned and how the task is to be partitioned. The DSTN module 22 also determines whether the selected DS error encoded data 238 needs to be converted from pillar grouping to slice grouping. If so, the DSTN module 22 converts the selected DS error encoded data into slice groupings and stores the slice grouping DS error encoded data by overwriting the pillar grouping DS error encoded data or by storing it in a different location in the memory of the DSTN module 22 (i.e., does not overwrite the pillar grouping DS encoded data).

The DSTN module 22 partitions the data and the task as indicated in the DST allocation information 242 and sends the portions to selected DST execution units of the DSTN module 22. Each of the selected DST execution units performs its partial task(s) on its slice groupings to produce partial results. The DSTN module 22 collects the partial results from the selected DST execution units and provides them, as result information 244, to the task distribution module. The result information 244 may be the collected partial results, one or more final results as produced by the DSTN module 22 from processing the partial results in accordance with the DST allocation information 242, or one or more intermediate results as produced by the DSTN module 22 from processing the partial results in accordance with the DST allocation information 242.

The task distribution module 232 receives the result information 244 and provides one or more final results 104 therefrom to the first DST client module. The final result(s) 104 may be result information 244 or a result(s) of the task distribution module's processing of the result information 244.

In concurrence with processing the selected task of the first DST client module, the distributed computing system may process the selected task(s) of the second DST client module on the selected data(s) of the second DST client module. Alternatively, the distributed computing system may process the second DST client module's request subsequent to, or preceding, that of the first DST client module. Regardless of the ordering and/or parallel processing of the DST client module requests, the second DST client module provides its selected data 238 and selected task 240 to a task distribution module 232. If the task distribution module 232 is a separate device of the distributed computing system or within the DSTN module, the task distribution modules 232 coupled to the first and second DST client modules may be the same module. The task distribution module 232 processes the request of the second DST client module in a similar manner as it processed the request of the first DST client module.

Figure 29:
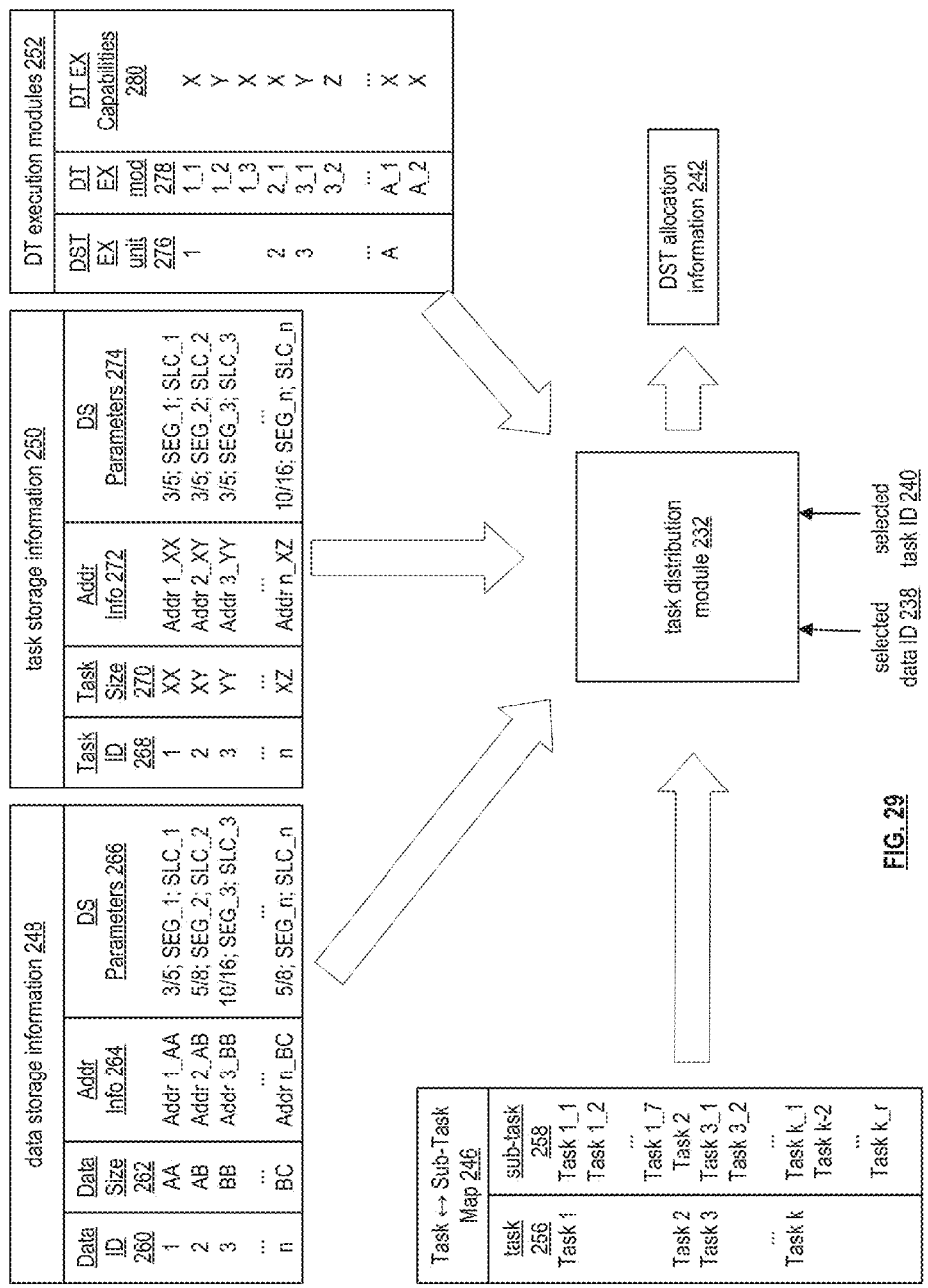
FIG. 29 is a schematic block diagram of an embodiment of a task distribution module facilitating the example of FIG. 28 in accordance with the present invention.

FIG. 29 is a schematic block diagram of an embodiment of a task distribution module 232 facilitating the example of FIG. 28. The task distribution module 232 includes a plurality of tables it uses to generate distributed storage and task (DST) allocation information 242 for selected data and selected tasks received from a DST client module. The tables include data storage information 248, task storage information 250, distributed task (DT) execution module information 252, and task ⇔ sub-task mapping information 246.

The data storage information table 248 includes a data identification (ID) field 260, a data size field 262, an addressing information field 264, distributed storage (DS) information 266, and may further include other information regarding the data, how it is stored, and/or how it can be processed. For example, DS encoded data #1 has a data ID of 1, a data size of AA (e.g., a byte size of a few Terabytes or more), addressing information of Addr_1_AA, and DS parameters of 3/5; SEG_1; and SLC_1. In this example, the addressing information may be a virtual address corresponding to the virtual address of the first storage word (e.g., one or more bytes) of the data and information on how to calculate the other addresses, may be a range of virtual addresses for the storage words of the data, physical addresses of the first storage word or the storage words of the data, may be a list of slice names of the encoded data slices of the data, etc. The DS parameters may include identity of an error encoding scheme, decode threshold/pillar width (e.g., 3/5 for the first data entry), segment security information (e.g., SEG_1), per slice security information (e.g., SLC_1), and/or any other information regarding how the data was encoded into data slices.

The task storage information table 250 includes a task identification (ID) field 268, a task size field 270, an addressing information field 272, distributed storage (DS) information 274, and may further include other information regarding the task, how it is stored, and/or how it can be used to process data. For example, DS encoded task #2 has a task ID of 2, a task size of XY, addressing information of Addr_2_XY, and DS parameters of 3/5; SEG_2; and SLC_2. In this example, the addressing information may be a virtual address corresponding to the virtual address of the first storage word (e.g., one or more bytes) of the task and information on how to calculate the other addresses, may be a range of virtual addresses for the storage words of the task, physical addresses of the first storage word or the storage words of the task, may be a list of slices names of the encoded slices of the task code, etc. The DS parameters may include identity of an error encoding scheme, decode threshold/pillar width (e.g., 3/5 for the first data entry), segment security information (e.g., SEG_2), per slice security information (e.g., SLC_2), and/or any other information regarding how the task was encoded into encoded task slices. Note that the segment and/or the per-slice security information include a type of encryption (if enabled), a type of compression (if enabled), watermarking information (if enabled), and/or an integrity check scheme (if enabled).

The task ⇔ sub-task mapping information table 246 includes a task field 256 and a sub-task field 258. The task field 256 identifies a task stored in the memory of a distributed storage and task network (DSTN) module and the corresponding sub-task fields 258 indicates whether the task includes sub-tasks and, if so, how many and if any of the sub-tasks are ordered. In this example, the task ⇔ sub-task mapping information table 246 includes an entry for each task stored in memory of the DSTN module (e.g., task 1 through task k). In particular, this example indicates that task 1 includes 7 sub-tasks; task 2 does not include sub-tasks, and task k includes r number of sub-tasks (where r is an integer greater than or equal to two).

The DT execution module table 252 includes a DST execution unit ID field 276, a DT execution module ID field 278, and a DT execution module capabilities field 280. The DST execution unit ID field 276 includes the identity of DST units in the DSTN module. The DT execution module ID field 278 includes the identity of each DT execution unit in each DST unit. For example, DST unit 1 includes three DT executions modules (e.g., 1_1, 1_2, and 1_3). The DT execution capabilities field 280 includes identity of the capabilities of the corresponding DT execution unit. For example, DT execution module 1_1 includes capabilities X, where X includes one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.), and/or any information germane to executing one or more tasks.

From these tables, the task distribution module 232 generates the DST allocation information 242 to indicate where the data is stored, how to partition the data, where the task is stored, how to partition the task, which DT execution units should perform which partial task on which data partitions, where and how intermediate results are to be stored, etc. If multiple tasks are being performed on the same data or different data, the task distribution module factors such information into its generation of the DST allocation information.

Figure 30:
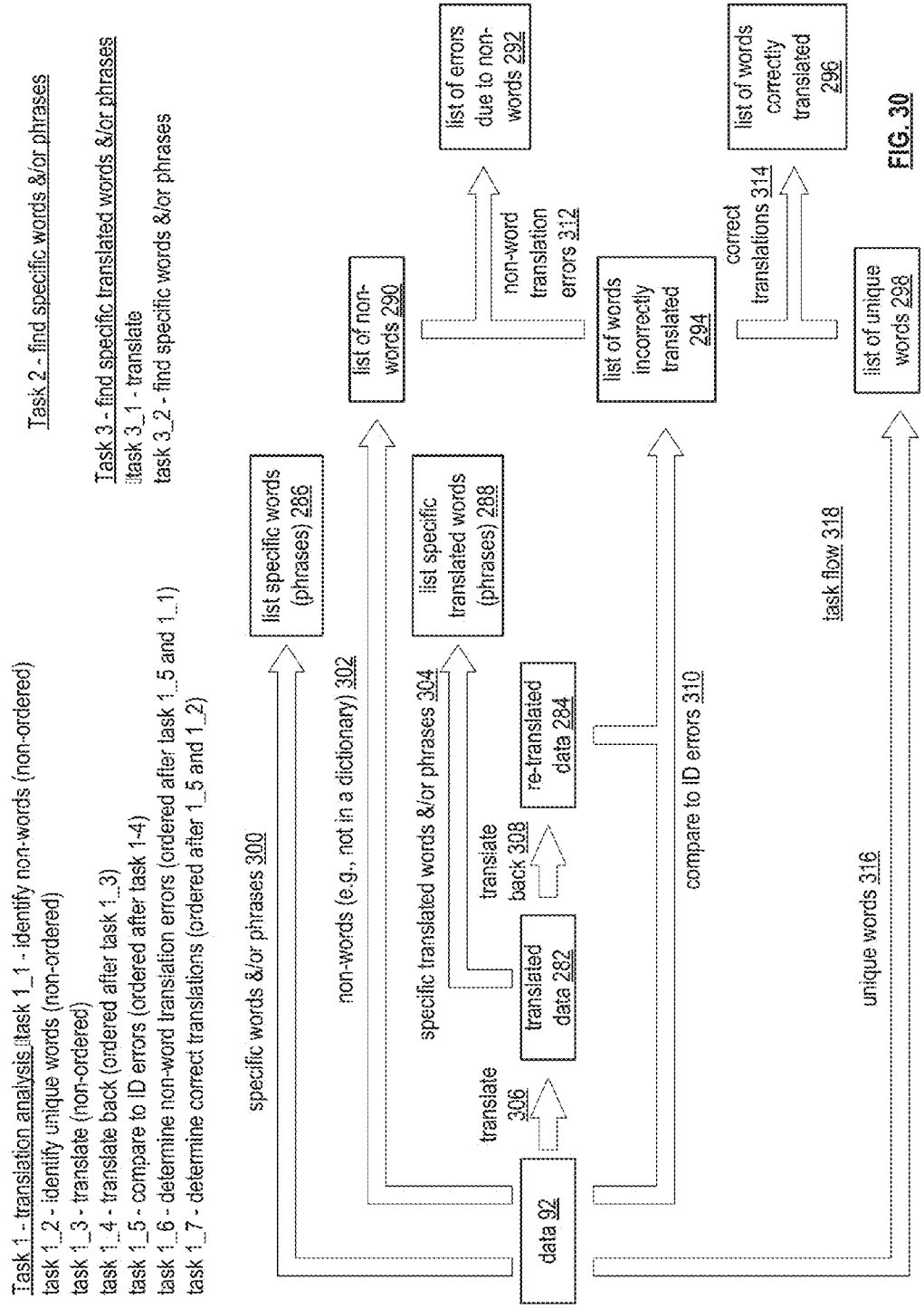
FIG. 30 is a diagram of a specific example of the distributed computing system performing tasks on stored data in accordance with the present invention.

FIG. 30 is a diagram of a specific example of a distributed computing system performing tasks on stored data as a task flow 318. In this example, selected data 92 is data 2 and selected tasks are tasks 1, 2, and 3. Task 1 corresponds to analyzing translation of data from one language to another (e.g., human language or computer language); task 2 corresponds to finding specific words and/or phrases in the data; and task 3 corresponds to finding specific translated words and/or phrases in translated data.

In this example, task 1 includes 7 sub-tasks: task 1_1—identify non-words (non-ordered); task 1_2—identify unique words (non-ordered); task 1_3—translate (non-ordered); task 1_4—translate back (ordered after task 1_3); task 1_5—compare to ID errors (ordered after task 1-4); task 1_6—determine non-word translation errors (ordered after task 1_5 and 1_1); and task 1_7—determine correct translations (ordered after 1_5 and 1_2). The sub-task further indicates whether they are an ordered task (i.e., are dependent on the outcome of another task) or non-order (i.e., are independent of the outcome of another task). Task 2 does not include sub-tasks and task 3 includes two sub-tasks: task 3_1 translate; and task 3_2 find specific word or phrase in translated data.

In general, the three tasks collectively are selected to analyze data for translation accuracies, translation errors, translation anomalies, occurrence of specific words or phrases in the data, and occurrence of specific words or phrases on the translated data. Graphically, the data 92 is translated 306 into translated data 282; is analyzed for specific words and/or phrases 300 to produce a list of specific words and/or phrases 286; is analyzed for non-words 302 (e.g., not in a reference dictionary) to produce a list of non-words 290; and is analyzed for unique words 316 included in the data 92 (i.e., how many different words are included in the data) to produce a list of unique words 298. Each of these tasks is independent of each other and can therefore be processed in parallel if desired.

The translated data 282 is analyzed (e.g., sub-task 3_2) for specific translated words and/or phrases 304 to produce a list of specific translated words and/or phrases 288. The translated data 282 is translated back 308 (e.g., sub-task 1_4) into the language of the original data to produce re-translated data 284. These two tasks are dependent on the translate task (e.g., task 1_3) and thus must be ordered after the translation task, which may be in a pipelined ordering or a serial ordering. The re-translated data 284 is then compared 310 with the original data 92 to find words and/or phrases that did not translate (one way and/or the other) properly to produce a list of incorrectly translated words 294. As such, the comparing task (e.g., sub-task 1_5) 310 is ordered after the translation 306 and re-translation tasks 308 (e.g., sub-tasks 1_3 and 1_4).

The list of words incorrectly translated 294 is compared 312 to the list of non-words 290 to identify words that were not properly translated because the words are non-words to produce a list of errors due to non-words 292. In addition, the list of words incorrectly translated 294 is compared 314 to the list of unique words 298 to identify unique words that were properly translated to produce a list of correctly translated words 296. The comparison may also identify unique words that were not properly translated to produce a list of unique words that were not properly translated. Note that each list of words (e.g., specific words and/or phrases, non-words, unique words, translated words and/or phrases, etc.,) may include the word and/or phrase, how many times it is used, where in the data it is used, and/or any other information requested regarding a word and/or phrase.

Figure 31:
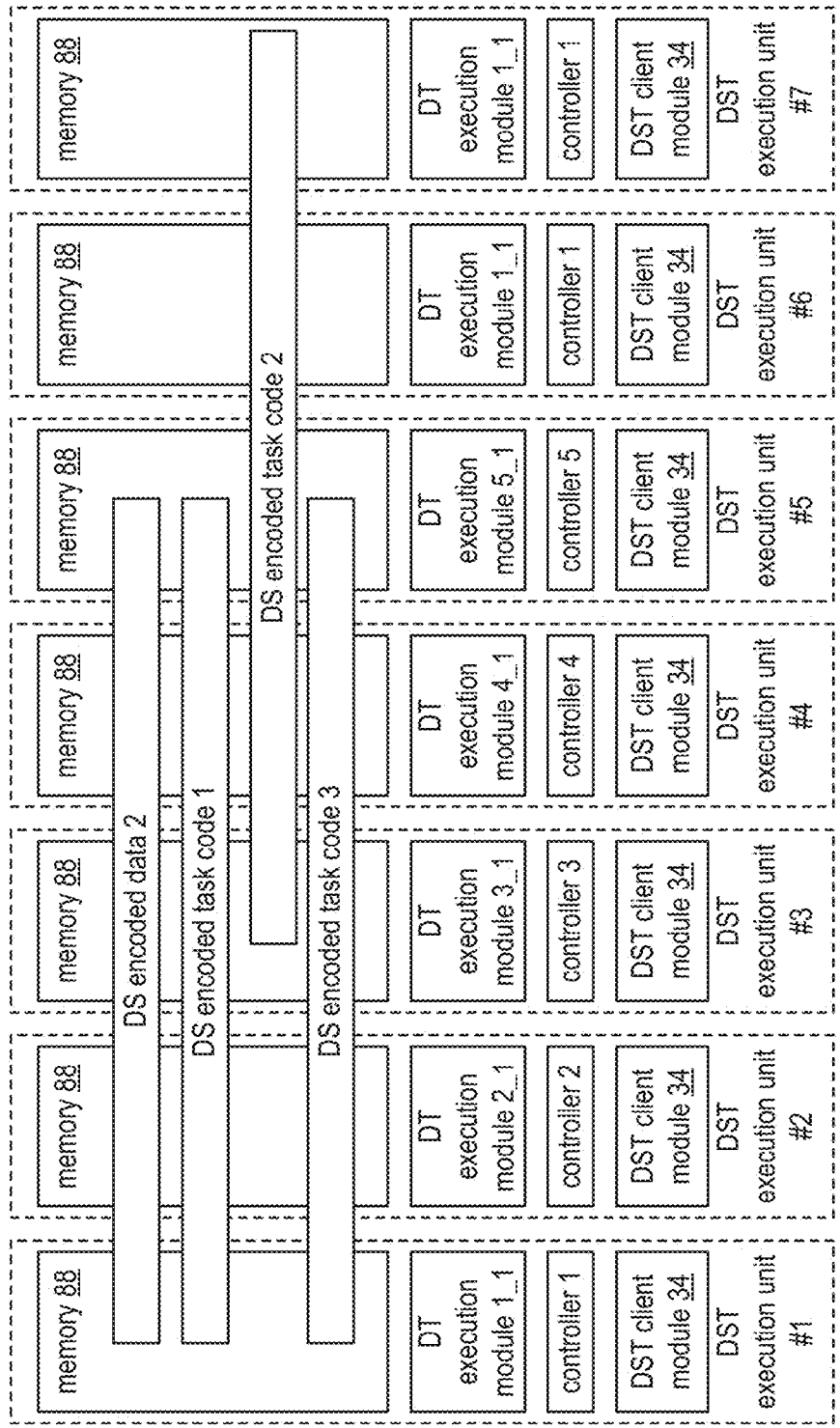
FIG. 31 is a schematic block diagram of an example of a distributed storage and task processing network (DSTN) module storing data and task codes for the example of FIG. 30 in accordance with the present invention.

FIG. 31 is a schematic block diagram of an example of a distributed storage and task processing network (DSTN) module storing data and task codes for the example of FIG. 30. As shown, DS encoded data 2 is stored as encoded data slices across the memory (e.g., stored in memories 88) of DST execution units 1-5; the DS encoded task code 1 (of task 1) and DS encoded task 3 are stored as encoded task slices across the memory of DST execution units 1-5; and DS encoded task code 2 (of task 2) is stored as encoded task slices across the memory of DST execution units 3-7. As indicated in the data storage information table and the task storage information table of FIG. 29, the respective data/task has DS parameters of 3/5 for their decode threshold/pillar width; hence spanning the memory of five DST execution units.

FIG. 32 is a diagram of an example of distributed storage and task (DST) allocation information 242 for the example of FIG. 30. The DST allocation information 242 includes data partitioning information 320, task execution information 322, and intermediate result information 324. The data partitioning information 320 includes the data identifier (ID), the number of partitions to split the data into, address information for each data partition, and whether the DS encoded data has to be transformed from pillar grouping to slice grouping. The task execution information 322 includes tabular information having a task identification field 326, a task ordering field 328, a data partition field ID 330, and a set of DT execution modules 332 to use for the distributed task processing per data partition. The intermediate result information 324 includes tabular information having a name ID field 334, an ID of the DST execution unit assigned to process the corresponding intermediate result 336, a scratch pad storage field 338, and an intermediate result storage field 340.

Continuing with the example of FIG. 30, where tasks 1-3 are to be distributedly performed on data 2, the data partitioning information includes the ID of data 2. In addition, the task distribution module determines whether the DS encoded data 2 is in the proper format for distributed computing (e.g., was stored as slice groupings). If not, the task distribution module indicates that the DS encoded data 2 format needs to be changed from the pillar grouping format to the slice grouping format, which will be done by the by DSTN module. In addition, the task distribution module determines the number of partitions to divide the data into (e.g., 2_1 through 2_z) and addressing information for each partition.

The task distribution module generates an entry in the task execution information section for each sub-task to be performed. For example, task 1_1 (e.g., identify non-words on the data) has no task ordering (i.e., is independent of the results of other sub-tasks), is to be performed on data partitions 2_1 through 2_z by DT execution modules 1_1, 2_1, 3_1, 4_1, and 5_1. For instance, DT execution modules 1_1, 2_1, 3_1, 4_1, and 5_1 search for non-words in data partitions 2_1 through 2_z to produce task 1_1 intermediate results (R1-1, which is a list of non-words). Task 1_2 (e.g., identify unique words) has similar task execution information as task 1_1 to produce task 1_2 intermediate results (R1-2, which is the list of unique words).

Task 1_3 (e.g., translate) includes task execution information as being non-ordered (i.e., is independent), having DT execution modules 1_1, 2_1, 3_1, 4_1, and 5_1 translate data partitions 2_1 through 2_4 and having DT execution modules 1_2, 2_2, 3_2, 4_2, and 5_2 translate data partitions 2_5 through 2_z to produce task 1_3 intermediate results (R1-3, which is the translated data). In this example, the data partitions are grouped, where different sets of DT execution modules perform a distributed sub-task (or task) on each data partition group, which allows for further parallel processing.

Task 1_4 (e.g., translate back) is ordered after task 1_3 and is to be executed on task 1_3's intermediate result (e.g., R1-3_1) (e.g., the translated data). DT execution modules 1_1, 2_1, 3_1, 4_1, and 5_1 are allocated to translate back task 1_3 intermediate result partitions R1-3_1 through R1-3_4 and DT execution modules 1_2, 2_2, 6_1, 7_1, and 7_2 are allocated to translate back task 1_3 intermediate result partitions R1-3_5 through R1-3_z to produce task 1-4 intermediate results (R1-4, which is the translated back data).

Task 1_5 (e.g., compare data and translated data to identify translation errors) is ordered after task 1_4 and is to be executed on task 1_4's intermediate results (R4-1) and on the data. DT execution modules 1_1, 2_1, 3_1, 4_1, and 5_1 are allocated to compare the data partitions (2_1 through 2_z) with partitions of task 1-4 intermediate results partitions R1-4_1 through R1-4_z to produce task 1_5 intermediate results (R1-5, which is the list words translated incorrectly).

Task 1_6 (e.g., determine non-word translation errors) is ordered after tasks 1_1 and 1_5 and is to be executed on tasks 1_1's and 1_5's intermediate results (R1-1 and R1-5). DT execution modules 1_1, 2_1, 3_1, 4_1, and 5_1 are allocated to compare the partitions of task 1_1 intermediate results (R1-1_1 through R1-1_z) with partitions of task 1-5 intermediate results partitions (R1-5_1 through R1-5_z) to produce task 1_6 intermediate results (R1-6, which is the list translation errors due to non-words).

Task 1_7 (e.g., determine words correctly translated) is ordered after tasks 1_2 and 1_5 and is to be executed on tasks 1_2's and 1_5's intermediate results (R1-1 and R1-5). DT execution modules 1_2, 2_2, 3_2, 4_2, and 5_2 are allocated to compare the partitions of task 1_2 intermediate results (R1-2_1 through R1-2_z) with partitions of task 1-5 intermediate results partitions (R1-5_1 through R1-5_z) to produce task 1_7 intermediate results (R1-7, which is the list of correctly translated words).

Task 2 (e.g., find specific words and/or phrases) has no task ordering (i.e., is independent of the results of other sub-tasks), is to be performed on data partitions 2_1 through 2_z by DT execution modules 3_1, 4_1, 5_1, 6_1, and 7_1. For instance, DT execution modules 3_1, 4_1, 5_1, 6_1, and 7_1 search for specific words and/or phrases in data partitions 2_1 through 2_z to produce task 2 intermediate results (R2, which is a list of specific words and/or phrases).

Task 3_2 (e.g., find specific translated words and/or phrases) is ordered after task 1_3 (e.g., translate) is to be performed on partitions R1-3_1 through R1-3_z by DT execution modules 1_2, 2_2, 3_2, 4_2, and 5_2. For instance, DT execution modules 1_2, 2_2, 3_2, 4_2, and 5_2 search for specific translated words and/or phrases in the partitions of the translated data (R1-3_1 through R1-3_z) to produce task 3_2 intermediate results (R3-2, which is a list of specific translated words and/or phrases).

For each task, the intermediate result information indicates which DST unit is responsible for overseeing execution of the task and, if needed, processing the partial results generated by the set of allocated DT execution units. In addition, the intermediate result information indicates a scratch pad memory for the task and where the corresponding intermediate results are to be stored. For example, for intermediate result R1-1 (the intermediate result of task 1_1), DST unit 1 is responsible for overseeing execution of the task 1_1 and coordinates storage of the intermediate result as encoded intermediate result slices stored in memory of DST execution units 1-5. In general, the scratch pad is for storing non-DS encoded intermediate results and the intermediate result storage is for storing DS encoded intermediate results.

FIGS. 33-38 are schematic block diagrams of the distributed storage and task network (DSTN) module performing the example of FIG. 30. In FIG. 33, the DSTN module accesses the data 92 and partitions it into a plurality of partitions 1-z in accordance with distributed storage and task network (DST) allocation information. For each data partition, the DSTN identifies a set of its DT (distributed task) execution modules 90 to perform the task (e.g., identify non-words (i.e., not in a reference dictionary) within the data partition) in accordance with the DST allocation information. From data partition to data partition, the set of DT execution modules 90 may be the same, different, or a combination thereof (e.g., some data partitions use the same set while other data partitions use different sets).

For the first data partition, the first set of DT execution modules (e.g., 1_1, 2_1, 3_1, 4_1, and 5_1 per the DST allocation information of FIG. 32) executes task 1_1 to produce a first partial result 102 of non-words found in the first data partition. The second set of DT execution modules (e.g., 1_1, 2_1, 3_1, 4_1, and 5_1 per the DST allocation information of FIG. 32) executes task 1_1 to produce a second partial result 102 of non-words found in the second data partition. The sets of DT execution modules (as per the DST allocation information) perform task 1_1 on the data partitions until the "z" set of DT execution modules performs task 1_1 on the "zth" data partition to produce a "zth" partial result 102 of non-words found in the "zth" data partition.

As indicated in the DST allocation information of FIG. 32, DST execution unit 1 is assigned to process the first through "zth" partial results to produce the first intermediate result (R1-1), which is a list of non-words found in the data. For instance, each set of DT execution modules 90 stores its respective partial result in the scratchpad memory of DST execution unit 1 (which is identified in the DST allocation or may be determined by DST execution unit 1). A processing module of DST execution 1 is engaged to aggregate the first through "zth" partial results to produce the first intermediate result (e.g., R1_1). The processing module stores the first intermediate result as non-DS error encoded data in the scratchpad memory or in another section of memory of DST execution unit 1.

DST execution unit 1 engages its DST client module to slice grouping based DS error encode the first intermediate result (e.g., the list of non-words). To begin the encoding, the DST client module determines whether the list of non-words is of a sufficient size to partition (e.g., greater than a Terabyte). If yes, it partitions the first intermediate result (R1-1) into a plurality of partitions (e.g., R1-1_1 through R1-1_m). If the first intermediate result is not of sufficient size to partition, it is not partitioned.

For each partition of the first intermediate result, or for the first intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

In FIG. 34, the DSTN module is performing task 1_2 (e.g., find unique words) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_2 in accordance with the DST allocation information. From data partition to data partition, the set of DT execution modules may be the same, different, or a combination thereof. For the data partitions, the allocated set of DT execution modules executes task 1_2 to produce a partial results (e.g., 1$^{st}$ through "zth") of unique words found in the data partitions.

As indicated in the DST allocation information of FIG. 32, DST execution unit 1 is assigned to process the first through "zth" partial results 102 of task 1_2 to produce the second intermediate result (R1-2), which is a list of unique words found in the data 92. The processing module of DST execution 1 is engaged to aggregate the first through "zth" partial results of unique words to produce the second intermediate result. The processing module stores the second intermediate result as non-DS error encoded data in the scratchpad memory or in another section of memory of DST execution unit 1.

DST execution unit 1 engages its DST client module to slice grouping based DS error encode the second intermediate result (e.g., the list of non-words). To begin the encoding, the DST client module determines whether the list of unique words is of a sufficient size to partition (e.g., greater than a Terabyte). If yes, it partitions the second intermediate result (R1-2) into a plurality of partitions (e.g., R1-2_1 through R1-2_m). If the second intermediate result is not of sufficient size to partition, it is not partitioned.

For each partition of the second intermediate result, or for the second intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

In FIG. 35, the DSTN module is performing task 1_3 (e.g., translate) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_3 in accordance with the DST allocation information (e.g., DT execution modules 1_1, 2_1, 3_1, 4_1, and 5_1 translate data partitions 2_1 through 2_4 and DT execution modules 1_2, 2_2, 3_2, 4_2, and 5_2 translate data partitions 2_5 through 2_z). For the data partitions, the allocated set of DT execution modules 90 executes task 1_3 to produce partial results 102 (e.g., $1^{st}$ through "zth") of translated data.

As indicated in the DST allocation information of FIG. 32, DST execution unit 2 is assigned to process the first through "zth" partial results of task 1_3 to produce the third intermediate result (R1-3), which is translated data. The processing module of DST execution 2 is engaged to aggregate the first through "zth" partial results of translated data to produce the third intermediate result. The processing module stores the third intermediate result as non-DS error encoded data in the scratchpad memory or in another section of memory of DST execution unit 2.

DST execution unit 2 engages its DST client module to slice grouping based DS error encode the third intermediate result (e.g., translated data). To begin the encoding, the DST client module partitions the third intermediate result (R1-3) into a plurality of partitions (e.g., R1-3_1 through R1-3_y). For each partition of the third intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is further shown in FIG. 35, the DSTN module is performing task 1_4 (e.g., retranslate) on the translated data of the third intermediate result. To begin, the DSTN module accesses the translated data (from the scratchpad memory or from the intermediate result memory and decodes it) and partitions it into a plurality of partitions in accordance with the DST allocation information. For each partition of the third intermediate result, the DSTN identifies a set of its DT execution modules 90 to perform task 1_4 in accordance with the DST allocation information (e.g., DT execution modules 1_1, 2_1, 3_1, 4_1, and 5_1 are allocated to translate back partitions R1-3_1 through R1-3_4 and DT execution modules 1_2, 2_2, 6_1, 7_1, and 7_2 are allocated to translate back partitions R1-3_5 through R1-3_z). For the partitions, the allocated set of DT execution modules executes task 1_4 to produce partial results 102 (e.g., 1st through "zth") of re-translated data.

As indicated in the DST allocation information of FIG. 32, DST execution unit 3 is assigned to process the first through "zth" partial results of task 1_4 to produce the fourth intermediate result (R1-4), which is retranslated data. The processing module of DST execution 3 is engaged to aggregate the first through "zth" partial results of retranslated data to produce the fourth intermediate result. The processing module stores the fourth intermediate result as non-DS error encoded data in the scratchpad memory or in another section of memory of DST execution unit 3.

DST execution unit 3 engages its DST client module to slice grouping based DS error encode the fourth intermediate result (e.g., retranslated data). To begin the encoding, the DST client module partitions the fourth intermediate result (R1-4) into a plurality of partitions (e.g., R1-4_1 through R1-4_z). For each partition of the fourth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

Figure 36:
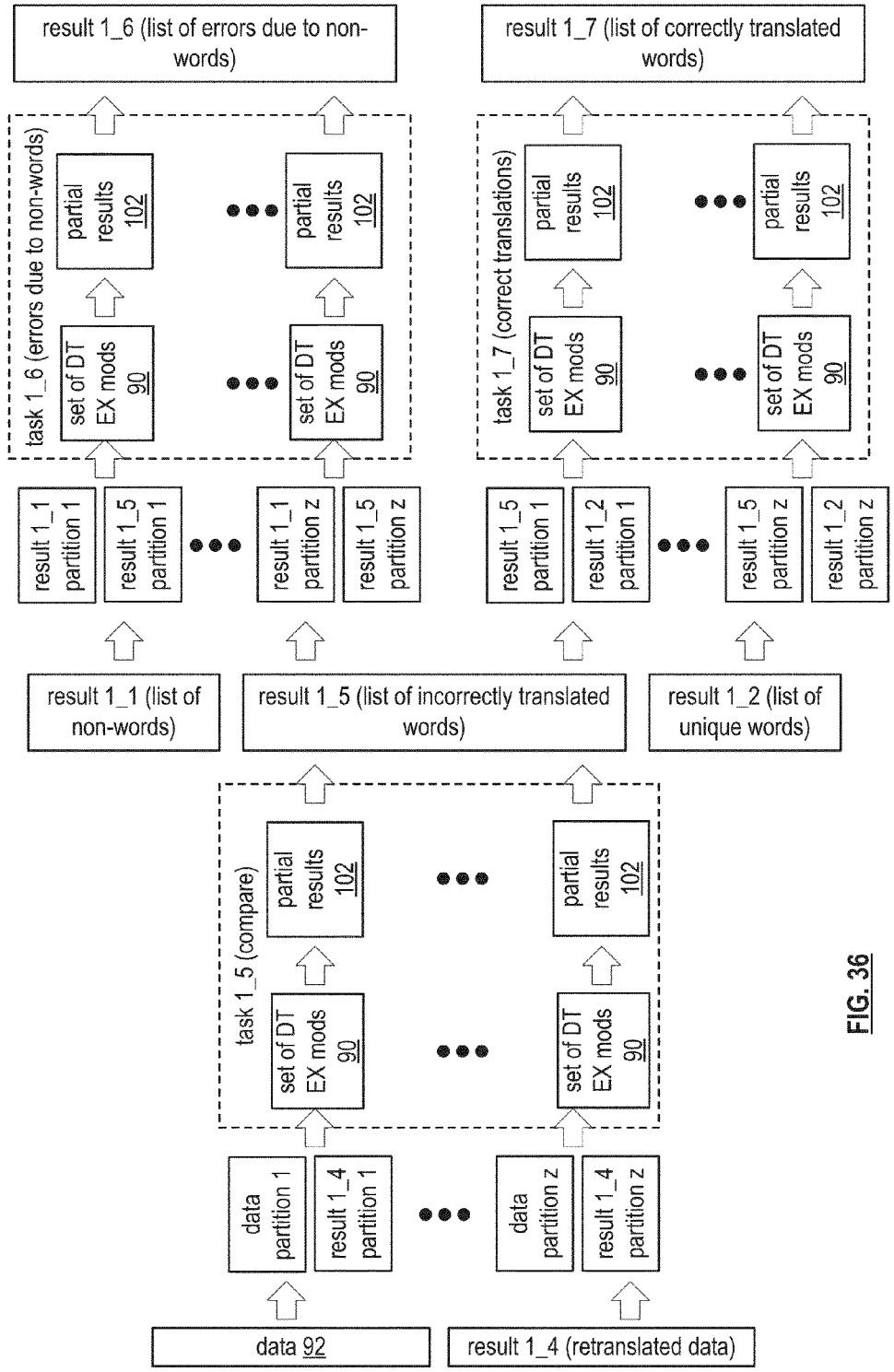

In FIG. 36, a distributed storage and task network (DSTN) module is performing task 1_5 (e.g., compare) on data 92 and retranslated data of FIG. 35. To begin, the DSTN module accesses the data 92 and partitions it into a plurality of partitions in accordance with the DST allocation information or it may use the data partitions of task 1_1 if the partitioning is the same. The DSTN module also accesses the retranslated data from the scratchpad memory, or from the intermediate result memory and decodes it, and partitions it into a plurality of partitions in accordance with the DST allocation information. The number of partitions of the retranslated data corresponds to the number of partitions of the data.

For each pair of partitions (e.g., data partition 1 and retranslated data partition 1), the DSTN identifies a set of its DT execution modules 90 to perform task 1_5 in accordance with the DST allocation information (e.g., DT execution modules 1_1, 2_1, 3_1, 4_1, and 5_1). For each pair of partitions, the allocated set of DT execution modules executes task 1_5 to produce partial results 102 (e.g., $1^{st}$ through "zth") of a list of incorrectly translated words and/or phrases.

As indicated in the DST allocation information of FIG. 32, DST execution unit 1 is assigned to process the first through "zth" partial results of task 1_5 to produce the fifth intermediate result (R1-5), which is the list of incorrectly translated words and/or phrases. In particular, the processing module of DST execution 1 is engaged to aggregate the first through "zth" partial results of the list of incorrectly translated words and/or phrases to produce the fifth intermediate result. The processing module stores the fifth intermediate result as non-DS error encoded data in the scratchpad memory or in another section of memory of DST execution unit 1.

DST execution unit 1 engages its DST client module to slice grouping based DS error encode the fifth intermediate result. To begin the encoding, the DST client module partitions the fifth intermediate result (R1-5) into a plurality of partitions (e.g., R1-5_1 through R1-5_z). For each partition of the fifth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5 per the DST allocation information).

As is further shown in FIG. 36, the DSTN module is performing task 1_6 (e.g., translation errors due to non-words) on the list of incorrectly translated words and/or phrases (e.g., the fifth intermediate result R1-5) and the list of non-words (e.g., the first intermediate result R1-1). To begin, the DSTN module accesses the lists and partitions them into a corresponding number of partitions.

For each pair of partitions (e.g., partition R1-1_1 and partition R1-5_1), the DSTN identifies a set of its DT execution modules 90 to perform task 1_6 in accordance with the DST allocation information (e.g., DT execution modules 1_1, 2_1, 3_1, 4_1, and 5_1). For each pair of partitions, the allocated set of DT execution modules executes task 1_6 to produce partial results 102 (e.g., $1^{st}$ through "zth") of a list of incorrectly translated words and/or phrases due to non-words.

As indicated in the DST allocation information of FIG. 32, DST execution unit 2 is assigned to process the first through "zth" partial results of task 1_6 to produce the sixth intermediate result (R1-6), which is the list of incorrectly translated words and/or phrases due to non-words. In particular, the processing module of DST execution 2 is engaged to aggregate the first through "zth" partial results of the list of incorrectly translated words and/or phrases due to non-words to produce the sixth intermediate result. The processing module stores the sixth intermediate result as non-DS error encoded data in the scratchpad memory or in another section of memory of DST execution unit 2.

DST execution unit 2 engages its DST client module to slice grouping based DS error encode the sixth intermediate result. To begin the encoding, the DST client module partitions the sixth intermediate result (R1-6) into a plurality of partitions (e.g., R1-6_1 through R1-6_z). For each partition of the sixth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is still further shown in FIG. 36, the DSTN module is performing task 1_7 (e.g., correctly translated words and/or phrases) on the list of incorrectly translated words and/or phrases (e.g., the fifth intermediate result R1-5) and the list of unique words (e.g., the second intermediate result R1-2). To begin, the DSTN module accesses the lists and partitions them into a corresponding number of partitions.

For each pair of partitions (e.g., partition R1-2_1 and partition R1-5_1), the DSTN identifies a set of its DT execution modules 90 to perform task 1_7 in accordance with the DST allocation information (e.g., DT execution modules 1_2, 2_2, 3_2, 4_2, and 5_2). For each pair of partitions, the allocated set of DT execution modules executes task 1_7 to produce partial results 102 (e.g., $1^{st}$ through "zth") of a list of correctly translated words and/or phrases.

As indicated in the DST allocation information of FIG. 32, DST execution unit 3 is assigned to process the first through "zth" partial results of task 1_7 to produce the seventh intermediate result (R1-7), which is the list of correctly translated words and/or phrases. In particular, the processing module of DST execution 3 is engaged to aggregate the first through "zth" partial results of the list of correctly translated words and/or phrases to produce the seventh intermediate result. The processing module stores the seventh intermediate result as non-DS error encoded data in the scratchpad memory or in another section of memory of DST execution unit 3.

DST execution unit 3 engages its DST client module to slice grouping based DS error encode the seventh intermediate result. To begin the encoding, the DST client module partitions the seventh intermediate result (R1-7) into a plurality of partitions (e.g., R1-7_1 through R1-7_z). For each partition of the seventh intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

In FIG. 37, the distributed storage and task network (DSTN) module is performing task 2 (e.g., find specific words and/or phrases) on the data 92. To begin, the DSTN module accesses the data and partitions it into a plurality of partitions 1-z in accordance with the DST allocation information or it may use the data partitions of task 1_1 if the partitioning is the same. For each data partition, the DSTN identifies a set of its DT execution modules 90 to perform task 2 in accordance with the DST allocation information. From data partition to data partition, the set of DT execution modules may be the same, different, or a combination thereof. For the data partitions, the allocated set of DT execution modules executes task 2 to produce partial results 102 (e.g., $1^{st}$ through "zth") of specific words and/or phrases found in the data partitions.

As indicated in the DST allocation information of FIG. 32, DST execution unit 7 is assigned to process the first through "zth" partial results of task 2 to produce task 2 intermediate result (R2), which is a list of specific words and/or phrases found in the data. The processing module of DST execution 7 is engaged to aggregate the first through "zth" partial results of specific words and/or phrases to produce the task 2 intermediate result. The processing module stores the task 2 intermediate result as non-DS error encoded data in the scratchpad memory or in another section of memory of DST execution unit 7.

DST execution unit 7 engages its DST client module to slice grouping based DS error encode the task 2 intermediate result. To begin the encoding, the DST client module determines whether the list of specific words and/or phrases is of a sufficient size to partition (e.g., greater than a Terabyte). If yes, it partitions the task 2 intermediate result (R2) into a plurality of partitions (e.g., R2_1 through R2_m). If the task 2 intermediate result is not of sufficient size to partition, it is not partitioned.

For each partition of the task 2 intermediate result, or for the task 2 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, and 7).

In FIG. 38, the distributed storage and task network (DSTN) module is performing task 3 (e.g., find specific translated words and/or phrases) on the translated data (R1-3). To begin, the DSTN module accesses the translated data (from the scratchpad memory or from the intermediate result memory and decodes it) and partitions it into a plurality of partitions in accordance with the DST allocation information. For each partition, the DSTN identifies a set of its DT execution modules to perform task 3 in accordance with the DST allocation information. From partition to partition, the set of DT execution modules may be the same, different, or a combination thereof. For the partitions, the allocated set of DT execution modules 90 executes task 3 to produce partial results 102 (e.g., $1^{st}$ through "zth") of specific translated words and/or phrases found in the data partitions.

As indicated in the DST allocation information of FIG. 32, DST execution unit 5 is assigned to process the first through "zth" partial results of task 3 to produce task 3 intermediate result (R3), which is a list of specific translated words and/or phrases found in the translated data. In particular, the processing module of DST execution 5 is engaged to aggregate the first through "zth" partial results of specific translated words and/or phrases to produce the task 3 intermediate result. The processing module stores the task 3 intermediate result as non-DS error encoded data in the scratchpad memory or in another section of memory of DST execution unit 7.

DST execution unit 5 engages its DST client module to slice grouping based DS error encode the task 3 intermediate result. To begin the encoding, the DST client module determines whether the list of specific translated words and/or phrases is of a sufficient size to partition (e.g., greater than a Terabyte). If yes, it partitions the task 3 intermediate result (R3) into a plurality of partitions (e.g., R3_1 through R3_m). If the task 3 intermediate result is not of sufficient size to partition, it is not partitioned.

For each partition of the task 3 intermediate result, or for the task 3 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, 5, and 7).

FIG. 39 is a diagram of an example of combining result information into final results 104 for the example of FIG. 30. In this example, the result information includes the list of specific words and/or phrases found in the data (task 2 intermediate result), the list of specific translated words and/or phrases found in the data (task 3 intermediate result), the list of non-words found in the data (task 1 first intermediate result R1-1), the list of unique words found in the data (task 1 second intermediate result R1-2), the list of translation errors due to non-words (task 1 sixth intermediate result R1-6), and the list of correctly translated words and/or phrases (task 1 seventh intermediate result R1-7). The task distribution module provides the result information to the requesting DST client module as the results 104.

Figure 40A:
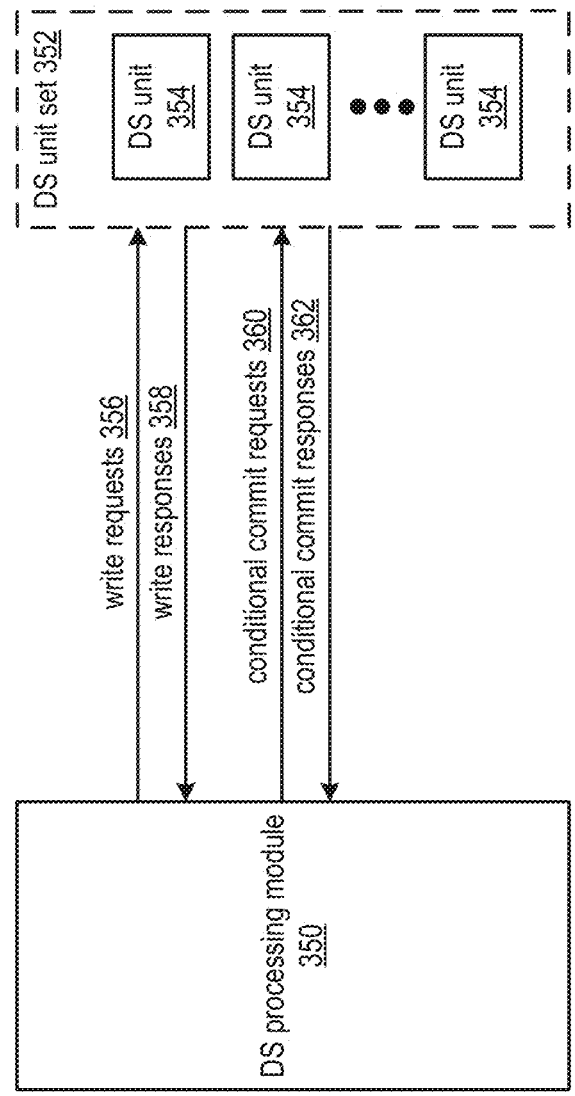
FIG. 40A is a schematic block diagram of an embodiment of a dispersed storage network in accordance with the present invention.

FIG. 40A is a schematic block diagram of an embodiment of a dispersed storage network that includes a dispersed storage (DS) processing module 350 and a DS unit set 352. The DS unit set 352 includes a set of DS units 354. Each DS unit 354 of the set of DS units may be implemented utilizing one or more of a storage node, the distributed storage and task (DST) execution unit 36 of FIG. 1, a storage server, a storage unit, a storage node, a storage module, a memory device, a memory, a user device, the DST processing unit 16 of FIG. 1, and a DST processing module. The DS processing module 350 a be implemented utilizing at least one of a server, a computer, another DS unit 354, a user device, and the DST processing unit 16 of FIG. 1.

The system functions to store data in the DS unit set 352. The storing of the data includes partitioning the data into a plurality of data segments, encoding each of the data segments using a dispersed storage error coding function to produce a corresponding set of encoded data slices, and, for each corresponding set of encoded data slices, facilitating storage of the set of encoded data slices in the DS unit set 352 in accordance with a storage procedure.

The DS processing module 350 and each DS unit 354 of the DS unit set 352 perform the storage of each set of encoded data slices in accordance with the storage procedure. As a specific example, the DS processing module 350 issues at least a write threshold number of write requests 356 to at least a write threshold number of DS units 354 of the DS unit set 352. The DS processing module 350 encodes each data segment of the plurality data segments using a dispersed storage error coding function to produce the corresponding set of encoded data slices. The issuing includes the DS processing module 350 generating the at least a write threshold number of write requests 356 such that each write request 356 includes one or more of a request number, a common transaction number, one or more corresponding encoded data slices, a corresponding slice name for each of the one or more corresponding encoded data slices, and a revision number for each of the one or more corresponding encoded data slices. The issuing may further include the DS processing module 350 sending the at least a write threshold number of write requests to the at least a write threshold number of DS units 354 of the DS unit set 352.

When receiving a write request 356, each DS unit 354 of the DS unit set 352 temporarily stores the write request 356 and issues a write response 358 to the DS processing module 350, where the write response 358 includes one or more of the request number, the common transaction number, and a status code for each of the one or more corresponding encoded data slices. The status code indicates a status with regards to processing of the write request 356, where the status includes at least one of no error, transaction conflict, addressing error, checked write error, and unauthorized access.

When receiving at least a write threshold number of favorable write responses 358 (e.g., status code of no error) from the DS unit set 352, the DS processing module 350 issues at least a write threshold number of conditional commit requests 360 to the DS unit set 352. The issuing includes the DS processing module 350 generating the at least a write threshold number of conditional commit requests 360 and sending the at least a write threshold number of conditional commit requests 360 to the DS unit set 352.

The DS processing module 350 generates each conditional commit request 360 to include one or more of another request number, the common transaction number, and integrity information with regards to the at least the write threshold number of write requests 356. For example, integrity information is generated with regards to write requests 356 associated with a DS unit 354. As another example, the integrity information is generated with regards to each of the at least a write threshold number of DS units 354. The integrity information includes integrity information with regards to one or more of slice names and revision numbers. For example, the integrity information includes integrity information with regards to slice names and revision numbers associated with write requests 356 of a first DS unit 354.

As another example, the integrity information includes integrity information with regards to slice names and revision numbers associated with substantially all write requests 356 to the DS unit set 352. The DS processing module 350 generates the integrity information by performing a deterministic function on the one or more of the one or more of slice names and revision numbers. The deterministic function includes at least one of a hashing function, a cyclic redundancy code function, a mask generating function (MGF), and a hash based message authentication code (HMAC). For example, the DS processing module 350 performs the hashing function on a list of slice names and corresponding revision numbers associated with a second DS unit 354 to produce integrity information for inclusion in a conditional commit request 360 sent to the second DS unit 354.

When receiving a conditional commit request 360 of the at least a write threshold number of conditional commit requests 360, each DS unit 354 determines whether the conditional commit request 360 compares favorably to a corresponding temporarily stored write request 356. The determining includes comparing integrity information from the conditional commit request 360 to calculated integrity information of the temporarily stored write request 356. For example, the DS processing module 350 performs the deterministic function over slice names and revision numbers of the temporarily stored write request 356 to produce write request integrity information. Next, the DS processing module 350 indicates that the comparison is favorable when the write request integrity information compares favorably to the integrity information from the conditional commit request.

When the comparison is favorable, the DS unit 354 stores one or more of the encoded data slices, corresponding slice names, and corresponding revision numbers of the temporarily stored write request (e.g., non-temporarily). When the comparison is unfavorable, the DS unit 354 issues an error message (e.g., an error message to indicate an unfavorable integrity condition, sent to at least one of the DS processing module and a DS managing unit). In addition, the DS unit 354 may issue a conditional commit response 362 of conditional commit responses 362 from the DS unit set 352 to the DS processing module 350 where the conditional commit response 362 indicates whether the comparison is favorable.

Figure 40B:
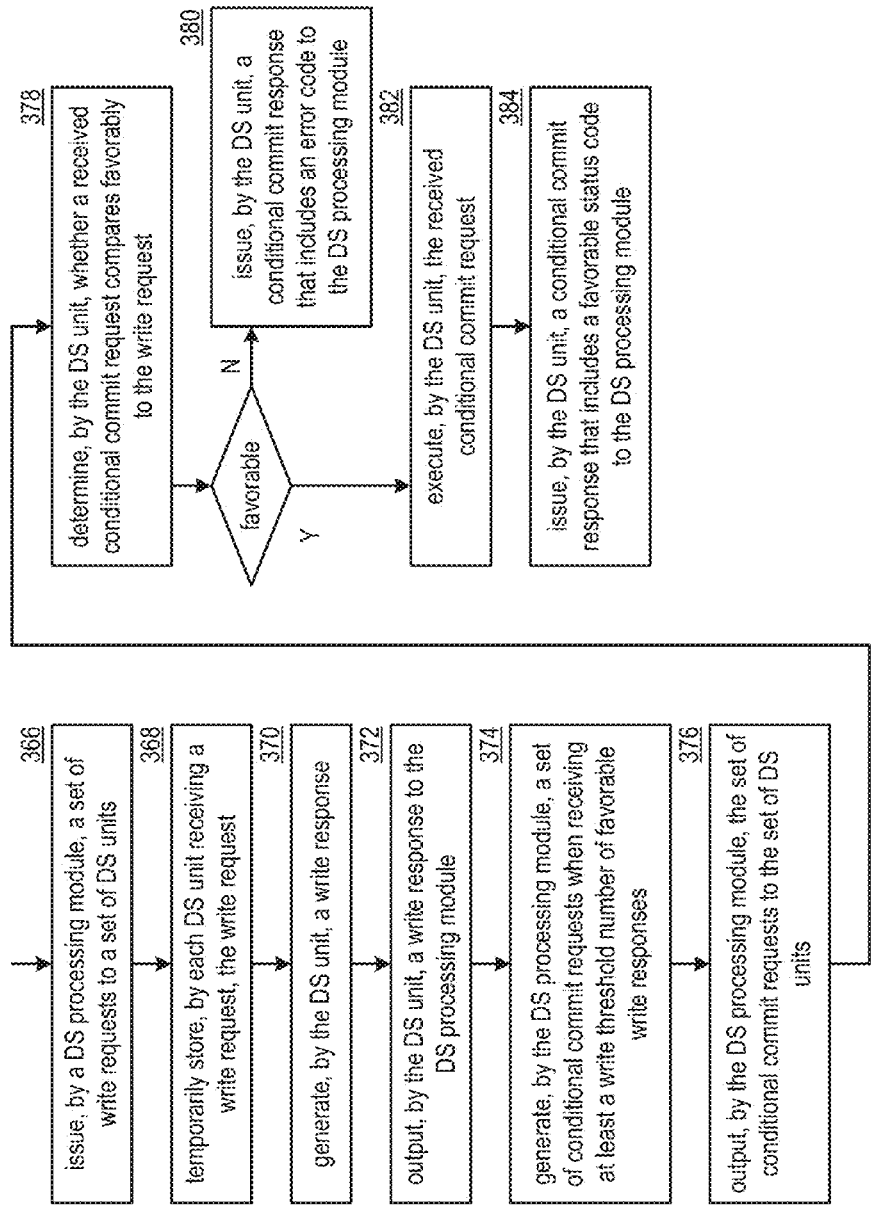
FIG. 40B is a flowchart illustrating an example of confirming the integrity of a write request in accordance with the present invention.

FIG. 40B is a flowchart illustrating an example of confirming the integrity of a write request. The method begins at step 366 where a dispersed storage (DS) processing module issues a set of write requests to a set of DS units. The issuing includes generating and sending at least a write threshold number of write requests to at least a write threshold number of DS units of the set of DS units. The DS processing module generates each write request to include one or more of a request number, a common transaction number, one or more encoded data slices, one or more slice names corresponding to the one or more encoded data slices, and one or more revision numbers corresponding to the one or more encoded data slices. The method continues at step 368 where each DS unit of the set of DS units receiving a write request temporarily stores a corresponding write request of the set of write requests. The method continues at step 370 where the DS unit generates a write response. The DS unit generates the write response to include one or more of the request number, the common transaction number, and a status code to indicate error information with regards to the write request (e.g., no error, transaction conflict, addressing error, checked write error, unauthorized request). The method continues at step 372 where the DS unit outputs the write response to the DS processing module.

The method continues at step 374 where the DS processing module generates a set of conditional commit requests when receiving at least a write threshold number of favorable write responses (e.g., no error) from the set of DS units. The DS processing module generates each conditional commit request of the set of conditional commit requests to include one or more of another request number, the common transaction number, and corresponding integrity information with regards to a corresponding write request of the set of write requests. The generating further includes the DS processing module generating the corresponding integrity information to include integrity information of one or more of a corresponding one or more slice names and a corresponding one or more revision numbers. The integrity information includes a result of performing a deterministic function. For example, the DS processing module performs a mask generating function over one or more slice names and one or more revision numbers corresponding to one or more encoded data slices included in a corresponding write request of the set of write requests. The method continues at step 376 where the DS processing module outputs the set of conditional commit requests to the set of DS units.

The method continues at step 378 where the DS unit determines whether a received conditional commit request compares favorably to the write request. The determining includes comparing integrity information of the received conditional commit request to calculated integrity information of the write request. For example, the DS unit performs the mask generating function over the one or more slice names and the one or more revision numbers corresponding to the one or more encoded data slices included in the write request to produce the calculated integrity information of the write request. The DS unit indicates that the comparison is favorable when the integrity information of the received conditional commit request is substantially the same as the calculated integrity information of the write request. When the comparison is favorable, the method branches to step 382. When the comparison is unfavorable, the method continues to step 380. The method continues at step 380 where the DS unit issues a conditional commit response that includes an error code to the DS processing module when the received commit request compares unfavorably to the write request.

The method continues at step 382 where the DS unit executes the received conditional commit request when the received conditional commit request compares favorably to the write request. The executing includes one or more of storing one or more of the one or more encoded data slices, the one or more slice names, and the one or more revision numbers. The method continues at step 384 where the DS unit issues a conditional commit response that includes a favorable status code to the DS processing module.

Figure 41A:
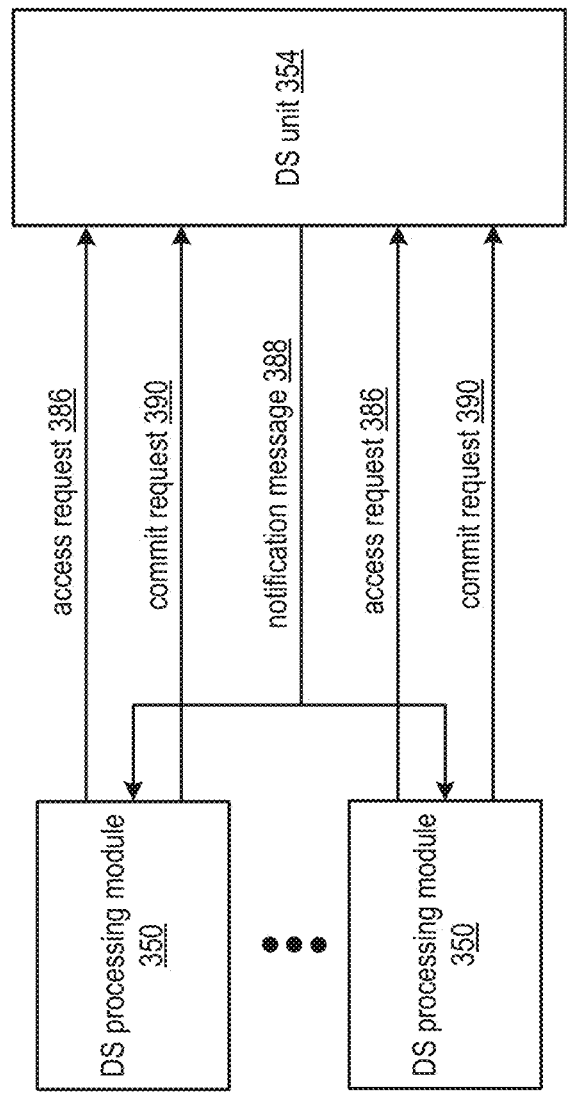
FIG. 41A is a schematic block diagram of another embodiment of a dispersed storage network in accordance with the present invention.

FIG. 41A is a schematic block diagram of another embodiment of a dispersed storage network (DSN) that includes a plurality of dispersed storage (DS) processing modules 350 and a DS unit 354. The DS unit 354 may be implemented utilizing the DS unit 354 of FIG. 40A. Each DS processing module 350 may be implemented utilizing the DS processing module 350 of FIG. 40A.

The system functions to store encoded data slices in the DS unit 354 in accordance with a storage suspension approach. The storage suspension approach includes a first DS processing module 350 of the plurality of DS processing modules 350 issuing an access request 386 to the DS unit 354 to initiate a write transaction process of a transaction. For example, the access request 386 includes a write request. The write request includes one or more of a transaction number of the transaction, a first portion of encoded data slices of a group of encoded data slices of the transaction to be stored in the DS unit 354, and a first portion of slice names of a group of slice names corresponding to the group of encoded data slices where the first portion of slice names corresponds to the first portion of encoded data slices.

The DS unit 354 determines to schedule an unavailable period where the unavailable period includes a timeframe such that access by the plurality of DS processing modules 350 to the DS unit 354 is suspended (e.g., not supported). The DS unit 354 determines to schedule the unavailable period based on one or more of receiving a request to shutdown, detecting an event that requires resetting the DS unit 354, receiving a software upgrade for immediate installation, and determining that a number of pending tasks is greater than a task threshold. The DS unit 354 issues a notification message 388 to the plurality of DS processing modules 350 where the notification message 388 includes one or more of an estimated start time and an estimated end time of the unavailable period. The DS unit 354 generates the notification message 388 based on one or more of estimating a duration of the unavailable period, receiving a request, interpreting an error message, and a predetermination.

When receiving the notification message 388, the first DS processing module 350 suspends issuing any further access requests 386 until the unavailable period has expired. Each of the plurality of DS processing modules 350 suspends issuing access requests 386 to the DS unit 354 until the unavailable period has expired. Each DS processing module 350 determines when the unavailable period has expired by estimating the duration of the unavailable period based on the notification message 388. Prior to initiation of the unavailable period, the first DS processing module 350 issues a commit request 390 to the DS unit 354, where the commit request 390 corresponds to the first portion of encoded data slices. The first DS processing module 350 generates the commit request 390 to include one or more of the transaction number and the first portion of slice names of the group of slice names corresponding to the group of encoded data slices. The first DS processing module sends the commit request 390 to the DS unit 354 prior to the estimated start time of the notification message 388.

Figure 41B:
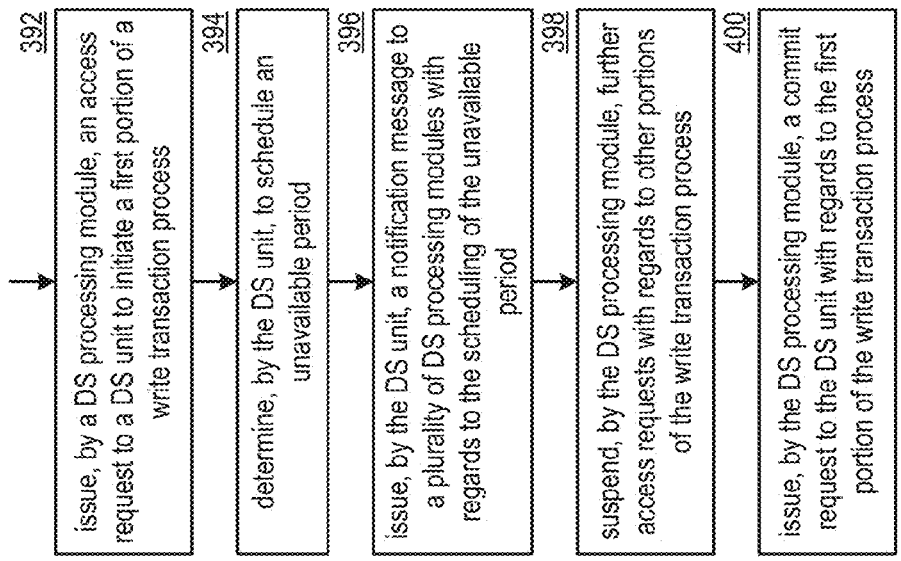
FIG. 41B is a flowchart illustrating an example of accessing a dispersed storage unit in accordance with the present invention.

FIG. 41B is a flowchart illustrating an example of accessing a dispersed storage unit. The method begins at step 392 where a dispersed storage (DS) processing module issues an access request to the DS unit to initiate a first portion of a write transaction process. The issuing includes generating and sending the access request, where the access request includes a write request that includes one or more of a transaction number of the write transaction process, a first portion of encoded data slices of a group of encoded data slices to be written to the DS unit for the write transaction process, and a first portion of slice names corresponding to the first portion of encoded data slices.

The method continues at step 394 where the DS unit determines to schedule an unavailable period. The determining may be based on one or more of receiving a request to shutdown, receiving an error message requiring a DS unit reset, detecting that a software upgrade is to be immediately installed, and determining that a number of pending tasks is greater than a task threshold. The method continues at step 396 where the DS unit issues a notification message to a plurality of DS processing modules that includes the DS processing module, where the notification message is in regards to the scheduling of the unavailable period. The DS unit determines an estimated duration of the unavailable period based on the determining to schedule the unavailable period. For example, the DS unit estimates that five minutes is required to perform a software upgrade. The DS unit generates the notification message to include one or more of an estimated start time and an estimated end time of the unavailable period based on the estimated duration of the unavailable period.

The method continues at step 398 where the DS processing module suspends further access requests with regards to other portions of the write transaction process. The suspending includes one or more of receiving the notification message and queuing any further access requests. The DS processing module reactivates the further access requests when the estimated end time has occurred. The method continues at step 400 where the DS processing module issues a commit request to the DS unit with regards to the first portion of the write transaction process. The issuing includes generating the commit request to include one or more of the transaction number and the first portion of slice names and sending the commit request prior to the estimated start time of the unavailable period.

Figure 42A:
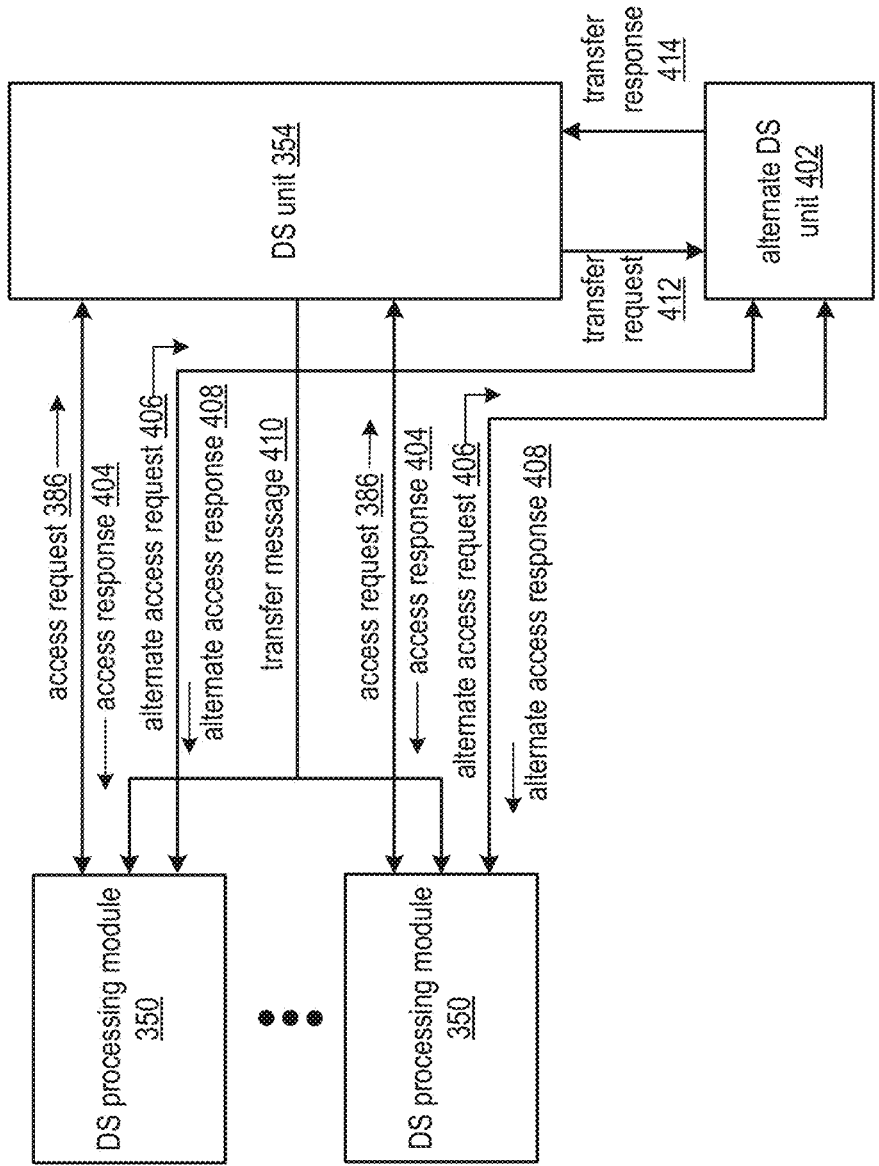
FIG. 42A is a schematic block diagram of another embodiment of a dispersed storage network in accordance with the present invention.

FIG. 42A is a schematic block diagram of another embodiment of a dispersed storage network (DSN) that includes a plurality of dispersed storage (DS) processing modules 350, a DS unit 354, and an alternate DS unit 402. Each of the DS unit 354 and the alternate DS unit 402 may be implemented utilizing the DS unit 354 of FIG. 40A. The DS processing modules 350 may be implemented utilizing the DS processing modules 350 of FIG. 40A.

The system functions to access data stored in the DS unit 354 and/or in the alternate DS unit 402. A DS processing module 350 of the plurality of DS processing modules 350 issues an access request 386 to the DS unit 354 to access an encoded data slice, where the DS processing module 350 selects the DS unit 354 based on a local slice name to location table lookup utilizing a slice name corresponding to the encoded data slice. When the encoded data slice is available at the DS unit 354, the DS unit 354 issues an access response 404 to the DS processing module 350 where the access response 404 includes at least one of an acknowledgment and the encoded data slice.

The DS unit 354 may determine to transfer one or more encoded data slices associated with the DS unit 354 to the alternate DS unit 402. The determining may include one or more of detecting that a utilization level of the DS unit 354 is greater than a utilization threshold, detecting that a performance level of the DS unit 354 is less than a performance threshold level, receiving a request, and receiving an error message. When determining to transfer the one or more encoded data slices, the DS unit 354 issues a transfer request 412 to the alternate DS unit 402 where the transfer request 412 includes one or more of the one or more encoded data slices, one or more slice names associated with the one or more encoded data slices, and one or more revision numbers associated with the one or more encoded data slices.

The alternate DS unit 402 stores content of the transfer request 412 and issues a transfer response 414 to the DS unit 354 where the transfer response 414 includes a signed slice name list that is signed by the alternate DS unit 402. The alternate DS unit 402 aggregates the one or more slice names associated with the one or more encoded data slices and generates a signature over the one or more slice names using a private key associated with the alternate DS unit 402 to produce the signed slice name list.

The DS unit 354 issues a transfer message 410 to the plurality of DS processing modules 350 where the transfer message 410 includes one or more of an identifier of the alternate DS unit 402, the signed slice name list, and a public key associated with the alternate DS unit 402. Each DS processing module 350 of the plurality of DS processing modules 350 updates a corresponding local slice name to location table to associate slice names of the signed slice name list with the alternate DS unit 402 and to disassociate the slice names of the signed slice name list from the DS unit 354.

When accessing at least one encoded data slice of the one or more encoded data slices, each DS processing module 350 issues an alternate access request 406 to the alternate DS unit 402 when the signed slice name list is verified, where the DS processing module 350 selects the alternate DS unit 402 based on a local slice name to location table lookup utilizing a slice name corresponding to the at least one encoded data slice. The DS processing module 350 verifies the signed slice name list by verifying the signature of the signed slice name list using the public key associated with the alternate DS unit 402. The alternate DS unit 402 issues an alternate access response 408 to the DS processing module 350 with regards to the alternate access request 406. For example, the alternate DS unit 402 generates the alternate access response 408 to include the at least one encoded data slice when the alternate access request 406 includes a read slice request for the at least one encoded data slice.

Figure 42B:
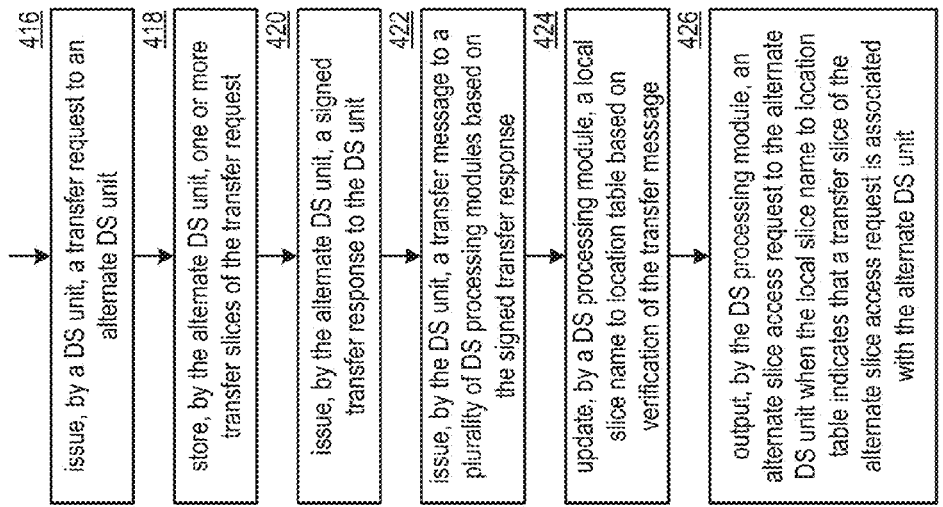
FIG. 42B is a flowchart illustrating an example of accessing transferred slices in accordance with the present invention.

FIG. 42B is a flowchart illustrating an example of accessing transferred slices. The method begins at step 416 where a dispersed storage (DS) unit issues a transfer request to an alternate DS unit. The issuing includes generating the transfer request and outputting the transfer request to the alternate DS unit. The generating includes generating the transfer request to include one or more of one or more encoded data slices for transfer, one or more slice names corresponding to the one or more encoded data slices for transfer, and one or more revision numbers corresponding to the one or more encoded data slices for transfer. The method continues at step 418 where the alternate DS unit stores content of the transfer request including the one or more encoded data slices for transfer.

The method continues at step 420 where the alternate DS unit issues a signed transfer response to the DS unit. The issuing includes generating the signed transfer response and outputting the signed transfer response to the DS unit. The generating includes generating the signed transfer response to include a slice name list of the one or more slice names corresponding to the one or more encoded data slices for transfer and a signature over the slice name list where the alternate DS unit signs the slice name list to produce the signature utilizing a private key associated with a public-private key pair of the alternate DS unit. The method continues at step 422 where the DS unit issues a transfer message to a plurality of DS processing modules based on the signed transfer response. The issuing includes generating the transfer message and outputting the transfer message to the plurality of DS processing modules. The generating includes generating the transfer message to include an identifier of the alternate DS unit, a public key of the public-private key pair of the alternate DS unit, the slice name list, and the signature over the slice name list.

The method continues at step 424 where each DS processing module updates a local slice name to location table based on verifying the transfer message. The DS processing module verifies the transfer message by verifying the signature using the public key of the public-private key pair of the alternate DS unit. When verified, the DS processing module updates the local slice name to location table to associate the one or more slice names with the alternate DS unit and to disassociate the one or more slice names from the DS unit.

The method continues at step 426 where the DS processing module outputs an alternate slice access request to the alternate DS unit when the local slice name to location table indicates that a transferred encoded data slice of the alternate slice access request is associated with the alternate DS unit. The alternate DS unit issues and alternate access response to the DS processing module based on processing of the alternate slice access request (e.g., the transferred encoded data slice for a read request, an acknowledgment for a write request).

Figure 43A:
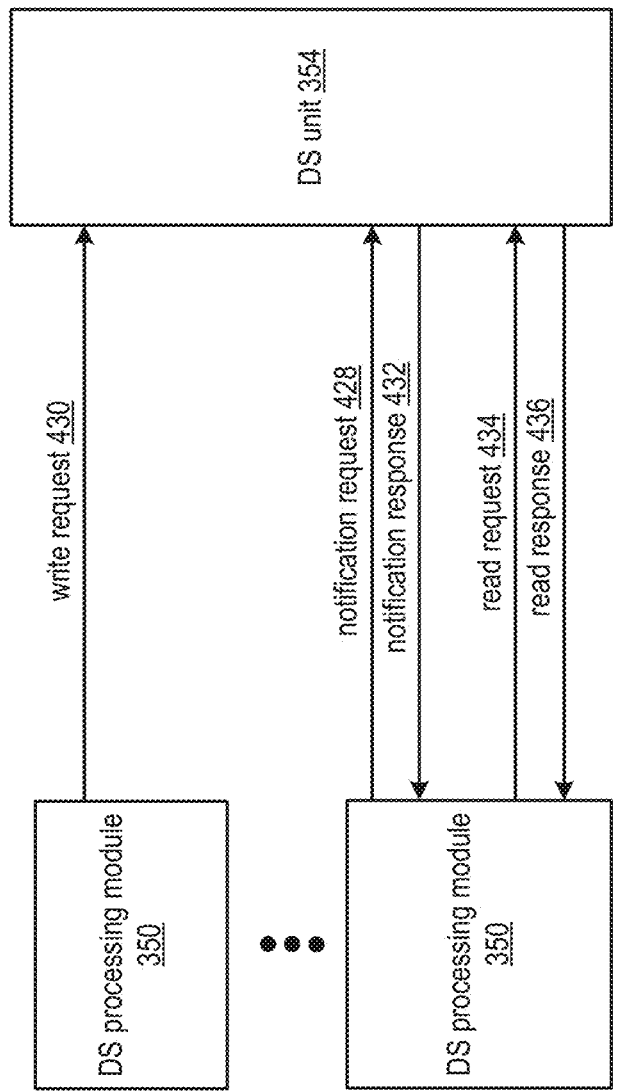
FIG. 43A is a schematic block diagram of another embodiment of a dispersed storage network in accordance with the present invention.

FIG. 43A is a schematic block diagram of another embodiment of a dispersed storage network (DSN) that includes a plurality of dispersed storage (DS) processing modules 350 and a DS unit 354. The DS unit 354 may be implemented utilizing the DS unit 354 of FIG. 40A. Each DS processing module 350 may be implemented utilizing the DS processing module 350 of FIG. 40A. The system functions to provide notification of updates to one or more encoded data slices stored in the DS unit 354. A DS processing module 350 of the plurality of DS processing modules 350 issues a notification request 428 to the DS unit 354, where the notification request 428 includes a slice name of an encoded data slice stored in the DS unit 354 for notification of updates. The issuing includes generating the notification request 428 and outputting the notification request 428 to the DS unit 354. The DS processing module 350 generates the notification request 428 to include one or more of an identifier of the DS processing module 350 and the slice name of the encoded data slice.

Another DS processing module 350 of the plurality of DS processing modules 350 issues a write request 430 to the DS unit 354 to update the encoded data slice stored in the DS unit 354. The write request 430 includes an updated encoded data slice and the slice name of the encoded data slice. The DS unit 354 updates the encoded data slice stored in the DS unit 354 with the updated slice and issues a notification response 432 to the DS processing module 350. The notification response 432 includes one or more of the slice name of the encoded data slice, an indicator indicating that the encoded data slice has been updated, and an indicator indicating that a new encoded data slice has been written (e.g., for a scenario of an initial writing of the encoded data slice).

The DS processing module 350 issues a read request 434 to the DS unit 354 where the read request 434 includes the slice name of the encoded data slice. The DS unit 354 issues a read response 436 to the DS processing module 350 where the read response 436 includes one or more of the updated encoded data slice and the slice name of the encoded data slice. The DS processing module 350 updates a local memory using the updated encoded data slice of the read response 436. For example, the DS processing module 350 overwrites a previous version of the encoded data slice in a cache memory with the updated encoded data slice.

Alternatively, or in addition to, the DS processing module 350, from time to time, issues a read request 434 that includes the slice name and an expected revision number of the encoded data slice. The DS unit 354 generates a read response 436 that includes the updated encoded data slice when the expected revision number does not match a current revision number associated with the updated encoded data slice.

Figure 43B:
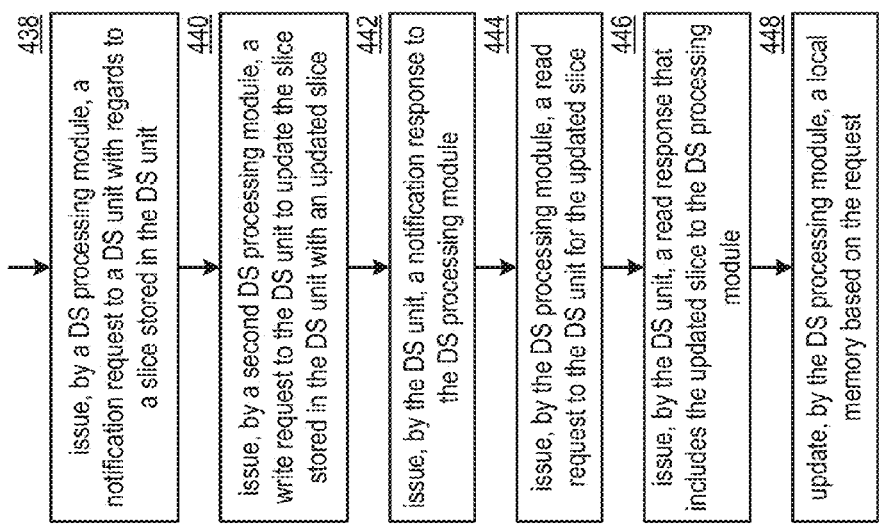
FIG. 43B is a flowchart illustrating an example of updating a locally stored slice in accordance with the present invention.

FIG. 43B is a flowchart illustrating an example of updating a locally stored slice. The method begins at step 438 where dispersed storage (DS) processing module issues a notification request to a DS unit with regards to an encoded data slice stored in the DS unit. The notification request includes one or more of a slice name of the encoded data slice stored in the DS unit for notification of updates, a revision number, and an identifier associated with another DS processing module. The method continues at step 440 where a second DS processing module issues a write request to the DS unit to update the encoded data slice stored in the DS unit with an updated encoded data slice. The write request includes one or more of the slice name of the encoded data slice, an updated encoded data slice, a revision number of the updated encoded data slice, and an identifier associated with the second DS processing module.

The method continues at step 442 where the DS unit issues a notification response to the DS processing module where the notification response includes one or more of the slice name of the encoded data slice, the updated encoded data slice, the revision number of the updated encoded data slice, and the identifier associated with the second DS processing module. The method continues at step 444 where the DS processing module issues a read request to the DS unit for the updated slice where the request includes the slice name of the encoded data slice when the slice name of the notification response is substantially the same as the slice name of the notification request.

The method continues at step 446 where the DS unit issues a read response that includes the updated encoded data slice to the DS processing module. The method continues at step 448 where the DS processing module updates a local memory (e.g., a cache memory) based on the request. The updating includes at least one of overwriting the encoded data slice in a cache memory with the updated encoded data slice and decoding at least a decode threshold number of updated encoded data slices from one or more of the DS unit and other DS units of at least a decode threshold number of DS units to produce an updated data segment for storage in the local memory. Alternatively, or in addition to, the DS processing module, from time to time, issues a read request that includes the slice name and an expected revision number of a currently stored encoded data slice. The DS unit issues a read response that includes a corresponding updated encoded data slice when the expected revision number does not match a current revision number of the currently stored encoded data slice.

FIG. 44A-D are schematic block diagrams of another embodiment of a dispersed storage network (DSN) that includes the distribute storage and task (DST) client module 34 of FIG. 1, the network 24 of FIG. 1, and a DST execution (EX) unit set 450. The DST execution unit set 450 may be referred to hereafter as one or more of DSN memory. The DST client module 34 includes the outbound DS processing module 80 and the inbound DS processing module 82 of FIG. 3. The DST execution unit set 450 includes a set of DST execution units 1-*n*. The set of DST execution units 1-*n* may be referred to hereafter as one or more of a set of storage units and the set of storage units of the DSN memory. Each DST execution unit 1-*n* may be referred to hereafter as one or more of a storage unit and the storage unit of the set of storage units. Each DST execution unit 1-*n* may be implemented utilizing the DST execution unit 36 of FIG. 1. Each DST execution unit 1-*n* includes a processing module 84 and the memory 88 of FIG. 3.

The DSN functions includes accessing (e.g., storing and retrieving) data in the DSN memory in accordance with a manner of storage. The manner of storage includes a conventional manner and a temporary manner. The conventional manner includes one or more of permanently storing the data and enabling any requesting entity to access the data when the permanently stored data (e.g., until purposely deleted) has been successfully stored. The temporary manner includes one or more of temporarily storing the data (e.g., for a temporary storage time frame) and enabling just one requesting entity (e.g., an original requesting entity storing the data) to access the temporarily stored data. The accessing includes one or more of storing the data in the conventional manner, retrieving the data stored in the conventional manner, storing the data in the temporary manner, retrieving the data stored in the temporary manner, updating the data stored in the temporary manner, and converting the data stored in the temporary manner to the conventional manner. As a specific example of storing the data, the DST client module 34 partitions the data into a plurality of data segments, encodes each data segment using a dispersed storage error coding function to produce encoded portions of the data segment (e.g., encoded data slices), and issues write commands (e.g., write slice requests) in accordance with the manner of storage.

FIG. 44A illustrates an example of the storing of the data in the temporary manner. The outbound DS processing module 80 receives a store temporary data request 452, where the store temporary data request 452 includes one or more of the data, a data identifier (ID) of the data, an indicator to utilize the temporary manner, the temporary storage time frame, a data size indicator of the data, a requesting entity ID, a data type indicator, and a vault ID. The data type indicator includes at least one of a new data type indicator, an existing temporarily stored data type indicator, and an existing conventionally stored data type indicator.

Having received the store temporary data request 452, the outbound DS processing module 80 determines whether to store a data segment of the data in the DSN memory in the conventional manner or the temporary manner. The determining may be based on one or more of a predetermination, a lookup, receiving a system management input, accessing a system registry, interpreting a storage request, a data type, a data size, an associated application, and an error message. For example, the outbound DS processing module 80 determines to utilize the temporary manner when the store temporary data request 452 includes the indicator to utilize the temporary manner.

Having determined to store the data segment in the temporary manner, the outbound DS processing module 80 obtains a transaction number in accordance with the conventional manner. The obtaining includes at least one of obtaining a previous transaction number (e.g., from a previous storage operation), manipulating the previous transaction number to produce the transaction number, and receiving the transaction number. For example, the outbound DS processing module 80 retrieves the previous transaction number, increments a portion of the previous transaction number to produce an interim transaction number, and adds an offset (e.g., a milliseconds counter) based on a real time clock to produce the transaction number.

Having obtained the transaction number, the outbound DS processing module 80 encodes the data segment using the dispersed storage error coding function to produce the encoded portions of the data segment. For example, the outbound DS processing module 80 dispersed storage error encodes the data segment to produce encoded data slices T-1-1, T-2-1, T-3-1, through T-n-1 (e.g., temporary data, portions 1-*n*, for a first data segment 1). Having generated the set of encoded portions of the data segment, the outbound DS processing module 80 generates a set of temporary write commands regarding the storage of the data segment in the DSN memory. Hereafter, the set of temporary write commands may be referred to as temporary write slice requests 454. For example, the temporary write slice requests 454 includes a set of temporary write slice requests 1-n. Each temporary write command includes one or more of the transaction number, an encoded portion of the data segment, a slice name corresponding to the encoded portion of the data segment, and an implicit instruction that the encoded portion of the data segment is not to be stored or made accessible in accordance with the conventional manner (e.g., includes the indicator to utilize the temporary manner). Having generated the set of temporary write commands, the outbound DS processing module 80 transmits, via the network 24, the set of temporary write commands to the set of storage units of the DSN memory. Hereafter, even when not explicitly stated, transmitting, sending, receiving, recovering, transferring, etc. between the DST client module 34 and the DST execution unit set 450 may include utilization of the network 24.

A DST execution unit receives, via the network 24, the write command (e.g., the temporary write command) regarding storing the encoded portion of the data segment, where the write command includes the transaction number. Having received the write command, the processing module 84 of the DST execution unit determines whether to store the encoded portion of the data segment in the conventional manner or the temporary manner.

The determining may be based on one or more of a predetermination, a lookup, receiving a system management input, accessing the system registry, interpreting the write command (e.g., interpreting an operation code (opcode), interpreting an indicator, interpreting an instruction), a data type, a data size, an associated application, a requesting entity identifier, a vault identifier, and an error message. As a specific example, the processing module 84 interprets the write command to detect the implicit instruction that the encoded portion of the data segment is not to be stored or made accessible in accordance with the conventional manner. The processing module 84 determines to store the encoded portion of the data segment in the temporary manner when detecting the implicit instruction that the encoded portion of the data segment is not to be stored or made accessible in accordance with the conventional manner.

When the data segment is to be stored in the temporary manner, the processing module 84 temporarily stores the encoded portion of the data segment. For example, the processing module 84 stores the encoded data slices T-1-1, T-2-1, T-3-1, through T-n-1 in the memory 88 for at least a time duration associated with the temporary storage. For instance, the processing module 84 stores encoded data slices in the memory 88 and starts a temporary storage time duration timer. Next, the processing module 84 deletes the encoded data slices from the memory 88 when the temporary storage time duration timer expires. Such a temporary storage time duration timer may be set for one hour, one day, one week, or any other time frame.

Having temporarily stored the encoded portion of the data segment, the processing module 84 records the transaction number regarding temporary storage of the encoded portion of the data segment. For example, the processing module 84 stores the transaction number and a slice name associated with the encoded portion of the data segment in the memory 88. The processing module 84 outputs, via the network 24, a response to the DST client module 34 regarding temporary storage of the encoded portion of the data segment. For example, the processing module 84 issues a temporary write slice response to the DST client module 34, where the response indicates that the encoded portion of the data segment has been successfully stored using the temporary manner.

Alternatively, the data segment may be stored in the conventional manner. When the data segment is to be stored in the conventional manner, the outbound DS processing module 80 obtains the transaction number in accordance with the conventional manner. Having obtained the transaction number, the outbound DS processing module 80 encodes the data segment using the dispersed storage error coding function to produce the encoded portions of the data segment (e.g., encoded data slices A-1-1, A-2-1, A-3-1, through A-n-1). Having produced the encoded portions of the data segment, the outbound DS processing module 80 issues, via the network 24, a set of write commands regarding storage of the data segment to the set of storage units. The issuing includes generating the set of write commands and transmitting the set of write commands to the set of storage units of the DSN memory. The outbound DS processing module 80 generates each write command to include one or more of the transaction number, the encoded portion of the data segment, and the slice name corresponding to the encoded portion of the data segment.

The DST execution unit receives, via the network 24, the write command regarding storing the encoded portion of the data segment, where the write command includes the transaction number. Having received the write command, the processing module 84 of the DST execution unit determines whether to store the encoded portion of the data segment in the conventional manner or the temporary manner. For example, the processing module 84 determines to store the data segment in the conventional manner when the write command does not include the implicit instruction that the encoded portion of the data segment is not to be stored or made accessible in accordance with the conventional manner. When the data segment is to be stored in the conventional manner, the processing module 84 stores the encoded portion of the data segment in the memory 88 and records the transaction number regarding storage of the encoded portion of the data segment. For instance, the processing module 84 stores encoded data slice A-1-1 and the transaction number in the memory 88 when the processing module 84 is associated with DST execution unit 1.

Having stored the encoded portion of the data segment, the processing module 84 generates a response regarding storage of the encoded portion of the data segment. Having generated the response, the processing module 84 outputs, via the network 24, the response to the DST client module 34 regarding the storage of the encoded portion of the data segment. For example, the processing module 84 issues a write slice response to the DST client module 34, where the response indicates that the encoded portion of the data segment has been successfully stored using the conventional manner. The outbound DS processing module 80 receives, via the network 24, responses regarding storage of the encoded portion of the data segment from the DST execution unit set 450, including the write slice response from the processing module 84 of the DST execution unit, as responses to the set of write commands.

FIG. 44B illustrates an example of the retrieving the data stored in the temporary manner. The outbound DS processing module 80 may receive an update temporary data request 456, where the update temporary data request includes one or more of an indicator to update previously stored temporarily stored data, a portion of updated data, the data identifier (ID) of the data, an indicator to utilize the temporary manner, the temporary storage time frame, a data size indicator of the data, a requesting entity ID, a data type indicator, and a vault ID. The data type indicator may indicate the existing temporarily stored data type indicator.

Having received the update temporary data request 456 for the previously stored temporarily stored data, the outbound DS processing module 80 transfers a portion ID 460 of the portion of updated data to the inbound DS processing module 82. The inbound DS processing module 82 identifies a temporarily stored data segment corresponding to the portion of updated data (e.g., based on a segment mapping, an offset, a received byte number). The inbound DS processing module 82 determines to read the temporarily stored data segment from the DSN memory to support subsequent modification of the temporarily stored data segment. Alternatively, the inbound DS processing module 82 receives a request to recover the temporarily stored data segment from the DSN memory.

When the temporarily stored data segment is to be read from the DSN memory, the inbound DS processing module 82 generates a set of temporary read commands. Hereafter, the set of temporary read commands may be referred to as temporary read slice requests 458. For example, the temporary read slice requests 458 includes temporary read slice requests 1-*n*. Each temporary read command of the set of temporary read commands includes the transaction number (e.g., the transaction number of the temporary write commands utilized when the data was originally stored in the DSN memory), identity of the encoded portion (e.g., a slice name), and an explicit instruction to read the encoded portion in violation of the conventional manner (e.g., a temporary read indicator to force reading of the encoded portion even though a write commit command and/or commit transaction request was never received as would have if the encoded portion was stored in the conventional manner).

Having generated the set of temporary read commands, the inbound DS processing module 82 sends the set of temporary read commands to the DST execution unit set 450. For example, the inbound DS processing module 82 sends, via the network 24, temporary read slice requests 1-*n* to DST execution units 1-*n*. A DST execution unit receives, via the network 24, a temporary read command of the set of temporary read commands, where the temporary read command includes one or more of the transaction number, identity of the encoded portion of the data segment, and the explicit instruction to read the encoded portion in violation of the conventional manner.

Having received the temporary read command, the processing module 84 of the DST execution unit retrieves the encoded portion of the data segment (e.g., an encoded data slice) from the memory 88 based on the identity of the encoded portion of the data segment. For example, the processing module 84 retrieves encoded data slice T-1-2 from the memory 88 when the identified data segment is data segment 2 of the temporarily stored data and the DST execution unit is DST execution unit 1. Having retrieved the encoded portion of the data segment, the processing module 84 outputs the encoded portion of the data segment to the DST client module 34 in response to the temporary read command. Each DST execution unit of the DST execution unit set 450 outputs corresponding responses to the set of temporary read commands. For example, the set of DST execution units 1-*n* outputs, via the network 24, temporary read slice responses 1-*n* to the DST client module 34 as temporary read slice responses 462.

The inbound DS processing module 82 receives the temporary read slice responses 462. When receiving at least a decode threshold number of encoded portions of the data segment, the inbound DS processing module 82 dispersed storage error decodes a decode threshold number of encoded portions of the data segment to reproduce the temporarily stored data segment. Alternatively, or in addition to, the inbound DS processing module 82 outputs the reproduced data segment (e.g., the temporarily stored data segment) to a requesting entity.

Alternatively, in an example of the retrieving the data stored in the conventional manner, the inbound DS processing module 82 generates a set of read commands. Each read command includes the identity of the encoded portion of the data segment. Having generated the set of read commands, the inbound DS processing module 82 outputs the set of read commands, via the network 24, to the DST execution unit set 450. The inbound DS processing module 82 receives at least a decode threshold number of read slice responses from the DST execution unit set 450. The inbound DS processing module 82 decodes a decode threshold number of received encoded data slices of the at least a decode threshold number of read slice responses to reproduce the data segment.

FIG. 44C illustrates an example of the updating the data stored in the temporary manner. The updating the data includes at least one of storing new data along with previously stored data and replacing the previously stored data with the new data. The outbound DS processing module 80 receives a portion 464 from the inbound DS processing module 82, where the portion 464 includes the recovered identified temporarily stored data segment discussed in FIG. 44B. The outbound DS processing module 80 updates (e.g., modifies, appends) the recovered identified temporally stored data segment to produce an updated data segment based on the portion of the received updated data from the update temporary data request 456.

Having produced the updated data segment, the outbound DS processing module 80 selects an updating approach based on one or more of a predetermination, interpreting a request, a data type indicator, a data size indicator, a temporary retention indicator, and a temporary storage utilization indicator level. The updating approach includes one of temporarily storing the updated data segment when the data segment (e.g., originally stored corresponding data segment) and the updated data segment are to be stored in the temporary manner; and overwriting the data segment with the updated data segment when the updated data segment is to be stored in the temporary manner by overwriting the data segment. For example, the outbound DS processing module 80 selects the overwriting the data segment with the updated data segment utilizing the updating approach when the temporary storage utilization indicator level is greater than a utilization threshold level.

When the updated data segment is to be stored in the temporary manner by overwriting the data segment, the outbound DS processing module 80 generates a set of temporary over-write commands regarding storage of the updated data segment in the DSN memory. Each temporary over-write command includes the transaction number (e.g., of the original temporary write commands of the data segment), an encoded portion of the updated data segment (e.g., updated encoded data slice T-1-2), and an implicit instruction that the encoded portion of the updated data segment is not to be stored or made accessible in accordance with the conventional manner. Hereafter, the set of temporary over-write commands may be referred to as temporary over-write slice requests 466, where the temporary over-write slice requests 466 includes temporary over-write slice requests 1-*n*. Having generated the set of temporary over-write commands, the outbound DS processing module 80 transmits the set of temporary over-write commands to the set of storage units. For example, the outbound DS processing module 80 transmits, via the network 24, temporary over-write slice requests 1-*n* to DST execution units 1-*n*.

A DST execution unit receives a temporary over-write command that includes the transaction number, the encoded portion of the updated data segment, and the implicit instruction that the encoded portion of the updated data segment is not to be stored or made accessible in accordance with the conventional manner. For example, the processing module 84 of the DST execution unit 1 receives temporary over-write slice request 1 that includes the updated encoded data slice T-1-2. Having received the temporary over-write command, the processing module 84 overwrites the encoded portion of the data segment with the encoded portion of the updated data segment in the memory 88 of the DST execution unit 1. For example, the processing module 84 over-writes, in the memory 88, previously stored encoded data slice associated with the slice name T-1-2 with the updated encoded data slice associated with the slice name T-1-2.

Having overwritten the encoded portion of the data segment with the encoded portion of the updated data segment, the processing module 84 records the transaction number regarding temporary storage of the encoded portion of the updated data segment. For example, the processing module 84 stores the transaction number in the memory 88. Having recorded the transaction number, the processing module 84 outputs a response regarding temporary storage of the encoded portion of the updated data segment. For example, the set of processing modules 84 outputs, via the network 24, a set of temporary over-write slice responses 1-*n* to the DST client module 34 as temporary over-write slice responses 468.

Alternatively, when the data segment and the updated data segment are to be stored in the temporary manner, the outbound DS processing module 80 generates a set of temporary update write commands regarding storage of the data segment in the DSN memory. Each temporary update write command includes the transaction number, the encoded portion of the updated data segment, and an implicit instruction that the encoded portion of the updated data segment is not to be stored or made accessible in accordance with the conventional manner. Having generated the set of temporary update write commands, the outbound DS processing module 80 transmits, via the network 24, the set of temporary update write commands to the set of storage units.

The DST execution unit receives a temporary update write command that includes the transaction number, the encoded portion of an updated data segment, and the implicit instruction that the encoded portion of the updated data segment is not to be stored or made accessible in accordance with the conventional manner. The processing module 84 of the DST execution unit stores the encoded portion of the updated data segment in the memory 88. The processing module 84 records the transaction number regarding the temporary storage of the encoded portion of the updated data segment (e.g., by writing the transaction number to the memory 88). The processing module 84 outputs, via the network 24, a response regarding the temporary storage of the encoded portion of the updated data segment to the DST client module 34.

FIG. 44D illustrates examples of the converting of the data stored in the temporary manner to the conventional manner and further steps of the example of the storing of the data in the conventional manner. As a specific example of the example of converting the data stored in the temporary manner to the conventional manner, the outbound DS processing module 80 receives a permanently store temporary data request 470, where the permanently stored temporary data request 470 includes one or more of the data ID of the data and a conversion timing indicator (e.g., when to perform the conversion).

When the storage of the data segment is to be converted from the temporary manner to the conventional manner, the outbound DS processing module 80 issues, via the network 24, a set of write commit commands to the DST execution unit set 450. Hereafter, the set of write commit commands may be referred to as commit transaction requests 472, where the commit transaction requests 472 includes a set of commit transaction requests 1-*n*. Each write commit command includes the transaction number and instructs a storage unit to conditionally make available a corresponding one of the encoded portions of the data segment (e.g., the encoded portions of the data segment are made visible and hence may be retrieved by any requesting entity).

The processing module 84 of each DST execution unit receives a write commit command, where the write commit command includes the instruction to conditionally make available the temporarily stored encoded portion of the data segment. For example, the processing module 84 makes visible the encoded portion of the data segment and may delete the encoded portion of the data segment when not receiving a finalize command within a finalize time period (e.g., 10 minutes). The set of processing modules 84 of the set of DST execution units 1-*n* output, via the network 24, responses to the write commit command as a set of commit transaction responses 1-*n* forming commit transaction responses 474.

When a threshold number (e.g., a write threshold number) of responses to the set of write commit commands have been received by the outbound DS processing module 80 within a second time period (e.g., 1 minute), the outbound DS processing module 80 issues, via the network 24, a set of write finalize commands. Each write finalize command of the set of finalize commands includes the transaction number and instructs the storage unit to permanently make available the corresponding one of the encoded portions of the data segment. When the threshold number of responses to the set of write commit commands have not been received by the outbound DS processing module 80 within the second time period, the outbound DS processing module 80 issues a set of undo commands to the set of storage units to undo and abort storage of the data segment (e.g., delete each encoded portion of the data segment). The processing module 84 receives receive the finalize command or the undo command, wherein the finalize command includes the instruction to permanently make available the temporarily stored encoded portion of the data segment and the undo command includes the instruction to undo and abort storage of the temporarily stored encoded portion of the data segment.

As a specific example of the further steps of the example of the storing of the data in the conventional manner, the outbound DS processing module 80, subsequent to sending the set of write commands to the DST execution unit set 450, receives the responses to the set of write commands, where each DST execution outputs a response regarding storage of the encoded portion of the data segment. When the threshold number (e.g., the write threshold number) of responses to the set of write commands have been received within a time period, the outbound DS processing module 80 issues, via the network 24, a set of write commit commands to the set of storage units. Each write commit command instructs a storage unit to conditionally make available the corresponding one of the encoded portions of the data segment. When the threshold number of responses to the set of write commands have not been received by the outbound DS processing module 80 within the time period, the outbound DS processing module 80 issues a set of rollback commands to the set of storage units to abort the storage of the data segment.

The processing module 84 receives a write commit command or a rollback command. The write commit command includes the instruction to conditionally make available the encoded portion of the data segment and the rollback command includes the instruction to abort storage of the encoded portion of the data segment. The processing module 84 outputs, via the network 24 a response (e.g., a commit transaction response) to the DST client module 34 in response to the write commit command.

When a threshold number (e.g., a write threshold number) of responses to the set of write commit commands have been received by the outbound DS processing module 80 within a second time period, the outbound DS processing module 80 issues a set of write finalize commands. Each write finalize command instructs the storage unit to permanently make available the corresponding one of the encoded portions of the data segment. When the threshold number of responses to the set of write commit commands have not been received by the outbound DS processing module 80 within the second time period, the outbound DS processing module 80 issues a set of undo commands to the set of storage units to undo and abort the storage of the data segment. The processing module 84 receives the finalize command or the undo command, where the finalize command includes the instruction to permanently make available the encoded portion of the data segment and the undo command includes the instruction to undo and abort storage of the encoded portion of the data segment.

FIG. 44E is a flowchart illustrating an example of temporarily storing data. The method begins at step 480 where a processing module (e.g., of a distributed storage and task client module) determines whether to store a data segment of data in a dispersed storage network (DSN) memory in a conventional manner or a temporary manner. The method branches to step 506 of FIG. 44F when the processing module determines to store the data segment in the conventional manner. The method continues to step 482 when the processing module determines to store the data segment in the temporary manner.

When the data segment is to be stored in the temporary manner, the method continues at step 482 where the processing module obtains a transaction number in accordance with the conventional manner. The method continues at step 484 where the processing module generates a set of temporary write commands regarding the storage of the data segment in the DSN memory. Each temporary write command includes the transaction number, an encoded portion of the data segment, and an implicit instruction that the encoded portion of the data segment is not to be stored or made accessible in accordance with the conventional manner. For example, the processing module encodes the data segment using a dispersed storage error coding function to produce a set of encoded portions of the data segment that includes the encoded portion of the data segment. The method continues at step 486 with the processing module transmits the set of temporary write commands to a set of storage units of the DSN memory.

Having temporarily stored the data segment, the processing module may determine to access the temporarily stored data segment where the accessing includes at least one of reading the temporarily stored data segment, updating the temporarily stored data segment, and converting the temporary storage of the data segment to the conventional manner. When the temporarily stored data segment is to be read from the DSN memory, the method continues at step 488 where the processing module generates a set of temporary read commands. Each temporary read command includes the transaction number, identity of the encoded portion, and an explicit instruction to read the encoded portion in violation of the conventional manner. A processing module sends the set of temporary read commands to the set of storage units to recover the temporarily stored data segment.

When the data segment is to be updated, the method continues at step 490 where the processing module updates the data segment to produce an updated data segment. The processing module determines a temporary storage approach for the updated data segment, where the temporary storage approach includes one of temporarily storing the updated data segment while retaining the temporarily stored data segment and overwriting the temporally stored data segment with the updated data segment.

When the data segment and the updated data segment are to be stored in the temporary manner, the method continues at step 492 where the processing module generates a set of temporary update write commands regarding storage of the updated data segment in the DSN memory. Each temporary update write command includes the transaction number, an encoded portion of the updated data segment, and an implicit instruction that the encoded portion of the updated data segment is not to be stored or made accessible in accordance with the conventional manner. The method continues at step 494 where the processing module transmits the set of temporary update write commands to the set of storage units of the DSN memory. The method branches to step 500 when the processing module determines to convert the temporary storage of the data segment to the conventional manner. Alternatively, the method may branch to step 488 when the processing module determines to re-read the temporarily stored data segment. Further alternatively, the method may branch to step 490 to further update the temporally stored data segment.

When the updated data segment is to be stored in the temporary manner by overwriting the data segment, the method continues at step 496 where the processing module generates a set of temporary over-write commands regarding storage of the updated data segment in the DSN memory. Each temporary over-write command includes the transaction number, an encoded portion of the updated data segment, and an implicit instruction that the encoded portion of the updated data segment is not to be stored or made accessible in accordance with the conventional manner. The method continues at step 498 where the processing module transmits the set of temporary over-write commands to the set of storage units. The method continues to step 500 when the processing module determines to convert the temporary storage of the data segment to the conventional manner. Alternatively, the method may branch to step 488 when the processing module determines to re-read the temporarily stored data segment. Further alternatively, the method may branch to step 490 to further update the temporally stored data segment. When the storage of the data segment is to be converted from the temporary manner to the conventional manner, the method continues at step 500 where the processing module issues a set of write commit commands. Each write commit command includes the transaction number and instructs a storage unit of the set of storage units to conditionally make available a corresponding one of the encoded portions of the data segment. The processing module receives responses to the set of write commit commands, where each response is one of a favorable response (e.g., commit succeeded) and an unfavorable response (e.g., commit failed). When a threshold number of responses to the set of write commit commands have been received within a time period, the method continues at step 502 where the processing module issues a set of write finalize commands to the set of storage units. Each write finalize command instructs the storage unit to permanently make available the corresponding one of the encoded portions of the data segment. When the threshold number of responses to the set of write commit commands have not been received within the second time period, the method continues at step 504 where the processing module issues a set of undo commands to the set of storage units to undo and abort the storage of the data segment.

FIG. 44F is a flowchart illustrating an example of storing data in a conventional manner. The method continues from step 480 of FIG. 44E when the data segment is to be stored in the conventional manner and begins with step 506 where the processing module obtains the transaction number in accordance with the conventional manner. The method continues at step 508 where the processing module issues a set of write commands regarding storage of the data segment to the set of storage units. The method continues at step 510 where the processing module receives responses to the set of write commands. Each response is one of a favorable response type (e.g., write succeeded) and an unfavorable response type (e.g., write failed).

When a threshold number (e.g., a write threshold number) of responses (e.g., favorable responses) to the set of write commands have been received within a time period, the method continues at step 512 where the processing module issues a set of write commit commands. Each write commit command instructs a storage unit of the set of storage units to conditionally make available a corresponding one of the encoded portions of the data segment.

When the threshold number of responses to the set of write commands have not been received within the time period (e.g., too many unfavorable responses received), the method continues at step 514 where the processing module issues a set of rollback commands to the set of storage units to abort storage of the data segment.

The method continues at step 516 where the processing module receives responses to the set of write commit commands. Each response is one of the favorable response type (e.g., write commit succeeded) and the unfavorable response type (e.g., write commit failed). When a threshold number of responses to the set of write commit commands have not been received within the second time period, the method continues at step 518 where the processing module issues a set of undo commands to the set of storage units to undo and abort the storage of the data segment. When the threshold number (e.g., write threshold number) of responses to the set of write commit commands have been received within a second time period, the method continues at step 520 where the processing module issues a set of write finalize commands. Each write finalize command instructs the storage unit to permanently make available the corresponding one of the encoded portions of the data segment.

When the data segment is to be read from the set of storage units in the conventional manner, the method continues at step 521 where the processing module generates a set of read commands. Each read command includes one or more of identity of the corresponding one of the encoded portions of the data segment and the transaction number. The processing module sends the set of read commands to the set of storage units to recover the data segment.

FIG. 44G is a flowchart illustrating another example of temporarily storing data. The method begins at step 522 where a processing module (e.g., of a storage unit) receives a write command regarding storing an encoded portion of a data segment. The write command includes a transaction number. The method continues at step 524 where the processing module determines whether to store the encoded portion of the data segment in a conventional manner or a temporary manner. The method branches to step 538 when the processing module determines to temporarily store the encoded portion in the temporary manner. The method continues to step 526 where the processing module determines to store the encoded portion in the conventional manner.

When the data segment is to be stored in the conventional manner, the method continues at step 526 where the processing module stores the encoded portion of the data segment. For example, the processing module stores the encoded portion in a memory of the storage unit. The method continues at step 528 where the processing module records the transaction number regarding storage of the encoded portion of the data segment. The method continues at step 530 where the processing module outputs a response (e.g., a write slice response) regarding the storage of the encoded portion of the data segment. For example, the processing module generates the response to include a favorable storage indicator when the encoded portion has been successfully stored. As another example, the processing module generates the response to include an unfavorable storage indicator when the encoded portion has not been successfully stored.

The method continues at step 532 where the processing module receives a write commit command (e.g., a commit transaction request) or a rollback command (e.g., a rollback transaction request). The write commit command includes the transaction number and an instruction to conditionally make available the encoded portion of the data segment. The rollback command includes the transaction number and an instruction to abort storage of the encoded portion of the data segment. When the write commit command has been successfully executed, the method continues at step 534 where the processing module outputs a response to the write commit command (e.g., generates and sends a commit transaction response).

The method continues at step 536 where the processing module receives a finalize command (e.g., a finalize transaction request) or an undo command (e.g., an undo transaction request). The finalize command includes the transaction number and an instruction to permanently make available the encoded portion of the data segment. The undo command includes the transaction number and an instruction to undo and abort the storage of the encoded portion of the data segment.

When the data segment is to be stored in the temporary manner, the method continues at step 538 where the processing module temporarily stores the encoded portion of the data segment. For example, the processing module stores the encoded portion in a section of the memory of the storage unit associated with temporary storage. The method continues at step 540 where the processing module records the transaction number regarding the temporary storage of the encoded portion of the data segment. The method continues at step 542 where the processing module outputs a response regarding the temporary storage of the encoded portion of the data segment.

The method continues at step 544 where the processing module receives a temporary read command that includes the transaction number, identity of the encoded portion of the data segment, and an explicit instruction to read the encoded portion in violation of the conventional manner. The method continues at step 546 where the processing module outputs the encoded portion of the data segment to a requesting entity in response to the temporary read command.

The method continues at step 548 where the processing module processes a temporary update write command or a temporary over-write command. As a specific example, the processing module receives the temporary update write command that includes the transaction number, an encoded portion of an updated data segment, and an implicit instruction that the encoded portion of the updated data segment is not to be stored or made accessible in accordance with the conventional manner. Next, the processing module temporarily stores the encoded portion of the updated data segment. The processing module records the transaction number regarding the temporary storage of the encoded portion of the updated data segment. The processing module outputs a response regarding the temporary storage of the encoded portion of the updated data segment.

As another specific example, the processing module receives the temporary over-write command that includes the transaction number, the encoded portion of an updated data segment, and the implicit instruction that the encoded portion of the updated data segment is not to be stored or made accessible in accordance with the conventional manner. Next, the processing module overwrites the encoded portion of the data segment with the encoded portion of the updated data segment. The processing module records the transaction number regarding the temporary storage of the encoded portion of the updated data segment. The processing module outputs the response regarding the temporary storage of the encoded portion of the updated data segment.

The method continues at step 550 where the processing module receives a write commit command that includes an instruction to conditionally make available the temporarily stored encoded portion of the data segment. The method continues at step 552 where the processing module outputs a response to the write commit command. The method continues at step 554 where the processing module receives a finalize command or an undo command. The finalize command includes an instruction to permanently make available the temporarily stored encoded portion of the data segment and the undo command includes an instruction to undo and abort the storage of the temporarily stored encoded portion of the data segment.

FIG. 45A is a schematic block diagram of another embodiment of a dispersed storage network that includes the user device 14 of FIG. 1, the dispersed storage (DS) processing module 350 of FIG. 40A, an alternate DS processing module 558, and the DS unit set 352 of FIG. 40A. The alternate DS processing module 558 may be implemented utilizing the DS processing module 350. The DS processing module 350 and the alternate DS processing module 558 include local memory for temporary storage of one or more data objects and one or more sets of encoded data slices.

The system functions to access data stored in one or more of the DS unit set 352, the DS processing module 350, and the alternate DS processing module 558. The user device 14 issues a data request 560 to the DS processing module 350 with regards to a data object. The data request 560 includes a data identifier of the data object and at least one of a write request, a read request, and a delete request. When the data object does not exist in the local memory of the DS processing module 350, the DS processing module 350 selects a data access approach, where the data access approach includes one of accessing the DS unit set 352, redirecting to the alternate DS processing module 558, and directing the user device 14 to directly access the alternate DS processing module 558. The selecting includes estimating a performance level of each of the data access approaches and selecting the one of the data access approaches based on a comparison of the estimated performance levels of each of the data access approaches. For example, the DS processing module 350 selects the redirecting to the alternate DS processing module 558 approach when the data object is stored in the memory of the alternate DS processing module 558 and is not stored in the memory of the DS processing module 350.

When the selected data access approach includes the accessing the DS unit set 352, the DS processing module 350 issues one or more sets of slice access requests 562 to the DS unit set 352, receives slice access responses 564 from the DS unit set 352, decodes the encoded data slices of the received slice access responses 564 using a dispersed storage error coding function to recover the data object, and issues a data response 566 to the user device that includes the recovered data object. When the selected data access approach includes the redirecting to the alternate DS processing module 558, the DS processing module 350 issues a redirect request 568 to the alternate DS processing module 558 that includes the data access request 560. The alternate DS processing module 558 obtains the data object from one of the local memory of the alternate DS processing module 558 and by retrieving encoded data slices from the DS unit set 352 and decoding the retrieved encoded data slices. The alternate DS processing module 558 outputs the data object to the user device 14 by one of issuing a redirect response 570 to the DS processing module 350 that includes the data object and issuing an alternate data response 574 to the user device 14, where the alternate data response 574 includes the data object. When issuing the redirect response 570 to the DS processing module 350, the DS processing module 350 issues the data response 566 to the user device 14 that includes the data object.

When the selected data access approach includes the directing user device 14 to access the alternate DS processing module 558 directly, the DS processing module 350 issues another data response 566 to the user device 14, where the other data response 566 includes direction information. The direction information includes one or more of identity of the alternate DS processing module 558 and an indicator to directly access the alternate DS processing module 558. Next, the user device 14 issues an alternate data access request 572 to the alternate DS processing module 558 based on the direction information. The alternate DS processing module 558 obtains the data object and issues the alternate data access response 574 to the user device 14, where the alternate data access response 574 includes the data object.

FIG. 45B is a flowchart illustrating an example of redirecting a data access request. The method begins at step 576 where requesting entity (e.g., a user device) issues a data request to a dispersed storage (DS) processing module for a data object. The data request includes one or more of a read request indicator, a data object identifier, and a requesting entity identifier. The method continues at step 578 where the DS processing module determines an estimated performance level for each of a variety of data access approaches. The determining may be based on one or more of initiating a query, performing a test, calculating estimated performance levels, and receiving an error message. The method continues at step 580 where the DS processing module selects a data access approach of the variety of data access approaches based on the estimated performance levels. For example, the DS processing module selects a data access approach associated with a most favorable estimated performance level compared to estimated performance levels of other data access approaches.

The method continues to step 582 when the selected data access approach is direct the requesting entity to access an alternate DS processing module directly. The method branches to step 588 when the selected data access approach is access directly. The method branches to step 592 when the selected data access approach is redirect to the alternate DS processing module.

When the selected data access approach is direct the requesting entity to access an alternate DS processing module directly, the method continues at step 582 where the DS processing module issues a data response to the requesting entity that includes direction information. The direction information includes identity of the alternate DS processing module. The method continues at step 584 where the requesting entity issues an alternate data access request to the alternate DS processing module based on the direction information. The method continues at step 586 where the alternate DS processing module issues an alternate data response to the requesting entity that includes the data object. The issuing includes obtaining a data object from at least one of a local memory of the alternate DS processing module and recovering the data object by retrieving encoded data slices from a DS unit set (e.g., request, receive, and decode slices).

When the selected data access approach is accessed directly, the method continues at step 588 where the DS processing module recovers the data object from the DS unit set. The method continues at step 590 where the DS processing module issues a data response to the requesting entity that includes the data object.

When the selected data access approach is redirect to the alternate DS processing module, the method continues at step 592 where the DS processing module issues a redirect request to the alternate DS processing module. The redirect request includes the data access request. The method continues at step 594 where the alternate DS processing module obtains the data object from at least one of a local memory of the alternate DS processing module and the DS unit set. For example, the alternate DS processing module retrieves the encoded data slices from the DS unit set when the data object is not available from the local memory of the alternate DS processing module. The method continues at step 596 where the alternate DS processing module issues at least one of a redirect response to the DS processing module and the alternate data response to the requesting entity where the data object is included in the redirect response and the alternate data response. When the alternate DS processing module issues the redirect response to the DS processing module, the method continues at step 598 where the DS processing module issues the data response to the requesting entity that includes the data object from the redirect response.

FIG. 46A is a schematic block diagram of another embodiment of a dispersed storage network that includes a plurality of user devices 14 of FIG. 1, the dispersed storage (DS) processing module 350 of FIG. 40A, and the DS unit set 352 of FIG. 40A. The DS processing module 350 includes local memory for temporary storage of one or more index nodes of a hierarchical index node structure where the hierarchical index node structure is utilized to access one or more data objects stored in the DS unit set 352 as a plurality of sets of encoded data slices.

The system functions to optimize storage of the one or more index nodes in the local memory of the DS processing module 350 and the DS unit set 352. The DS processing module 350 receives a data request 560 from a user device 14 of the plurality of user devices 14. The data request 560 includes at least one of a data identifier of data for access, a write data request, a delete data request, and a read data request. The DS processing module 350 issues a data response 566 to acknowledge the data request 560. The data response 566 includes an acknowledgment indicator. The DS processing module 350 determines to modify an index node of the hierarchical index node structure based on the data request 560. The DS processing module 350 modifies the index node temporarily stored in the local memory of the DS processing module 350 in accordance with the data request 560 to produce a modified index node temporarily stored in the local memory.

The DS processing module 350 determines whether to synchronize the modified index node temporarily stored in the local memory of the DS processing module 350 with a copy of the index node stored in the DS unit set 352 as a set of encoded index slices. The determining may be based on one or more of a total number of modifications to the temporally stored index node, a total size of modifications, a timer expiration, and a request. For example, the DS processing module 350 determines to synchronize when a time period has expired since a prior update of the stored index node is in the DS unit set 352. As another example, the DS processing module 350 determines to synchronize when any modification occurs to the stored index temporarily stored in the local memory. When synchronizing, the DS processing module 350 overwrites the index node stored in the DS unit set 352 with the modified temporarily stored index node from the local memory. The overwriting includes encoding the modified temporarily stored index node using a dispersed storage error coding function to produce an updated set of encoded index slices, generating a set of index slice access requests 600, where each index slice access request 600 includes a write slice request and a corresponding encoded data slice of the updated set of encoded index slices, outputting the set of index slice access requests 600 to the DS unit set 352 to initiate storage of the updated set of encoded index slices, and issuing a set of commit requests to the DS unit set 352 to complete storage of the updated set of encoded index slices when receiving at least a write threshold number of favorable index slice access responses 602 from the DS unit set 352.

FIG. 46B is a flowchart illustrating an example of updating a dispersed storage network (DSN) hierarchical index. The method begins at step 604 where a processing module (e.g., of a dispersed storage (DS) processing module) receives a request to modify an index node of a dispersed storage network hierarchical index. The request to modify the index node may be subsequent to receiving a data access request where the index node is associated with data of the data access request. The method continues at step 606 where the processing module updates a locally stored version of the index node in accordance with the request to modify the index node. The updating includes at least one of adding an element, removing an element, and searching elements of the index node.

The method continues at step 608 where the processing module determines whether to synchronize the index node (e.g., stored in a DSN memory) with the locally stored version of the index node. The determining may be based on one or more of a total number of modifications, a total size of updating operations, a time frame expiration, and a request. The method loops back to step 604 when the processing module determines not to synchronize. The method continues to step 610 when the processing module determines to synchronize.

When the processing module determines to synchronize the index node with the locally stored version of the index node, the method continues at step 610 where the processing module overwrites the index node stored in the DSN memory with the locally stored version of the index node. For example, the processing module issues checked write slice requests to the DSN memory that includes a set of updated index node slices and an expected revision number of a set of index node slices associated with the index node currently stored in the DSN memory. Each DS unit of a set of DS units of the DSN memory receiving a corresponding updated index node slice of the set of updated index node slices stores the corresponding updated index node slice when the expected revision number substantially matches a current revision number of a corresponding one of the set of index node slices associated with index node currently stored in the DSN memory. The method continues at step 612 where the processing module overwrites remaining index nodes in the DSN memory with corresponding locally stored versions of the remaining index nodes. The overwriting includes determining whether the remaining index nodes are available for synchronization.

FIG. 47A is a schematic block diagram of another embodiment of a dispersed storage network that includes the dispersed storage (DS) processing module 350 of FIG. 40A, a plurality of DS units 354 of FIG. 40A, and N network paths via one or more networks to operably couple the DS processing module 350 to the plurality of DS units 354. The one or more networks may be implemented with the network 24 of FIG. 1. The network paths 1-N exhibit a variety of performance levels when operably coupling the DS processing module 350 to each of the plurality of DS units 354. Each DS unit 354 of the plurality of DS units 354 may utilize one or more network paths of the network paths 1-N to operably couple to the DS processing module 350. For example, a first network path of the network paths 1-N exhibits lower latency to communicate requests and responses between the DS processing module 350 and a first DS unit 354 of the plurality of DS units 354 as compared to exhibited latency of a second network path of the network paths 1-N.

The system functions to optimize data access performance to data stored in the plurality of DS units 354 by a selection and utilization of network paths 1-N. The DS processing module 350 selects a plurality of network paths of the network paths 1-N to a DS unit 354 of the set of DS units 354. The selecting may be based on one or more of a predetermination, an error message, an estimated performance level, a measured performance level, a security requirement, a bandwidth availability indicator, and a request. For example, the DS processing module 350 selects a plurality of network paths to each DS unit 354 of the set of DS units 354 such that a set of the plurality of network paths is estimated to exhibit substantially the same latency performance levels.

When accessing the data, the DS processing module 350 issues a plurality of speculative access requests 614 to each DS unit 354 of the set of DS units 354 via a corresponding selected plurality of network paths. For each of the set of pluralities of speculative access requests 614, the DS processing module 350 generates each speculative access request to include one or more of a common sequence number, a speculative request indicator, and a dispersed storage network (DSN) address associated with an encoded data slice of the speculative access request. Each DS unit 354 receives a first speculative access request 614 (e.g., first received) of the corresponding plurality of speculative access requests 614 and processes the first speculative access request 614 (e.g., write a slice, delete a slice, read a slice, generate an access response 616, and outputs the access response 616 to the DS processing module). During an exclusion time frame, the DS unit 354 ignores subsequent speculative access requests 614 that are redundant with respect to the first speculative access request 614 (e.g., redundant when the subsequent speculative access request includes the common sequence number).

FIG. 47B is a flowchart illustrating another example of accessing a dispersed storage unit. The method begins at step 618 where a dispersed storage (DS) processing module selects a plurality of network paths to a DS unit of a set of DS units. The selecting of the plurality of network paths to the DS unit may be based on one or more of a predetermination, an error message, a performance level of the path to the DS unit, a performance level of another path to another DS unit where the other DS unit and the DS unit are included in the set of DS units, a security requirement, a bandwidth availability indicator, a prior selection, a prior performance level, and a request.

The method continues at step 620 where the DS processing module issues a plurality of speculative access requests to the DS unit utilizing the selected the plurality of network paths. The issuing includes determining a number of speculative access requests based on one or more of a previous number of speculative access requests for the set of DS units, a performance level of the set of DS units, a predetermination, and a request. Each speculative access request includes a common sequence number, a speculative request indicator, and a dispersed storage network (DSN) address associated with an encoded data slice of the speculative access request. The DS processing module may also issue another plurality of speculative access requests to one or more other DS units of the set of DS units.

The method continues at step 622 where a DS unit of the set of DS units receives a speculative access request of the plurality of speculative access requests. The method continues at step 624 where the DS unit determines whether the received speculative access request is a redundant speculative access request of the plurality of speculative access requests. The DS unit indicates that the received speculative access request is redundant when another speculative access request that includes the common sequence number was received within an exclusion time frame. The method loops back to step 622 when the received speculative access request is redundant. The method continues to step 626 when the DS unit determines that the received speculative access request is not redundant. The method continues at step 626 where the DS unit processes the first speculative access request when the received speculative access request is not redundant. The processing of the first speculative access request includes activating the exclusion time frame for the common sequence number. The method may loop back to step 622.

FIG. 48A is a schematic block diagram of an embodiment of a data encoding system that includes all or nothing (AONT) encoders 1-N, splitters 1-N, collectors 1-T, and a dispersed storage (DS) encoder 630. The system functions to encode data that has been partitioned into data segments 1-N to produce a set of slices. The set of slices may be produced for one or more of storage in a dispersed storage network (DSN), storage in a local memory of a computing device associated with the encoding system, and communication via a communication path to a receiving entity. The encoding of the data is generally in accordance with a dispersed storage error coding function that includes a decode threshold parameter and a pillar width parameter. The set of slices includes a pillar width number of slices. The system encodes the data to produce the pillar width number of slices of the set of slices to include a decode threshold number of slices 1-T and the pillar width minus the decode threshold number of error coded slices.

Each AONT encoder of the AONT encoders 1-N performs an AONT function on a corresponding data segment of data segments 1-N to produce a corresponding secure package of secure packages 1-N. The AONT function includes generating a corresponding random key, encrypting the corresponding data segment using the corresponding random key to produce a corresponding encrypted data segment, performing a deterministic function (e.g., hashing function, cyclic redundancy code function, mask generating function, hash based message authentication code function) on the corresponding encrypted data segment to produce a corresponding digest, masking (e.g., applying an exclusive OR function) the corresponding random key using the corresponding digest to produce a corresponding masked key, and combining (e.g., appending, interleaving, etc.) the corresponding encrypted data and the corresponding masked key to produce the corresponding secure package.

Each splitter of the splitters 1-N splits the corresponding secure package into T sub-pieces associated with the corresponding data segment number, where T is substantially the same as the decode threshold number parameter and each of the T sub-pieces are substantially the same in size. For example, splitter 1 splits secure package 1 to produce sub-piece 1_1 through sub-piece 1_T. Each collector of the collectors 1-T collects like numbered sub-pieces from splitters 1-N. For example, collector 2 collects sub-piece 1_2 associated with data segment 1, collects sub-piece 2_2 associated with data segment 2, collects sub-piece 3_2 associated with data segment 3, etc. through collecting sub-piece N_2 associated with data segment N. Each collector of collectors 1-T aggregates corresponding collected sub-pieces in order by data segment number to produce a corresponding slice of slices 1-T. For example, collector 2 orders sub-piece 1_2, sub-piece 2_2, sub-piece 3_2, through sub-piece 2_2 to produce slice 2 of slices 1-T.

The DS encoder 630 aggregates the slices 1-T to produce a slice aggregation and encodes the slice aggregation using the dispersed storage error coding function to produce the pillar width number minus the decode threshold number of error coded slices 632. For example, the set of slices includes 16 slices when the decode threshold T is 10 and the pillar width is 16. The DS encoder encodes the 10 slices 1-T to produce 6 error coded slices (e.g., slices 11-16 of the set of slices 1-16).

The data encoding system enables random access to recover a desired data segment of data segments 1-N. The random access includes accessing a decode threshold number T of sub-slices at a corresponding offset (e.g., from 1 to N) within each of the T slices to produce a decode threshold number of sub-slices, decoding the decode threshold number of sub-slices using the dispersed storage error coding function to reproduce a corresponding secure package, and applying an AONT decoder to decode the corresponding secure package to produce the corresponding desired data segment. For example, when each secure package is 4 KB, and T=16, the 4 KB blocks will correspond to 4096/16=256 byte sub-slices. To read the second data segment requires reading the second sub-slice (of N sub-piece sets) of 256 bytes from any T of the pillar width number of slices (e.g., reading bytes 256-511 of each of the T slices. A data decoding system is described in greater detail with reference to FIG. 48B.

FIG. 48B is a schematic block diagram of an embodiment of a data decoding system that includes a selector 634, a dispersed storage (DS) decoder 636, an aggregator 638, and an all or nothing (AONT) decoder 640. The system functions to provide random access to a desired data segment 648 of N data segments encoded as a set of slices that includes a pillar width number of slices (e.g., as described in FIG. 48A). Each slice of the pillar width number of slices includes N number of sub-slices. The selector 634 accesses at least a decode threshold number T slices of the pillar width number of slices to acquire a decode threshold number of sub-slices corresponding to the desired data segment, where the decode threshold number of sub-slices are acquired at a common offset within each of the decode threshold number of slices in accordance with the desired data segment. The selector has access to a slice 1 sub-slice, a slice 2 sub-slice, through a slice T sub-slice, and error coded slices sub-slices 642. For example, a decode threshold number of sub-slices at a tenth offset within each of the corresponding decode threshold number of slices are acquired when the tenth data segment of the N data segments is the desired data segment.

The DS decoder 636 decodes the decode threshold number of sub-slices 644 using a dispersed storage error coding function to produce T number of sub-pieces 1-T of a corresponding secure package of the desired data segment. The aggregator 638 aggregates ordered sub-pieces 1-T to recover the corresponding secure package 646. The AONT decoder 640 decodes the corresponding secure package 646 using an AONT function to recover the desired data segment 648. The AONT function includes extracting (e.g., de-interleave, de-append, etc.) a masked key and encrypted data from the corresponding secure package, performing a deterministic function on the encrypted data to produce a corresponding digest, de-masking (e.g., applying an exclusive OR function) the masked key using the corresponding digest to produce a corresponding key, and decrypting the encrypted data using the corresponding key to recover the desire data segment 648.

FIG. 48C is a flowchart illustrating an example of storing data. The method begins at step 650 where a processing module (e.g., of a dispersed storage processing module) partitions the data into a plurality of data segments in accordance with a data segmentation scheme. The data segmentation scheme may be based on a desired subsequent random access of one data segment of the plurality of data segments (e.g., aligning data segment size with a desired recoverable data size). For each data segment of the plurality of data segments, the method continues at step 652 where the processing module applies an all or nothing (AONT) encoder to produce a secure package. For each secure package, the method continues at step 654 where the processing module splits the secure package into a threshold number of sub-pieces. For example, the processing module partitions the secure package into a decode threshold number of sub-pieces, where each sub-piece is substantially the same size.

For each of a threshold number of slices of a set of slices, the method continues at step 656 where the processing module collects a corresponding sub-piece from each of the threshold number of sub-pieces. The collection is ordered by sub-piece. The method continues at step 658 where the processing module encodes the threshold number of slices to produce error coded slices. The encoding includes aggregating the threshold number of slices to produce a temporary data segment and encoding the temporary data segment using a dispersed storage error coding function to produce the error coded slices. For example, the processing module utilizes a portion of a encoding matrix (e.g., rows beyond a first decode threshold number of rows) when multiplying a data matrix of the temporary data segment by an encoding matrix to produce a slice matrix that includes only the error coded slices. The method continues at step 660 where the processing module outputs the threshold number of slices and the error coded slices as a set of encoded data slices of the data.

FIG. 48D is a flowchart illustrating an example of retrieving data. The method begins at step 662 where a processing module (e.g., of a dispersed storage processing module) identifies a data segment of data for recovery. The identifying includes at least one of receiving a segment number, receiving an offset, and mapping the offset into a segment number. The method continues at step 664 where the processing module selects a threshold number of sub-slices of a set of encoded data slices corresponding to the identified data segment. The selecting includes identifying a slice offset to select the threshold number of sub-slices based on segment size divided by the threshold number. The method continues at step 666 where the processing module decodes the threshold number of sub-slices to produce a threshold number of sub-pieces of a secure package. The method continues at step 668 where the processing module aggregates the threshold number of sub-pieces to reproduce the secure package. The aggregating includes ordering the threshold number of sub-pieces. The method continues at step 670 where the processing module applies an all or nothing (AONT) decoder to the secure package to recover the data segment.

FIG. 49A is a schematic block diagram of another embodiment of a data encoding system that includes a key generator 672, an encryptor 674, a deterministic function 676, another deterministic function 678, a masking function 680, a combiner 682, and a dispersed storage (DS) encoder 684. The system functions to encode a data segment 688 to produce a slice set 700. In an example of operation, the key generator 672 generates a key 686 based on at least one of retrieving the key, receiving the key, and generating the key based on a random number. The encryptor 674 encrypts the data segment 688 utilizing the key 686 to produce an encrypted data segment 690. The deterministic function 676 performs a deterministic function on the encrypted data segment 690 to produce a digest 692. The deterministic function includes one or more of a hashing function, a cyclic redundancy code function, a hash based message authentication code function, a sponge function, and a mask generating function. The other deterministic function 678 performs another deterministic function on the digest 692 to produce an integrity value 694. The masking function 680 masks the key 686 using the digest 692 to produce a masked key 696. The masking function 680 may include a modular addition function. For example, when utilizing the modular addition function, the masking function 680 performs an exclusive OR function on the key 686 and the digest 692 to produce the masked key 696. The combiner 682 combines the encrypted data segment 690, the integrity value 694, and the masked key 696 to produce a secure package 698. The combining includes one or more of appending and interleaving. The DS encoder 684 encodes the secure package 698 using a dispersed storage error coding function to produce the slice set 700.

FIG. 49B is a schematic block diagram of another embodiment of a data decoding system that includes a dispersed storage (DS) decoder 702, a de-combiner 704, the deterministic function 676 of FIG. 49A, the other deterministic function 678 of FIG. 49A, an integrity validator 706, a de-masking function 708, and a decryptor 710. The data decoding system functions to decode the slice set 700 of FIG. 49A to recover the data segment 688 of FIG. 49A. In an example of operation, the DS decoder 702 decodes at least a decode threshold number of slices of the slice set 700 using a dispersed storage error coding function to recover the secure package 698 of FIG. 49A. The de-combiner 704 de-combines the recovered secure package 698 to produce a recovered encrypted data segment 690 of FIG. 49A, a recovered masked key 696 of FIG. 49A, and a recovered integrity value 694 of FIG. 49A.

The deterministic function 676 performs the deterministic function on the recovered encrypted data segment 690 to produce a recovered digest 692 of FIG. 49A. The other deterministic function 678 performs the other deterministic function on the recovered digest 692 to produce a calculated integrity value 712. The integrity validator 706 validates the recovered integrity value 694 by comparing the recovered integrity value 694 to the calculated integrity value 712. The integrity validator 706 outputs a validity indicator 714 to indicate results of validating the recovered integrity value 694. For example, the integrity validator 706 outputs the validity indicator 714 to indicate that the recovered integrity value 694 is valid when the recovered integrity value 694 substantially matches the calculated integrity value 712.

When the validity indicator 714 indicates that the recovered integrity value 694 is valid, the de-masking function 708 de-masks the recovered masked key 696 using the recovered digest 692 to produce a recovered key 686 of FIG. 49A. The de-masking function 708 may utilize modular subtraction. When utilizing the modular subtraction, the de-masking function 708 de-masks the recovered masked key 696 by performing an exclusive OR function on the recovered masked key 696 and the recovered digest 692 to produce the recovered key 686. The decryptor 710 decrypts the recovered encrypted data segment 690 using the recovered key 686 to produce the recovered data segment 688.

FIG. 49C is a flowchart illustrating an example of encoding data. The method begins at step 716 where a processing module (e.g., of a dispersed storage processing module) encrypts a data segment using a key to produce an encrypted data segment, where the key may be generated based on at least one of a random number, a retrieved key, and a received key. The method continues at step 718 where the processing module performs a first deterministic function on the encrypted data segment to produce a digest. The deterministic function includes at least one of performing a hashing function, a cyclic redundancy code function, a hash based message authentication code function, a mask generating function, and a sponge function. The method continues at step 720 where the processing module performs a second deterministic function on the digest to produce an integrity value. The second deterministic function may be the same or different than the first deterministic function.

The method continues at step 722 where the processing module performs a masking function on the key using the digest to produce a masked key. The masking function may include utilizing modular addition. For example, the processing module performs an exclusive OR function on the key and the digest to produce the masked key when utilizing modular addition. The method continues at step 724 where the processing module combines the encrypted data segment, the integrity value, and the masked key to produce a secure package. The combining includes one or more of appending and interleaving. The method continues at step 726 where the processing module encodes the secure package using a dispersed storage error coding function to produce a slice set.

FIG. 49D is a flowchart illustrating an example of decoding data. The method begins at step 728 where a processing module (e.g., of a dispersed storage processing module) obtains at least a decode threshold number of slices of the slice set. The obtaining includes at least one of a requesting retrieval and receiving. The method continues at step 730 where the processing module decodes the at least a decode threshold number of slices using a dispersed storage error coding function to recover a secure package. The method continues at step 732 where the processing module de-combines the secure package to produce a recovered encrypted data segment, a recovered integrity value, and a recovered masked key. The de-combining includes at least one of extracting, splitting, partitioning, de-appending, and de-interleaving. The method continues at step 734 where the processing module performs a first deterministic function on the recovered encrypted data segment to produce a recovered digest.

The method continues at step 736 where the processing module performs a second deterministic function on the recovered digest to produce a calculated integrity value. The second deterministic function may be the same or different than the first deterministic function. The method continues at step 738 where the processing module validates the recovered secure package based on the calculated integrity value and the recovered integrity value. For example, the processing module indicates that the recovered secure package is validated when the calculated integrity value is substantially the same as the recovered integrity value. When the secure package is valid, the method continues at step 740 where the processing module applies a de-masking function to the recovered masked key using the recovered digest to produce a recovered key. The de-masking function may include modular subtraction. For example, the processing module performs an exclusive OR function on the recovered masked key and the recovered digest to produce the recovered key when the de-masking function includes modular subtraction. The method continues at step 742 where the processing module decrypts the recovered encrypted data segment using the recovered key to produce a recovered data segment. As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method for execution by one or more processing modules of one or more computing devices of a dispersed storage network (DSN), the method comprises:
    determining whether to store a data segment of data in a DSN memory in a conventional manner or a temporary manner;
    when the data segment is to be stored in the temporary manner:
        obtaining a transaction number in accordance with the conventional manner;
    generating a set of temporary write commands regarding the storage of the data segment in the DSN memory as a temporarily stored data segment, wherein a temporary write command of the set of temporary write commands includes the transaction number, an encoded portion of the data segment, and an implicit instruction that the encoded portion of the data segment is not to be stored or made accessible in accordance with the conventional manner; and
        transmitting the set of temporary write commands to a set of storage units of the DSN memory; and
    when the temporarily stored data segment is to be read from the DSN memory:
        generating a set of temporary read commands, wherein a temporary read command of the set of temporary read commands includes the transaction number, identity of the encoded portion, and an explicit instruction to read the encoded portion in violation of the conventional manner;
    when the data segment is to be stored in the conventional manner:
        obtaining the transaction number in accordance with the conventional manner;
    issuing a set of write commands regarding the storage of the data segment to the set of storage units;
    receiving responses to the set of write commands;
    when a threshold number of responses to the set of write commands have been received within a time period, issuing a set of write commit commands, wherein a write commit command of the set of write commit commands instructs a storage unit of the set of storage units to conditionally make available a corresponding one of encoded portions of the data segment;
    when the threshold number of responses to the set of write commands have not been received within the time period, issuing a set of rollback commands to the set of storage units to abort the storage of the data segment;
    when a threshold number of responses to the set of write commit commands have been received within a second time period, issuing a set of write finalize commands, wherein a write finalize command of the set of write finalize commands instructs the storage unit to permanently make available the corresponding one of the encoded portions of the data segment; and
    when the threshold number of responses to the set of write commit commands have not been received within the second time period, issuing a set of undo commands to the set of storage units to undo and abort the storage of the data segment;
    updating the data segment to produce an updated data segment; and
    when the updated data segment is to be stored in the temporary manner by overwriting the data segment:

generating a set of temporary over-write commands regarding storage of the updated data segment in the DSN memory, wherein a temporary over-write command of the set of temporary over-write commands includes the transaction number, an encoded portion of the updated data segment, and an implicit instruction that the encoded portion of the updated data segment is not to be stored or made accessible in accordance with the conventional manner; and transmitting the set of temporary over-write commands to the set of storage units.

2. The method of claim 1 further comprises:

when the data segment is to be read from the set of storage units in the conventional manner:

generating a set of read commands, wherein a read command of the set of read commands includes the identity of the encoded portion of the data segment.

3. The method of claim 1 further comprises:

updating the data segment to produce an updated data segment; and when the data segment and the updated data segment are to be stored in the temporary manner:

generating a set of temporary update write commands regarding the storage of the data segment in the DSN memory, wherein a temporary update write command of the set of temporary update write commands includes the transaction number, an encoded portion of the updated data segment, and an implicit instruction that the encoded portion of the updated data segment is not to be stored or made accessible in accordance with the conventional manner; and transmitting the set of temporary update write commands to the set of storage units.

4. The method of claim 1 further comprises:

when the storage of the data segment is to be converted from the temporary manner to the conventional manner:

issuing a set of write commit commands, wherein a write commit command of the set of write commit commands instructs a storage unit of the set of storage units to conditionally make available a corresponding one of encoded portions of the data segment;

when a threshold number of responses to the set of write commit commands have been received within a time period, issuing a set of write finalize commands, wherein a write finalize command of the set of write finalize commands instructs the storage unit to permanently make available the corresponding one of the encoded portions of the data segment; and when the threshold number of responses to the set of write commit commands have not been received within a second time period, issuing a set of undo commands to the set of storage units to undo and abort the storage of the data segment.

5. A method for execution by one or more processing modules of one or more computing devices of a dispersed storage network (DSN), the method comprises:

receiving a write command regarding storing an encoded portion of a data segment, wherein the write command includes a transaction number;

determining whether to store the encoded portion of the data segment in a conventional manner or a temporary manner;

when the data segment is to be stored in the temporary manner:

temporarily storing the encoded portion of the data segment;

recording the transaction number regarding the temporary storing of the encoded portion of the data segment; and outputting a response regarding the temporary storing of the encoded portion of the data segment;

receiving a temporary over-write command that includes the transaction number, an encoded portion of an updated data segment, and an implicit instruction that the encoded portion of the updated data segment is not to be stored or made accessible in accordance with the conventional manner;

overwriting the encoded portion of the data segment with the encoded portion of the updated data segment;

recording the transaction number regarding the temporary storing of the encoded portion of the updated data segment; and outputting a response regarding the temporary storing of the encoded portion of the updated data segment; and when the data segment is to be stored in the conventional manner:

storing the encoded portion of the data segment;

recording the transaction number regarding the storage of the encoded portion of the data segment;

outputting a response regarding the storage of the encoded portion of the data segment;

receiving a write commit command or a rollback command, wherein the write commit command includes an instruction to conditionally make available the encoded portion of the data segment and the rollback command includes an instruction to abort the storage of the encoded portion of the data segment;

outputting a response to the write commit command; and receiving a finalize command or an undo command, wherein the finalize command includes an instruction to permanently make available the encoded portion of the data segment and the undo command includes an instruction to undo and abort the storage of the encoded portion of the data segment.

6. The method of claim 5 further comprises:

receiving a temporary read command that includes the transaction number, identity of the encoded portion of the data segment, and an explicit instruction to read the encoded portion in violation of the conventional manner; and outputting the encoded portion of the data segment in response to the temporary read command.

7. The method of claim 5 further comprises:

receiving a temporary update write command that includes the transaction number, an encoded portion of an updated data segment, and an implicit instruction that the encoded portion of the updated data segment is not to be stored or made accessible in accordance with the conventional manner;

temporarily storing the encoded portion of the updated data segment;

recording the transaction number regarding the temporary storing of the encoded portion of the updated data segment; and outputting a response regarding the temporary storing of the encoded portion of the updated data segment.

8. The method of claim 5 further comprises:

receiving a write commit command that includes an instruction to conditionally make available the temporarily stored encoded portion of the data segment;

outputting a response to the write commit command; and receiving a finalize command or an undo command, wherein the finalize command includes an instruction to permanently make available the temporarily stored encoded portion of the data segment and the undo command includes an instruction to undo and abort storage of the temporarily stored encoded portion of the data segment.

9. A computing device of a dispersed storage network (DSN) comprises:
at least one processor and at least one memory; and
a dispersed storage (DS) module that includes:
a first module, when operable within the computing device, causes the computing device to:
determine whether to store a data segment of data in DSN memory in a conventional manner or a temporary manner;
a second module, when operable within the computing device, causes the computing device to:
when the data segment is to be stored in the temporary manner:
obtain a transaction number in accordance with the conventional manner;
generate a set of temporary write commands regarding the storage of the data segment as a temporarily stored data segment in the DSN memory, wherein a temporary write command of the set of temporary write commands includes the transaction number, an encoded portion of the data segment, and an implicit instruction that the encoded portion of the data segment is not to be stored or made accessible in accordance with the conventional manner; and
transmit the set of temporary write commands to a set of storage units of the DSN memory; and
a third module, when operable within the computing device, causes the computing device to:
when the temporarily stored data segment is to be read from the DSN memory:
generate a set of temporary read commands, wherein a temporary read command of the set of temporary read commands includes the transaction number, identity of the encoded portion, and an explicit instruction to read the encoded portion in violation of the conventional manner;
the second module, when operable within the computing device, further causes the computing device to:
when the data segment is to be stored in the conventional manner:
obtain the transaction number in accordance with the conventional manner;
issuing a set of write commands regarding the storage of the data segment to the set of storage units;
receive responses to the set of write commands;
when a threshold number of responses to the set of write commands have been received within a time period, issue a set of write commit commands, wherein a write commit command of the set of write commit commands instructs a storage unit of the set of storage units to conditionally make available a corresponding one of encoded portions of the data segment;
when the threshold number of responses to the set of write commands have not been received within the time period, issue a set of rollback commands to the set of storage units to abort the storage of the data segment;
when a threshold number of responses to the set of write commit commands have been received within a second time period, issue a set of write finalize commands, wherein a write finalize command of the set of write finalize commands instructs the storage unit to permanently make available the corresponding one of the encoded portions of the data segment; and
when the threshold number of responses to the set of write commit commands have not been received within the second time period, issue a set of undo commands to the set of storage units to undo and abort the storage of the data segment;
the second module, when operable within the computing device, further causes the computing device to:
update the data segment to produce an updated data segment; and
when the updated data segment is to be stored in the temporary manner by overwriting the data segment:
generate a set of temporary over-write commands regarding the storage of the updated data segment in the DSN memory, wherein a temporary over-write command of the set of temporary over-write commands includes the transaction number, an encoded portion of the updated data segment, and an implicit instruction that the encoded portion of the updated data segment is not to be stored or made accessible in accordance with the conventional manner; and
transmit the set of temporary over-write commands to the set of storage units.

10. The computing device of claim 9 further comprises:
the third module, when operable within the computing device, further causes the computing device to:
when the data segment is to be read from the set of storage units in the conventional manner:
generate a set of read commands, wherein a read command of the set of read commands includes the identity of the encoded portion of the data segment.

11. The computing device of claim 9 further comprises:
the second module, when operable within the computing device, further causes the computing device to:
update the data segment to produce an updated data segment; and
when the data segment and the updated data segment are to be stored in the temporary manner:
generate a set of temporary update write commands regarding the storage of the data segment in the DSN memory, wherein a temporary update write command of the set of temporary update write commands includes the transaction number, an encoded portion of the updated data segment, and an implicit instruction that the encoded portion of the updated data segment is not to be stored or made accessible in accordance with the conventional manner; and
transmit the set of temporary update write commands to the set of storage units.

12. The computing device of claim 9 further comprises:
the second module, when operable within the computing device, further causes the computing device to:
when the storage of the data segment is to be converted from the temporary manner to the conventional manner:
issue a set of write commit commands, wherein a write commit command of the set of write commit commands instructs a storage unit of the set of storage units to conditionally make available a corresponding one of encoded portions of the data segment;

when a threshold number of responses to the set of write commit commands have been received within a time period, issue a set of write finalize commands, wherein a write finalize command of the set of write finalize commands instructs the storage unit to permanently make available the corresponding one of the encoded portions of the data segment; and when the threshold number of responses to the set of write commit commands have not been received within a second time period, issue a set of undo commands to the set of storage units to undo and abort the storage of the data segment.

13. A computing device of a dispersed storage network (DSN) comprises:
at least one processor and at least one memory; and
a dispersed storage (DS) module that includes:
a first module, when operable within the computing device, causes the computing device to:
receive a write command regarding storing an encoded portion of a data segment, wherein the write command includes a transaction number;
determine whether to store the encoded portion of the data segment in a conventional manner or a temporary manner;
a second module, when operable within the computing device, causes the computing device to:
when the data segment is to be stored in the temporary manner:
temporarily store the encoded portion of the data segment;
record the transaction number regarding the temporary storage of the encoded portion of the data segment; and
output a response regarding the temporary storage of the encoded portion of the data segment;
receive a temporary over-write command that includes the transaction number, an encoded portion of an updated data segment, and an implicit instruction that the encoded portion of the updated data segment is not to be stored or made accessible in accordance with the conventional manner;
overwrite the encoded portion of the data segment with the encoded portion of the updated data segment;
record the transaction number regarding the temporary storage of the encoded portion of the updated data segment; and
output a response regarding the temporary storage of the encoded portion of the updated data segment; and
a third module, when operable within the computing device, causes the computing device to:

when the data segment is to be stored in the conventional manner:
store the encoded portion of the data segment;
record the transaction number regarding the storage of the encoded portion of the data segment;
output a response regarding the storage of the encoded portion of the data segment;
receive a write commit command or a rollback command, wherein the write commit command includes an instruction to conditionally make available the encoded portion of the data segment and the rollback command includes an instruction to abort the storage of the encoded portion of the data segment;
output a response to the write commit command; and
receive a finalize command or an undo command, wherein the finalize command includes an instruction to permanently make available the encoded portion of the data segment and the undo command includes an instruction to undo and abort the storage of the encoded portion of the data segment.

14. The computing device of claim 13 further comprises:
a fourth module, when operable within the computing device, causes the computing device to:
receive a temporary read command that includes the transaction number, identity of the encoded portion of the data segment, and an explicit instruction to read the encoded portion in violation of the conventional manner; and
output the encoded portion of the data segment in response to the temporary read command.

15. The computing device of claim 13 further comprises:
the second module, when operable within the computing device, further causes the computing device to:
receive a temporary update write command that includes the transaction number, an encoded portion of an updated data segment, and an implicit instruction that the encoded portion of the updated data segment is not to be stored or made accessible in accordance with the conventional manner;
store the encoded portion of the updated data segment;
record the transaction number regarding temporary the storage of the encoded portion of the updated data segment; and
output a response regarding the temporary storage of the encoded portion of the updated data segment.

16. The computing device of claim 13 further comprises:
the second module, when operable within the computing device, further causes the computing device to:
receive a write commit command that includes an instruction to conditionally make available the temporarily stored encoded portion of the data segment;
output a response to the write commit command; and
receive a finalize command or an undo command, wherein the finalize command includes an instruction to permanently make available the temporarily stored encoded portion of the data segment and the undo command includes an instruction to undo and abort the storage of the temporarily stored encoded portion of the data segment.

* * * * *